US012759688B2

(12) United States Patent
Afman

(10) Patent No.: US 12,759,688 B2
(45) Date of Patent: Oct. 13, 2026

(54) SYSTEM FOR AND METHOD OF CONTROLLING WATERCRAFT

(71) Applicant: YAMAHA HATSUDOKI KABUSHIKI KAISHA, Shizuoka (JP)

(72) Inventor: Juan-Pablo Afman, Marietta, GA (US)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 406 days.

(21) Appl. No.: 18/155,678

(22) Filed: Jan. 17, 2023

(65) Prior Publication Data

US 2023/0150637 A1 May 18, 2023

Related U.S. Application Data

(63) Continuation-in-part of application No. 17/655,962, filed on Mar. 22, 2022, now Pat. No. 12,459,620.

(60) Provisional application No. 63/210,878, filed on Jun. 15, 2021, provisional application No. 63/165,025, filed on Mar. 23, 2021.

(51) Int. Cl.

| | |
|---|---|
| ***B63H 21/21*** | (2006.01) |
| ***B63H 20/00*** | (2006.01) |
| ***B63H 20/10*** | (2006.01) |
| ***B63H 20/12*** | (2006.01) |
| ***G05G 9/047*** | (2006.01) |

(52) U.S. Cl.

CPC ........... *B63H 21/213* (2013.01); *B63H 20/10* (2013.01); *B63H 20/12* (2013.01); *G05G 9/047* (2013.01); *B63H 2020/003* (2013.01); *B63H 2021/216* (2013.01)

(58) Field of Classification Search

None

See application file for complete search history.

(56) References Cited

U.S. PATENT DOCUMENTS

| | | | | |
|---|---|---|---|---|
| 8,807,059 | B1 * | 8/2014 | Samples | B63H 20/20 114/144 R |
| 9,545,987 | B1 | 1/2017 | Przybyl et al. | |
| 9,932,098 | B1 * | 4/2018 | Andrasko | G05D 1/0206 |
| 10,214,273 | B1 * | 2/2019 | Smith | B63H 20/10 |
| 10,377,458 | B1 | 8/2019 | McGinley | |

(Continued)

FOREIGN PATENT DOCUMENTS

| | | |
|---|---|---|
| JP | 2014-76761 | 5/2014 |

OTHER PUBLICATIONS

Maneouvring with Azipods—turning in independent mode, by ISSIMS, Nov. 28, 2020, retrieved from https://www.youtube.com/watch?v=DhGYpgm-NOM&list=PLPBYnZT7aF1sMtBp-UIZ-MukVvX1_bsNP&index=2.

(Continued)

*Primary Examiner* — Hunter B Lonsberry
*Assistant Examiner* — Henry R Hinton
(74) *Attorney, Agent, or Firm* — Knobbe, Martens, Olson & Bear, LLP

(57) ABSTRACT

A control system for a watercraft can provide various modes of joystick propulsion control including cruise control, sub-idle watercraft speed operation, composite lateral propulsion, and shiftless docking maneuvers. The system can be used with peripheral motors having retractable 360-degree rotatable units together with a central motor both of which have mechanism to selectively deploy or retract their propellers in and out of water by a controller by manually or automatically.

27 Claims, 20 Drawing Sheets

(56) References Cited

U.S. PATENT DOCUMENTS

| | | | | |
|---|---|---|---|---|
| 10,661,872 | B1 | 5/2020 | Ito et al. | |
| 10,766,589 | B1 | 9/2020 | Ito | |
| 2007/0093147 | A1 | 4/2007 | Mizutani | |
| 2008/0113570 | A1 | 5/2008 | Kaji | |
| 2011/0166724 | A1 | 7/2011 | Hiramatsu | |
| 2011/0188938 | A1 | 8/2011 | Nedwed et al. | |
| 2014/0046515 | A1 | 2/2014 | Mitzutani | |
| 2015/0005995 | A1* | 1/2015 | Caouette | B63H 21/21 701/21 |
| 2015/0072575 | A1 | 3/2015 | Mizutani | |
| 2015/0166159 | A1* | 6/2015 | Inoue | B63H 20/12 440/53 |
| 2015/0246714 | A1 | 9/2015 | Morikawa et al. | |
| 2017/0232944 | A1 | 8/2017 | Owen et al. | |
| 2018/0057132 | A1 | 3/2018 | Ward et al. | |
| 2019/0118922 | A1 | 4/2019 | McGinley et al. | |
| 2022/0081093 | A1* | 3/2022 | Miyaki | B63B 79/40 |
| 2022/0242544 | A1* | 8/2022 | Schatz | B63H 5/08 |
| 2022/0306257 | A1 | 9/2022 | Afman et al. | |
| 2024/0158062 | A1* | 5/2024 | Frouin | B63H 5/20 |

OTHER PUBLICATIONS

Maneouvring with Azipods—speed control in independent mode, by ISSIMS, Nov. 28, 2020, retrieved from https://www.youtube.com/watch?v=2cNzA4ac8JQ&list=PLPBYnZT7aF1sMtBp-UIZ-MukVvX1_bsNP&index=3 on Jan. 30, 2024.

Shiphandling With Azumuthing Popped Propulsors, By Alper Tunga Aniker, pp. 6, 154-164, Jan. 2015, retrieved from|https://books.google.com/books?id=jiRGEAAAQBAJ&pg=PA154&dq=hot+to+control+maneuver+azipod &source=bl&ots=zjpvb9w16g&sig=ACfU3U2tpZArSKbguNXXAkzvjGOq9TPkng&hl=en&sa=X&ved=2ahUKEwiAl57ixYW.

Bluenav, "BlueSpin Retractable Motor," web printout from https://bluenav.com/hybrid/, printed Dec. 6, 2022.

Bluenav, "Hybrid and electric motorizations for boats," flyer downloaded from https://bluenav.com/wp-content/uploads/2022/09/Flyers_BLUENAV.pdf, downloaded Dec. 6, 2022.

* cited by examiner

FIG. 5B1

SYSTEM FOR AND METHOD OF CONTROLLING WATERCRAFT

CROSS-REFERENCE TO RELATED APPLICATIONS

This application is a continuation-in-part of U.S. Non-provisional patent application Ser. No. 17/655,962, filed Mar. 22, 2022, U.S. Provisional Patent Application No. 63/165,025, filed Mar. 23, 2021, and U.S. Provisional Patent Application No. 63/210,878, filed Jun. 15, 2021, the entire contents of which are hereby incorporated by reference herein in their entirety and for all purposes.

BACKGROUND OF THE INVENTIONS

Field of the Inventions

The present inventions relate to systems and methods of controlling a watercraft, for example, with multiple outboard motors.

Description of the Related Art

A type of control method that controls the magnitude and direction of a thrust generated by each of a plurality of outboard motors so as to turn the bow of a watercraft has been known. For example, a control device for outboard motors described in U.S. Pat. No. 10,766,589 controls right and left outboard motors in accordance with movements of a joystick, including twisting. Specifically, when the joystick is twisted rightward, the control device causes the outboard motor disposed on the port side to generate a thrust for forward movement, and simultaneously, causes the outboard motor disposed on the starboard side to generate a thrust for rearward movement. Thus, the watercraft turns the bow rightward due to difference in forces between the right and left outboard motors.

The control device disclosed in U.S. Pat. No. 10,766,589 can also be used to move the watercraft forward (or rearward) while turning the bow of the watercraft. In such a situation, the operator can push the joystick forward or rearward and also simultaneously twist the joystick rightward or leftward. The control device controls the throttle position, steering angle, and gear selection (forward or reverse) to generate a movement corresponding to the operator's movement of the joystick. Further, the control system of U.S. Pat. No. 10,766,589 also provides for sideways or lateral movements of a watercraft. For example, when an operator moves the joystick rightward or leftward, the control system puts one of the outboard motors in a forward gear and the other outboard motor in a rearward gear and adjusts the steering angles and throttles appropriately to cause a leftward or rearward lateral movement of the watercraft. In this mode of operation, the steering angles of the outboard motors are nonparallel and pass through the center of pressure of the watercraft to avoid creating any torque on the watercraft and thus resulting only in a net lateral thrust direction. In some modes of operation, this control system returns the gear position of both outboard motors to neutral when the joystick is released. Further, when the joystick is subsequently moved, the control system automatically changes the gear position of each outboard motor to forward or reverse, to effect the movement corresponding to the operator's manipulation of the joystick.

SUMMARY OF THE INVENTIONS

An aspect of at least one of the embodiments disclosed herein includes the realization that outboard motors with larger ranges of steering angle adjustment can be controlled in such as manner as to provide a shiftless maneuvering mode of operation. For example, conventional outboard motors that are mounted to a watercraft so as to be steerable about a steering axis, typically have a steering range of approximately 30 degrees (positive or negative) (e.g., 30 degrees to either side of straight ahead). The total range of movement can illustratively be approximated to a total of 60 degrees of a range of movement about the steering axis. As such, in order to produce the thrusts required for certain low-speed maneuvers, such as rotation or lateral movement, and no thrust, the outboard motors are shifted into and out of gear (forward or reverse) each time the operator releases the joystick so it return to the default position and each time the operator moves the joystick from the default position. As such, both outboard motors produce a shock or vibration that is both audible to the users of the boat and tactile in that the operators can feel the shock transmitted to the boat, for each gearshift. This effect is more pronounced on smaller vessels.

However, outboard motors that have an increased steering angle range, including an orientation in which the propellers can be oriented so as to generate thrust vectors that are directly opposed and thereby cancelled, can be operated in a manner so as to provide a shockless maneuvering mode.

More specifically, using such outboard motors can provide for a mode of operation in which the outboard motors are in a drive gear (e.g., forward gear) and oriented at directly opposed orientations so as to generate no net thrust when a joystick is in its default position, i.e., a position in which the user is not requesting any thrust. In this orientation, the outboard motors can both be running at idle speed, in forward gear, and thus generating equal but opposite thrusts, for a net zero thrust. When the user then manipulates the joystick, such as pushing the joystick directly forward, the outboard motors can be steered toward a partially or totally forward-pointing orientation, so as to produce a net forward thrust. Thus, the outboard motors switch from a mode in which they are producing no net thrust, to producing a net positive forward thrust, without the need for any gear changes, thereby avoiding the creation of any shocks or sounds normally associated with shifting an outboard motor from a neutral gear to forward or reverse.

Further, if the operator is holding the joystick in a forward position for generating forward thrust, then releases the joystick, the outboard motors can be steered from an orientation for a net forward thrust to a directly opposed orientation to generate a net zero thrust. Again, this allows the outboard motors to change from a mode of operation in which they are generating a net forward thrust to a net zero thrust, without the requirement to shift from a forward or reverse gear to neutral. This further avoids the creation of noise and shock associated with an outboard motor being shifted from a forward or reverse gear, to neutral.

In some embodiments, such a control system can be used with outboard motors that have a steering angle of at least about 180 degrees (measured as a positive value or a negative value and can further include some variation (e.g., +/−5 degrees). The total steering angle can illustratively be approximated as a range of 180 degrees to 360 degrees. Such a further enlarged steering angle range can support additional, shiftless changes in modes of operation. For example, but without limitation, outboard motors with such an increased steering angle range can be controlled in a shiftless manner to provide a reverse movement, sideways movement, as well as forward, reverse, and sideways movements with rotation.

In some embodiments, the outboard motors used with the present control system can be configured to provide for 360-degree steering angle ranges. In some embodiments, the upper unit of such outboard motors can be mounted to a watercraft in a fixed angular orientation (relative to a vertical axis) and include steerable lower units.

Thus, in accordance with some embodiments, a system for controlling a watercraft can include a left outboard motor on a port side of the watercraft, a right outboard motor on a starboard side of the watercraft, a left steering actuator configured to change a steering angle of the left outboard motor, a right steering actuator that is configured to change a steering angle of the right outboard motor, and a controller communicating with the left and right outboard motors and the left and right steering actuators. The controller can be configured to receive a forward thrust signal and a no-thrust signal, wherein the controller is configured to control the left and right steering actuators so as to adjust the steering angles of the left and right outboard motors to be in direct opposition to each other so as to produce a net zero thrust when the controller receives the no-thrust signal, and wherein the controller is configured to control the left and right steering actuators to adjust the steering angles of the left and right outboard motors so as to produce a net positive forward thrust, when the controller receives the forward thrust signal.

In some embodiments, a method of controlling a watercraft having left and right outboard motors and left and right steering actuators, can comprise receiving a no-thrust signal and a forward thrust signal. The method can also include controlling the left and right steering actuators, in response to receiving the no-thrust signal, so as to direct the steering angles of the left and right outboard motors to be in direct opposition thereby generating no substantial net thrust, and controlling the left and right steering actuators, in response to receiving the forward thrust signal, so as to adjust the steering angles of the left and right outboard motors to an orientation generating a net forward thrust.

Another aspect of at least one of the inventions disclosed herein includes the realization that a watercraft having outboard motors with 360° steerable lower units can benefit from a control system that provides different propulsion control modes, including a mode where the steering angles of the outboard motors are limited to less than 360°. For example, although the outboard motors may be capable of rotating the lower units 360°, for enhanced maneuvering control, with a joystick for example, it also may be beneficial or desirable to a user to provide a more convention propulsion mode as well. Thus, an aspect of at least one of the inventions disclosed herein includes the realization that a propulsion control system can include a steering wheel, throttle levers, and a joystick for controlling outboard motors that have 360° steerable capability. In a joystick maneuvering mode of operation, the control system can utilize the 360° rotatability of the motors to provide for enhanced maneuvering, such as docking, rotating, lateral movements, etc. Additionally, the control system can offer a more conventional steering mode in which the steering wheel angle input by a user is used to control the rudder angles of the outboard motors to a limited range of steering angles that is more common for conventional outboard motor steering, for example, to about 30° to the left and right sides. In such a mode of operation, optionally, the controller can control the throttle output and gear position of the outboard motors in a more conventional manner. Thus, the handling characteristics of the watercraft would feel more typical of conventional watercraft behavior and response when using the steering and throttle levers.

Another aspect of at least one of the inventions disclosed herein includes the realization that under a joystick control mode, a remote control system for multiple outboard motor powered watercraft can provide a more user-friendly and easier to use speed control technique for changing a speed of the watercraft in an integrative proportional or stepwise manner in which a thrust generated by the outboard motors is held when the joystick is released thereby providing a more convenient manner for speed control for the user. For example, the control system can be configured to operate in a thrust hold mode and detect and respond to “tapped” inputs into the joystick. One example would be if a user were to tap the joystick in the forward direction and the controller would, in response, increase the thrust generated by the outboard motors in a stepwise manner. The control system could control the outboard motors to provide one or more watercraft sub idle speed modes of operation and one or more super idle speed modes of operation.

In some embodiments, the system is configured for use with 360° steerable outboard motors. For example, the control system, in response to receiving an initial “tap” could orient the 360° steerable outboard motors into position in which the rudder angles of the outboard motors are pointed partially at each other, thereby cancelling some of the thrust generated by the outboard motors but producing a net positive forward thrust on the watercraft. In such a mode of operation, the watercraft would move at a forward speed that is less than the watercraft speed achievable with both outboard motors, parallel to the longitudinal axis of the watercraft with the engines operating at idle speed. Some such speed settings can be useful for trolling for example, and other low speed maneuvers.

With additional “taps” to the joystick, the controller can cycle through, optionally, additional orientations of the outboard motors providing additional sub idle watercraft speed modes, or, optionally, orient the outboard motor straight ahead and cycle through additional forward modes of operation in which the engine speed of the outboard motors is increased to provide higher, super idle watercraft speeds. In this “tapping” mode of operation, each time the joystick is tapped and released causes the controller to change the total amount of propulsion generated by the outboard motors and thereby changing the watercraft speed of the watercraft. Thus, the watercraft would continue to operate at speed without the user needing to hold the joystick in any particular position.

Optionally, in a different thrust hold mode of operation, the control system can be configured to integrate a detected position of the joystick and gradually and/or continuously change the thrust generated by the outboard motors at a predetermined rate of increase or proportional to the displacement of the joystick by the operator. For example, if the watercraft was at rest with the control system generating zero thrust and the user pushes the joystick forward to 60% of its full range of motion, the control system can integrate the detected position over time and gradually increase the thrust produced by the outboard motors from a zero thrust most towards a mode corresponding to the 60% actuation position. In such a mode of operation, the controller could first, change the rudder angles of the outboard motors through a range of orientations from being directly opposed to one another (in which they generate a zero net thrust on the watercraft) up through rudder angles in which the outboard motors are almost parallel to one another, which corresponds to a range of watercraft speeds that are less than a typical idle watercraft speed. After the outboard motors reach a fully parallel orientation, then the controller can further increase the thrust generated by increasing the output from the outboard motor engines, thereby for example, raising the engine speeds and thus the speed of the propellers. After the user releases the joystick allowing it to return to its default position, the control system can hold the power output of each outboard motor and their rudder angle to thereby continue to produce the thrust generated when the user released the joystick thereby, thereby providing a more convenient mode for using a joystick for propulsion control. To slow the watercraft, a user could tilt the joystick towards the rearward direct, in response to which the control system could gradually reduce the thrust produced by the outboard motors.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5B1 is a schematic diagram showing control of the peripheral motors in a first mode of forward movement.

DETAILED DESCRIPTION OF THE PREFERRED EMBODIMENTS

Figure 1:
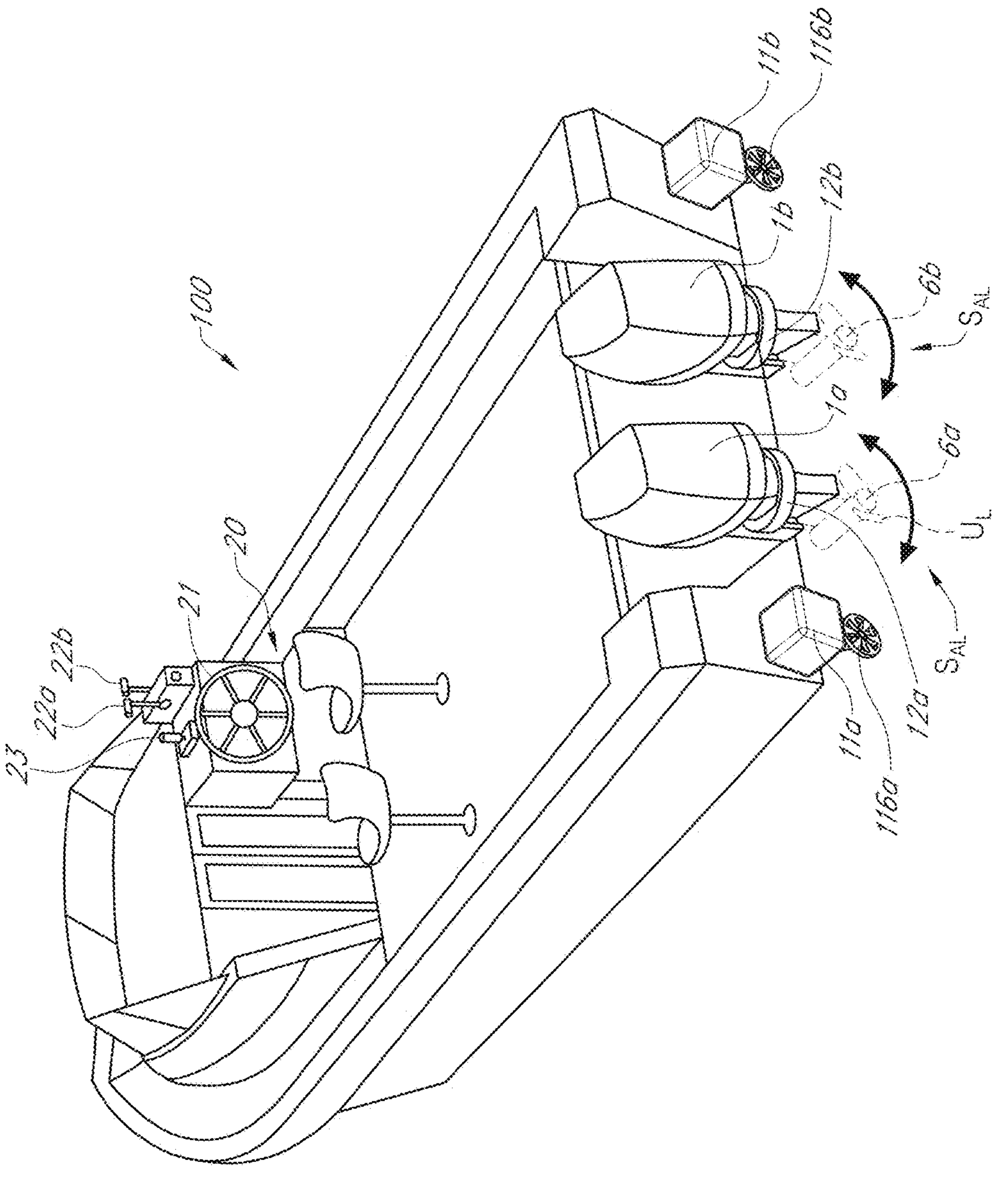
FIG. 1 is a schematic diagram of a watercraft in which a watercraft control system according to a preferred embodiment of the present invention is embedded.

Preferred embodiments of the present inventions are hereinafter explained with reference to the drawings. FIG. 1 is a schematic diagram of a watercraft 100 in which a control system according to illustrative embodiments is embedded. As shown in FIG. 1, the control system can include a plurality of outboard motors 1*a*, 1*b*, 11*a* and 11*b*. Specifically, the watercraft 100 includes a first central motor (e.g., a left central motor 1*a*) and a second central motor (e.g., a right central motor 1*b*). In some embodiments, other numbers of central motors can also be used. For example, in some embodiments, a third or one or more "middle" central motors (not shown), can be mounted between the left and right central motors 1*a*, 1*b*. In such embodiments, the one or more middle central motors can be operated synchronously or substantially synchronously (same gear position, rudder angle, power output) with the central motors 1*a*, 1*b*. Optionally, in other modes of operation, for example, sub idle watercraft speed operation modes, one or more of any middle central motors can be operated independently of the left and right central motors 1*a*, 1*b*, for example, held in a neutral gear. It should be noted that the motor is referred to by the reference number and may be generally referred to as an outboard motor. In some embodiments, specific reference to an outboard motor may be referenced relative to a location or function of the outboard motor, such as a central or peripheral motor in this application. However, reference to a central motor or peripheral motor should not be construed as limiting as to a specific mounting position on the watercraft. Accordingly, reference to a central motor can also be considered as reference to a primary motor, outboard motor (s), or first motor(s) and should be considered interchangeable. Similarly reference to peripheral motor can also be considered as reference to a secondary motor (relative to the primary motor), supplementary motor (relative to the primary motor), electric motor, or second motor(s) and should also be considered interchangeable. Still further, reference to outboard motor with regard to any specific motor is not intended to be limited solely to traditional outboard motors and may include a wide variety of motor types, including but not limited to inboard motors, hybrid inboard/outboard motors, or any particular type or configuration of outboard motors.

The central motors 1*a*, 1*b* may be attached to the stern of the watercraft 100. In some embodiments, the central motors 1*a*, 1*b* can be disposed in alignment in the width direction of the watercraft 100. Specifically, the left central motor 1*a* can be disposed on the port side of the watercraft 100 and the right central motor 1*b* can be disposed on the starboard side of the watercraft 100. Each of the central motors 1*a*, 1*b* generates a thrust to propel the watercraft 100.

Illustratively, a watercraft can include three outboard motors. Specifically, as will be described, the watercraft can include two peripheral motors and at least one central motor to implement different configurations in accordance with multiple aspects of the present application. In some embodiments, a pair of peripheral motors can be added as a dealer option at the dealer service station or an aftermarket installation. Accordingly, a watercraft may be configured to allow for the installation of a pair of peripheral motors to an existing watercraft together with necessary wiring and software controls to facilitate the same configuration of the embodiments described in this application can be achieved.

With continued reference to FIG. 1 in addition to the central motors 1*a*, 1*b*, the watercraft 100 further include a first peripheral motor (e.g., a left peripheral motor 11*a*) and a second peripheral motor (e.g., a right peripheral motor 11*b*) as shown in FIG. 1. Specifically, the left peripheral motor 11*a* can be disposed on the port side of the watercraft 100 relative to the central motors 1*a*, 1*b*, and the left peripheral motor 11*a* can be disposed on the starboard side of the watercraft 100 relative to the central motors 1*a*, 1*b*. Each of the peripheral motors 11*a*, 11*b* are deployed close to an outer most place of the stern and generates a thrust to propel the watercraft 100.

In this configuration, all four outboard motors, namely, the central outboard motors 1*a* and 1*b* and peripheral outboard motors 11*a* and 11*b* are deployed to produce thrust as their propellers are all under water surface level. In accordance with traditional operation of the outboard motors, each of the outboard motors may be implemented to provide some directional range of thrust based on rotation of the outboard motor in accordance with established degrees of rotation.

In this embodiment of present application, the outboard motors may be operated in accordance with control software that provides for a plurality of operating modes or control modes related to operation of the outboard motors. Specifically, in a first operating mode, the central motors, such as central motors 1*a* and 1*b*, may be operated to be the sole source of thrust to the personal watercraft. In this operating mode, the peripheral motors do not provide any form of thrust. This operating mode may be generally referred to as a central motor only mode. In a second operating mode, the peripheral motors, such as peripheral motors 11*a* and 11*b*, may be operated to be the sole source of thrust to the personal watercraft. In this operating mode, the central motors do not provide any form of thrust. This operating mode may be generally referred to as a peripheral only mode. Still further, in a third operating mode, the central motors and peripheral motors may be operated jointly to provide the source of thrust to the personal watercraft. This operating mode may be generally referred to as a hybrid or combination operating mode.

Illustratively, the central motor only operating mode may be suitable for a long-range high-speed cruising as the central motor(s) may be configured to operate for the purpose. Specifically, in some embodiments, the central motors, such as central motors 1*a* and 1*b*, may be configured to provide sufficient horsepower to allow for the cruising of the personal watercraft without need for additional thrust from peripheral motors, such as peripheral motors 11*a* and 11*b*. In this embodiment, a controller may be configured to cause the left and right peripheral motors to engage in a retracted position during operation of the central motors to mitigate drag during operation of the central motors.

Illustratively, the peripheral motor only operating mode may be suitable for lower speed operation of a personal watercraft. In some embodiments, the peripheral motors may be configured with lower horsepower relative to the central motors, such via electric motors. Additionally, the peripheral motors may be configured to allow for directional control and thrust associated with lower speed maneuvering, which can include differences in rotation speed and variations in rotation speed.

Illustratively, the hybrid or combination operating mode may be suitable for at least two situations: Using both of the central motor(s) and the peripheral motors at the same time create more thrust by combining all motors. The peripheral motors can function as booster thrust generators at least for a limited time and less than the top speed of the watercraft. When using the central motor(s) as a power source of propulsion of the watercraft, the peripheral motors may be implemented as power generators such that the movement of the watercraft in the water will create a rotation of armature (rotor) in the peripheral motors connected to the propeller so that the built-in or external battery can be recharged while cruising with the central motor(s). This mode may eliminate the needs of high voltage electric wiring from a separate generator to the peripheral motors, while the electricity to the peripheral motors can still be supplied from an external battery as well.

In accordance with other aspects of the present application, users of the personal watercraft may utilize various controls to operate the motors. More specifically, in accordance with some embodiments of the present application, a user may be presented with a common set of interfaces for controlling the throttling/power levels of the motors and the direction (e.g., steering) of the outboard motors. Such interfaces can include both physical interfaces (e.g., joysticks, levers, steering wheels, etc.), software controls (e.g., graphical user interfaces, etc.), or a combination thereof. Still further, user operation or user interaction with the common set of interfaces may be facilitated independent of a current operating mode (as described above). Accordingly, the same interaction mechanism (e.g., manipulation of physical or virtual control) to elicit power levels and directional controls can be implemented by the user without need to adjust according to a current operation mode of the motors. As will be explained in greater detail below, the translation of such elicited power levels and directional controls may be translated differently to the outboard motors, respectively the central outboard motors and the peripheral outboard motors, based on a current operation mode. Specifically, each of the motors may be associated with an output ratio that measures a current output thrust relative to a maximum thrust value for the individual motor. In some embodiments, that central motors may be associated with much higher maximum thrust values relative to the peripheral motors. In control modes including operation both the central motors and the peripheral motors (e.g., a hybrid control mode), the same control joystick signals (direction and power) may result into different output ratios based on the translated amount of thrust generated by the peripheral motors (e.g., a second propulsion unit) and the central motors (e.g., a first propulsion unit) relative to maximums for the propulsion units. Specifically, in some embodiments, the output ratios associated with the peripheral motors (e.g., the second propulsion units) would be greater than the output ratios associated with the central motors (e.g., the first propulsion units).

In accordance with still further aspects of the present application, users of the personal watercraft may utilize various controls to operate the selection and switching of one or more operating modes. Illustratively, in one aspect, the switching of operating modes corresponds to user-initiated actions via a physical interface, software interface, or a combination thereof. In one example, the switching of the setting can be done by simply physical switches. Optionally, it can be a three-position rotatable setting selector for selecting a specific operating mode. Similarly, in another example, a set of physical switches that can be depressed/activated in a dynamic manner to elicit temporary switching of the operating mode for the duration of the depression or a complete transition of operating mode.

In another example, the user-initiated actions can be implemented through various software-based graphical interfaces. In the case of manual selection, the user can pick and choose the desired setting by selecting on one of icons displayed on a touch screen display. Still further, the user-initiated actions may be elicited through complimentary interfaces on other devices, such as a mobile application on a mobile computing device that present graphical interfaces that either correspond to a similar graphical interface on an instrument panel on the personal watercraft or separate from any interfaces on the personal watercraft. For example, a mobile application may present a simplified interface that provides a streamlined manner to select between operating modes. Still further, in other aspects, the personal watercraft may be configured with additional input devices, such as microphones or vision systems, that allow for a user to provide audio inputs or physical signals that can be translated to user-initiated commands to switch between operating modes. For example, the personal watercraft may be able to access localized or remote processing services that allow for translation of audible commands or physical gestures into commands.

In still other aspects, the switching of operating modes corresponds to automated or predetermined actions. For example, a control unit can be configured with evaluation criteria based on operational attributes of the personal watercraft that be characterized as requiring an automatic change in operation mode. Such processing of operational attributes can include automatic selection made by configuring the control program to respond to signals from a throttle lever or a joystick. The processing of operational attributes can also include selection of operating modes based on battery levels associated with the personal watercraft. In this example, if the peripheral motors correspond to electric motors, the control program may automatically switch the operating mode to either a central motor only (e.g., the first operating mode) or the hybrid operating mode if a calculated battery level become low. Further, the control program may automatically switch operating modes based on a determination that additional thrust is necessary based on some form of user input, detection of environmental metrics (e.g., wind speed, current, etc.), or a combination thereof. Still further, in other embodiments, in a hybrid operating mode, the allocation of thrust between the peripheral motors and the central motors may also be adjusted based on performance metrics, such as output ratios, available power, environmental conditions (e.g., current and wind speeds), and the like.

In still another example, the processing of the operational attributes can correspond to location-based criteria such that the control until may be configured with predetermined criteria that allows for the automated switching of operating modes based on a determined location. In this example, the control unit may be configured to automatically switch to the peripheral only operating mode (e.g., the second operating mode) when a determined location of the personal watercraft indicates proximity to a dock, no wake zone, etc. Similarly, the control unit may be configured to automatically switch to central motor only operating mode when a determined location of the personal watercraft indicates a cruising environment. The location-based criteria may be implemented according to default location information, customized user profiles including the selection of geographic zones (e.g., geofencing) for changing operating modes, or learned behaviors tracking patterns in manual selection of operating modes for future automation. Still further, one or more aspects of the location-based processing can be facilitated with interaction with mobile applications, such as for determination or confirmation of currently calculated locations, user profiles/preferences or communications with additional network-based services.

For the automated configuration of the operating modes, additional aspects of the present application can include the inclusion of user verification or confirmation of the intended switching of operation modes, such as via physical actions, audible commands, physical gestures, and the like. Various other combination of automatic switching of setting can be made and some of are explained below as embodiments.

Figure 2:
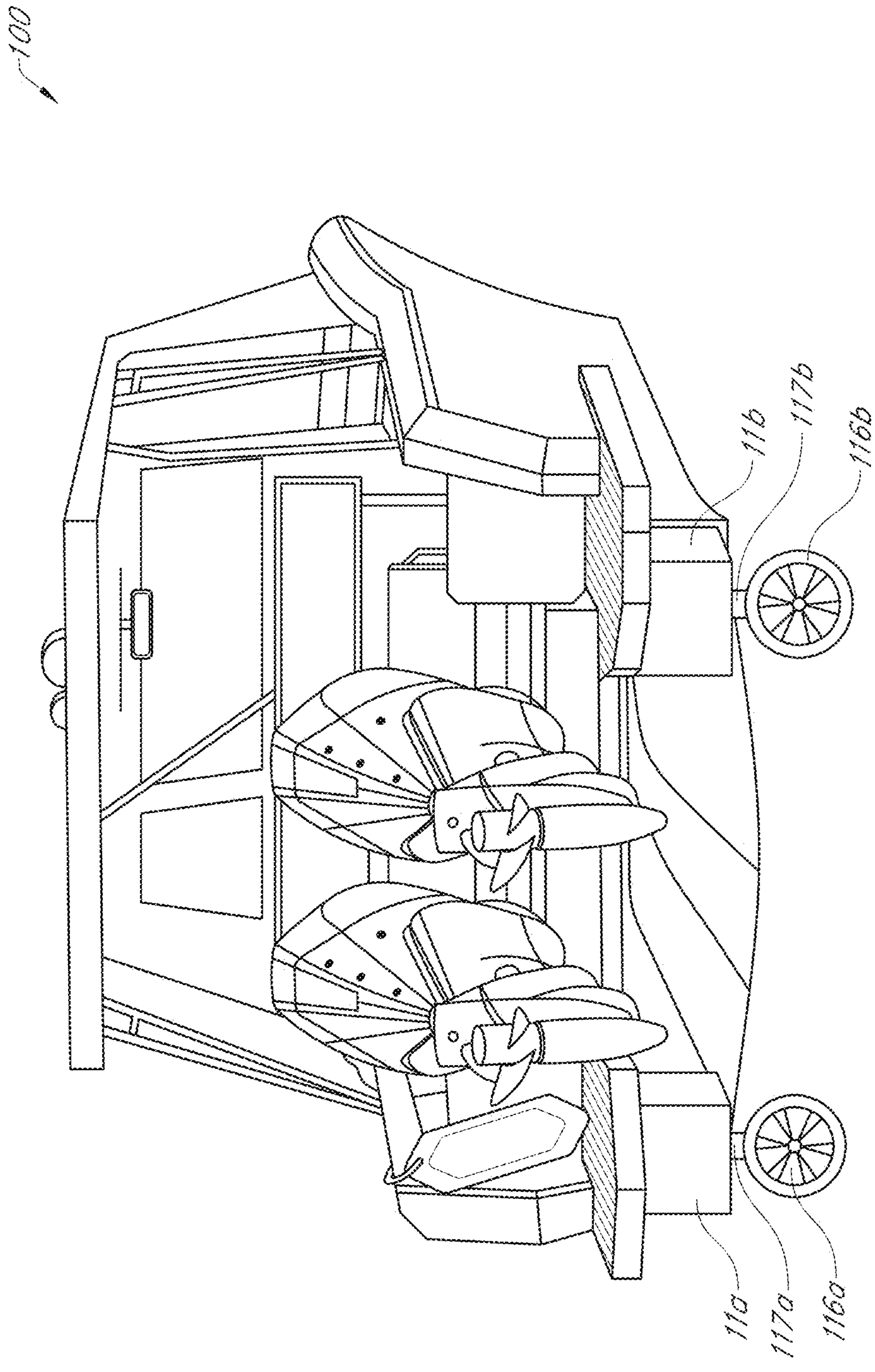
FIG. 2 is a schematic rear view of a watercraft in which a watercraft control system according to a preferred embodiment of the present invention is embedded.

FIG. 2 is a schematic rear view of the watercraft 100 in another one of the three operation settings of this watercraft control system. With reference to the above operating modes, with the operating mode of a peripheral only operating mode, a control unit can deploy the peripheral motors 11*a*, 11*b* and retract the central motors 1*a*, 1*b*. For purposes of illustrative embodiments, the retraction of the central motors will be described. However, such retraction of the central motors may not be required for a peripheral only operating mode, which can vary based on the characteristics of the central motors and availability of retractable components. For example, in some lower speed scenarios, the potential drag presented by the central motors may not be considered sufficient to require a retraction of the central motors.

In this schematic rear view, the central motors 1*a*, 1*b* are both retracted from water engagement by tilting their attitude by around 90 degrees by a tilting mechanism (not shown in the drawings). On the contrary, propellers of the peripheral motors 11*a*, 11*b* are both deployed by extending the support arms (not shown) to engage water that they can produce thrusts with propellers 116*a*, 116*b* to propel the watercraft 100. The peripheral motor 11*a*, 11*b* each has its own retraction mechanism (not shown in the drawings) in the outside enclosure. The retraction mechanism is activated to take either the deployment position or the retraction position by either pushing or pulling supporting rods, extension arms, masts, etc. supporting to the propeller attached to a motor unit. In a retracted position, the peripheral motors 11 may be at least partially obscured to minimize potential drag either enclosed with the watercraft or within a mounting configured to reduce drag. The peripheral motors 11*a*, 11*b* are configured to provide for a full 360-degree rotation of their propellers to rotatably change the direction of thrusts relative to the watercraft. When the retraction mechanism retracts the propellers 116*a*, 116*b* to the outside enclosure of peripheral motors 11*a*, 11*b*, peripheral motors 11*a*, 11*b* have no contact with water so as not to produce any unwanted drag or otherwise minimize drag produced with fully deployed central motor(s).

As previously described, the controller selectable provides the control instructions to the left and right peripheral motors in preference to the central motor responsive to receipt of joystick position signals from the joystick unit during a specified control mode. The preference is selectable based on the switching of setting as explained above. In this regard, users of the personal watercraft may utilize the same interaction mechanisms for operation of the peripheral motors (e.g., throttle and directional controls of the joystick). The controller may be configured with configuration information that cause the translation of the user-initiated actions into control signals that cause the operation of the peripheral motors (e.g., motors 11*a* and 11*b*). In this regard, the configuration information can include processes the normalized the user interaction into an established operating range of the peripheral motors. Such operating range may be different from an operating range of the central motors. For example, a max throttle manipulation of a joystick control may be translated into different control signals for the peripheral motors than a similar control signal for the central motors. In this regard, a user would not need to adjust the physical manipulation of the throttle control based on different power or thrust characteristics of the peripheral motors. As described above, the operating ranges may be defined in terms of absolute numerical values, such as estimated thrust being generated, revolutions of the motor (or props), and the like. The operating ranges may also be defined in terms of relative output ratios that measure a current amount of thrust generated by a motor relative to a maximum thrust value. For example, in some embodiments, the central motors may be associated with higher (including substantially higher) maximum thrust values (individually or collectively) relative to the peripheral motors (individually or collectively). Accordingly, the translated or normalized control instructions may be specified based on output ratios. For example, in a hybrid operating mode, the peripheral and central motors may be operated according to a substantially similar output ratio, which would correspond to higher actual thrust being generated by the central motors relative to the peripheral motors from a common joystick command/instruction. In another example, the controller may wish to have similar actual thrust values from the peripheral motors and the central motors, which would result in the operation of the peripheral and central motors at different output ratios from a common joystick command/instruction. Accordingly, the output ratios associated with the central motors (e.g., the first propulsion units) would be considered lower than the output ratios of the peripheral motors (e.g., the second propulsion units).

Figure 3:
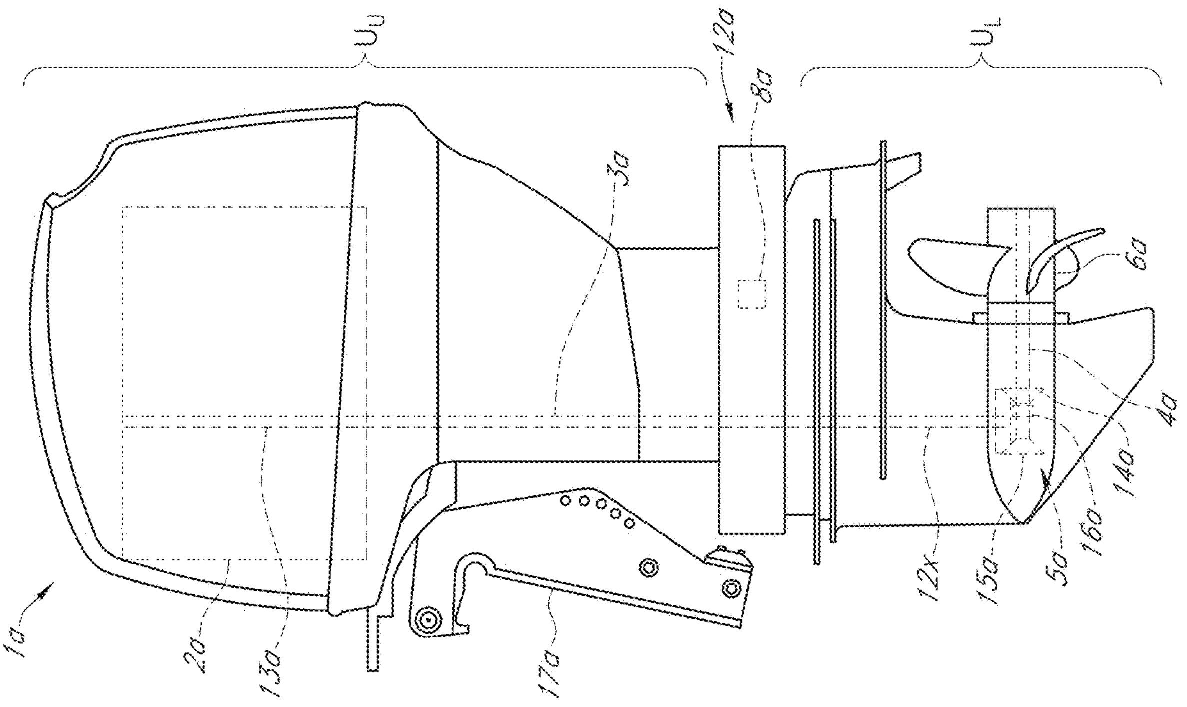
FIG. 3 is a side view of a central motor according to a preferred embodiment of the present invention.

FIG. 3 is a schematic side view of the left central motor 1*a*. A structure of the left central motor 1*a* is hereinafter explained. However, the right central motor 1*b* also preferably has the same or a similar structure to the left central motor 1*a*. In some embodiments, the left and right central motors 1*a*, 1*b* can have propellers 6*a*, 6*b* that rotate in opposite directions or can have a pair of propellers that counter rotate. The left central motor la is preferably attached to the watercraft 100 through a bracket 17*a*. The bracket 17*a* can include the tilt mechanism for tilting the central motor 1*a* about a horizontal axis, for trim adjustments as well as to place the central motors 1*a*, 1*b* in an inactive position, such as corresponding to a peripheral only operating mode as explained above. The tilt mechanism is an electric or hydraulic powered device that includes mechanical gear with a motor, hydraulic or electric plunger, hydraulic or oil pressure jack or the like, that will tilt the central motors from a vertical position to a horizontal position to change its attitude up to about 90 degrees. The maximum change in angle can be decided to make it larger than the difference between the full propulsion operation setting that is most efficient to produce thrust to the hull (as seen in FIG. 1) to inactive operation setting that minimizes operating drag (as seen in FIG. 2). The tilting mechanism attached to the bracket 17*a* can be configured to receive a signal to adjust to a desired angular orientation about the horizontal axis.

Optionally, the bracket 17*a* supports in the upper portion of the left central motor 1*a* in an angular position that is fixed with regard to a vertical axis, relative to a watercraft 100. The left central motor 1*a* can also include a steering unit 12*a* that connects an upper unit $U_U$ to a lower unit $U_L$ and is configured to rotate the lower unit $U_L$ relative to the upper unit $U_U$. For example, the steering unit 12*a* can include a rotatable connection configured to allow the lower unit $U_L$ to rotate about a steering axis 12*x* that can be coincident with the drive shaft 3*a*. Additionally, the steering unit 12*a* can include a steering actuator 8*a*. In some embodiments, the steering unit 12*a* can be referred to as a rotatable connector, the upper unit $U_U$ can be referred to as a stationary portion, and the lower unit $U_L$ can be referred to as a rotatable portion.

For example, the steering actuator 8*a* can be an electric or hydraulic powered device. The steering actuator 8*a* can be configured to receive a signal to drive the lower unit $U_L$ to a desired angular orientation about the steering axis 12*x*. In some embodiments, the steering unit 12*a* can be configured to provide for a full 360-degree rotation of the lower unit $U_L$ relative to the upper unit $U_U$. U.S. Pat. Nos. 9,776,700 and 9,862,473 both disclose hardware for allowing a lower unit to be rotated relative to an upper unit and any of those mechanisms or other mechanisms can be used as the steering unit 12*a*. The entire contents of U.S. Pat. Nos. 9,776,700 and 9,862,473 are hereby incorporated by reference in their entirety.

The left central motor 1*a* preferably includes an engine 2*a*, a drive shaft 3*a*, a propeller shaft 4*a*, and a shift mechanism 5*a*. The engine 2*a* can drive the propeller 6*a* to thereby generate a thrust to propel the watercraft 100. The engine 2*a* includes a crankshaft 13*a*. The crankshaft 13*a* can extend in the vertical direction. The drive shaft 3*a* is connected to the crankshaft 13*a*. The drive shaft 3*a* can extend in the vertical direction. The propeller shaft 4*a* can extend in the front-and-back direction, which can be non-parallel (e.g., perpendicular) to the vertical direction, in some embodiment. The propeller shaft 4*a* is connected to the drive shaft 3*a* through the shift mechanism 5*a*. The propeller 6*a* is attached to the propeller shaft 4*a*. Though an internal combustion engine is used as an example of the engine 2*a*, 2*b* included in the central motor 1*a*, 1*b* other types of power source may be implemented as the engine 2*a*, 2*b*. For example, the engine 2*a*, 2*b* can comprise an electric motor.

The shift mechanism 5*a* preferably includes a forward moving gear 14*a*, a rearward moving gear 15*a*, and a clutch 16*a*. When gear engagement is switched between the gears 14*a*, 15*a* by the clutch 16*a*, the direction of rotation transmitted from the drive shaft 3*a* to the propeller shaft 4*a* is reversed. This is one example technique that can be utilized for switching the direction of movement of the watercraft 100 between forward movement and rearward movement. In some embodiments, the shift mechanism 5*a* can be referred to as a gear shifter.

Illustratively, the peripheral motors 11*a*, 11*b* are driven by electric motors with or without a built-in battery in the enclosure. In the case of without a built-in battery in the enclosure, the battery can be installed inside of the cabin that can share electric power for other electric equipment such as illumination, controller, navigator, refrigerator etc. on the watercraft. An electric motor is used as an example of the peripheral motors 11*a*, 11*b* other types of power source may be implemented as the peripheral motors 11*a*, 11*b*. For example, the peripheral motor 11*a*, 11*b* can comprise a smaller internal combustion engine with a propeller or impeller to produce water jet propulsion as far as it can rotate 360 degrees about a vertical axis. The battery can be charged by an external power source via an electric cable, by an onboard generator, solar generating cells, or self-power generation utilizing the power obtained from water pressure via propellers, such as in a hybrid operating mode as described above.

Figure 4:
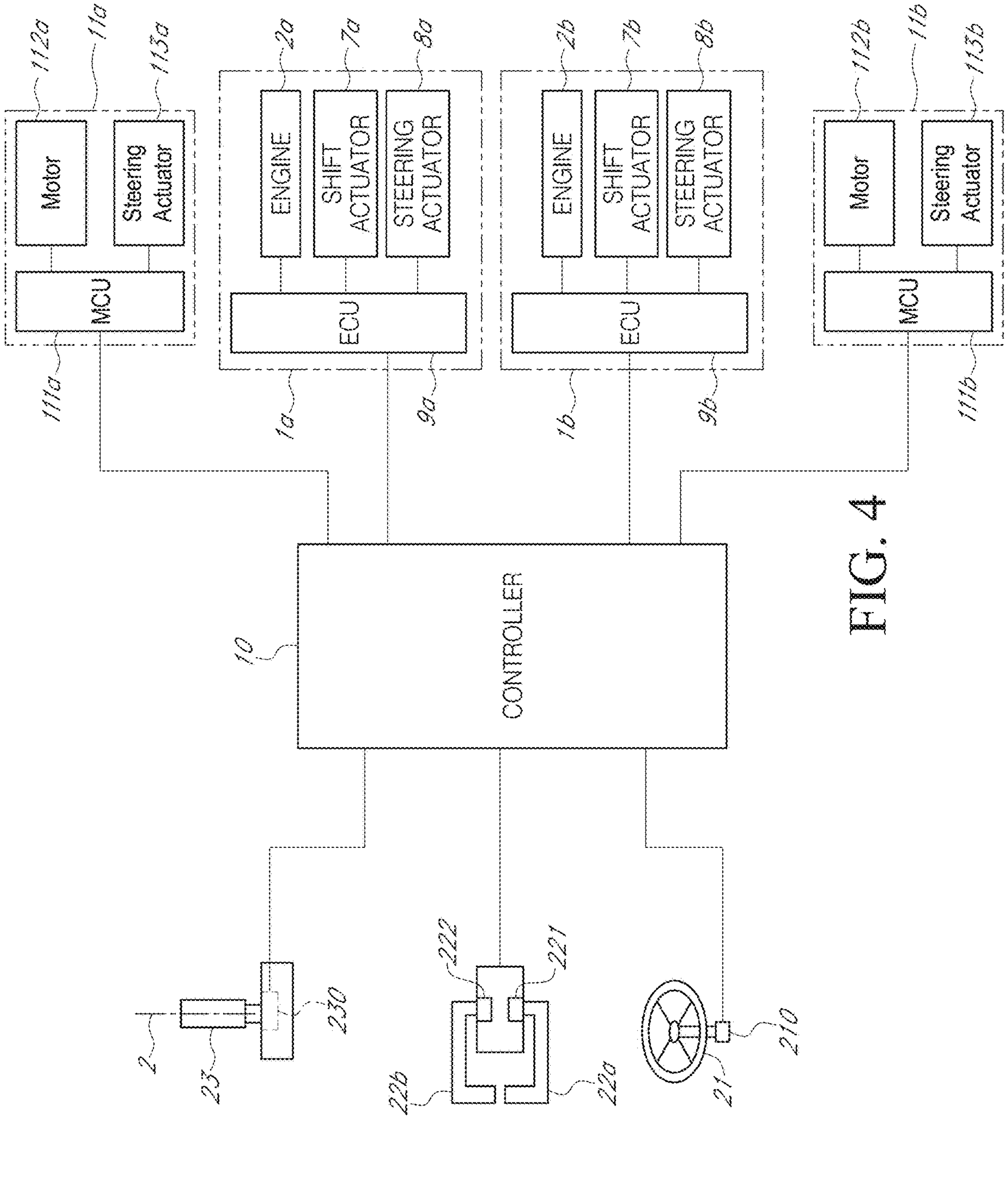
FIG. 4 is a schematic configuration diagram of the watercraft control system.

FIG. 4 is a schematic configuration diagram of a control system of the watercraft 100.

As shown in FIG. 4, the left central motor 1*a* can include a shift actuator 7*a* and a steering actuator 8*a*, and the right central motor 1*b* can include a shift actuator 7*b* and a steering actuator 8*b*. The left peripheral motor 11*a* can include an electric motor 112*a* and steering actuator 113*a*, and the right peripheral motor 12*b* can include an electric motor 112*b* and steering actuator a13*b*.

The shift actuator 7*a* is connected to the clutch 16*a* of the shift mechanism 5*a*. The shift actuator 7*a* actuates the clutch 16*a* so as to switch gear engagement between the gears 14*a*, 15*a*. With this optional technique, movement of the watercraft 100 is thus switched between forward movement and rearward movement. Additionally, movements of the watercraft 100 can be switched between forward and rearward movement by operation of the steering actuator 8*b* so as to turn the lower unit $U_L$ to produce thrust in a rearward direction while the forward gear 14*a* is engaged. Additional modes of operation are described below. The shift actuator 7*a* can preferably comprise an electric motor. It should be noted that the shift actuator 7*a* may alternatively comprise another type of actuator such as, for example, an electric cylinder, a hydraulic motor, a hydraulic cylinder, etc.

With respect to the peripheral motor 11*a*, the movement of the watercraft 100 is switched between forward movement and rearward movement by changing the polarity of voltage from positive to negative or direction of electric current flow applied to the motor 112*a*. For example, positive voltage can rotate the propeller in clockwise and the negative voltage rotates the propeller in counterclockwise directions to produce the thrust in both directions. Additionally, movements of the watercraft 100 can be switched between forward and rearward movement by operation of the steering actuator 113*a* so as to turn the propellers orientation to produce thrust in a rearward direction while the positive current flow. As the propellers can be swiveled about 360 degrees, rotating the motor direction in 180 degrees can direct the thrust in opposite direction.

The steering actuator 8*a* is connected to the left central motor 1*a*. The steering actuator 8*a* rotates the lower unit $U_L$ of the left central motor 1*a* about the steering shaft axis 12*x*. The rudder angle of the left central motor 1*a* can thus be changed. The steering actuator 8*a* preferably comprise an electric motor. It should be noted that the steering actuator 8*a* may alternatively comprise another type of actuator such as, for example, an electric cylinder, a hydraulic motor, a hydraulic cylinder, etc.

The steering actuator 113*a* is connected to the left peripheral motor 11*a*. The steering actuator 113*a* rotates the electric motor 112*a* of the left peripheral motor 11*a* about a vertical axis. The rudder angle of the left peripheral motor 11*a* can thus be changed. The steering actuator 113*a* preferably comprise an electric motor. It should be noted that the steering actuator 113*a* may alternatively comprise another type of actuator such as, for example, an electric cylinder, a hydraulic motor, a hydraulic cylinder, etc.

The left central motor 1*a* includes an electric control unit (ECU) 9*a*. The ECU 9*a* preferably includes a processor such as a CPU and memory such as, for example, a RAM and a ROM. The ECU 9*a* stores a program and data to control the left central motor 1*a*. The ECU 9*a* controls actions of the engine 2*a*, the shift actuator 7*a*, and the steering actuator 8*a*.

The left peripheral motor 11*a* includes a motor control unit (MCU) 111*a*. The MCU 111*a* preferably includes a processor such as a CPU and memory such as, for example, a RAM and a ROM. The MCU 111*a* stores a program and data to control the left peripheral motor ala. The MCU 111*a* controls actions of the motor 112*a* and the steering actuator 113*a*.

As shown in FIG. 4, the right central motor 1*b* preferably includes an engine 2*b*, a shift actuator 7*b*, a steering actuator 8*b*, and an ECU 9*b*. The engine 2*b*, the shift actuator 7*b*, the steering actuator 8*b*, and the ECU 9*b* in the right central motor 1*b* are preferably configured similarly to the engine 2*a*, the shift actuator 7*a*, the steering actuator 8*a*, and the ECU 9*a* in the left central motor 1*a*, respectively.

The right peripheral motor 11*b* preferably includes a motor 112*b*, a steering actuator 113*b*, and an MCU 111*b*. The motor 112*b*, the steering actuator 113*b*, and the MCU 111*b* in the right peripheral motor 11*b* are preferably configured similarly to the motor 112*a*, the steering actuator 113*a*, and the MCU 111*a* in the left central motor 1*a*, respectively.

The control system includes a steering wheel 21, throttle levers 22*a*, 22*b*, and a joystick 23. As shown in FIG. 1, the steering wheel 21, the throttle levers 22*a*, 22*b*, and the joystick 23 are disposed in a cockpit 20 of the watercraft 100.

The steering wheel 21 is a device that allows an operator to operate the watercraft 100 in a truing or operating direction. The steering wheel 21 includes a sensor 210. The sensor 210 outputs a signal indicating the operating direction and an operating amount (e.g., a rotation angle) of the steering wheel 21.

The throttle levers 22*a*, 22*b* can include a first lever 22*a* and a second lever 22*b*. The first lever 22*a* can comprise a device that allows the operator to regulate the magnitude of a thrust generated by the left central motor 1*a*. In some embodiments, the thrust generated by the left central motor 1*a* can depend at least in part on a throttle level controlled by the operator through the first lever 22*a* and a gear position. The first lever 22*a* can comprise a device that allows the operator to switch the direction of the thrust generated by the left central motor 1*a* between forward and rearward directions. The first lever 22*a* can be disposed to be operable from a neutral position to a forwardly moving directional side and a rearward moving directional side. The first lever 22*a* includes a sensor 221. The sensor 221 outputs a signal indicating an operating direction and an operating amount (e.g., a displacement from the neutral position) of the first lever 22*a*.

The second lever 22*b* can comprise a device that allows the operator to regulate the magnitude of a thrust generated by the right central motor 1*b*. The second lever 22*b* can comprise a device that allows the operator to switch the direction of the thrust generated by the right central motor 1*b* between forward and rearward directions. The second lever 22*b* can be disposed to be operable from a neutral position to a forwardly moving directional side and a rearward moving directional side. The second lever 22*b* includes a sensor 222. The sensor 222 outputs a signal indicating an operating direction and an operating amount (e.g., a displacement from the neutral position) of the second lever 22*b*.

The joystick 23 can comprise a device that allows the operator to operate the movement of the watercraft 100 in each of the moving directions of front, rear, right and left. The joystick 23 can comprise a device that allows the operator to operate the bow turning motion of the watercraft 100. The joystick 23 is tiltable in multi-directions. For example, the joystick can be configured to tilt in at least four directions including front, rear, right and left. It should be noted that four or more directions, and furthermore, all directions may be instructed by the joystick 23.

Moreover, the joystick 23 is preferably disposed to be turnable about a rotational axis Z. The joystick 23 includes a sensor 230. The sensor 230 outputs a propulsion signal indicating the tilt direction and a tilt amount (e.g., a tilt angle) of the joystick 23. The sensor 230 outputs a bow turning signal indicating a twist direction and a twist amount (e.g., a twist angle) of the joystick 23.

The control system includes a controller 10. The controller 10 preferably includes a processor such as a CPU and memory such as a RAM and an ROM, for example. The controller 10 stores a program and data used to control the right and left central motors 1*b*, 1*a* as well as the right and left peripheral motors 11*a*, 11*b*. The controller 10 is connected to the ECUs 9*a*, 9*b* and MCUs 111*a*, 111*b* through wired or wireless communication. The controller 10 is connected to the steering wheel 21, the throttle levers 22*a*, 22*b*, and the joystick 23 through wired or wireless communication.

The controller 10 receives signals from the sensors 210, 221, 222, 230. The controller 10 outputs command signals to the ECUs 9*a*, 9*b* and MCUs 111*a*, 111*b* based at least in part on the signals from the sensors 210, 221, 222, 230 depending on the three operating modes. As described above, the operating modes may be selected based on manual selection interfaces (physical, software or combination) or automatic selection based on configuration of control programs.

For example, in operating modes including the operation of the central motor (e.g., the central motor only or hybrid operating modes), the controller 10 outputs a command signal to the shift actuator 7*a* in accordance with the operating direction of the first lever 22*a*. Movement of the left central motor 1*a* is thus switched between forward movement and rearward movement. The controller 10 outputs a command signal to the engine 2*a* in accordance with the operating amount of the first lever 22*a*. An engine rotational speed of the left central motor 1*a* is thus controlled.

In operating modes including the operation of the peripheral motors (e.g., the peripheral motor only or hybrid operating modes), the controller 10 outputs a command signal to the MCU 111*a*. Movement of the left peripheral motor 11*a* is thus determined between forward movement and rearward movement as well as the direction and thrust amount. The controller 10 outputs a command signal to the MCU 111*a* includes operating amount of the first lever 22*a*. The motor rotational speed of the left peripheral motor 11*a* is thus controlled.

It should be noted that in this description of embodiments, the specification of operating modes, central only operating mode, peripheral only operating mode or hybrid operating mode, has been described in detail. Accordingly, for simplicity, the description of the operation of the central motors or peripheral motors should be interpreted in accordance with the various operating modes described above and will not be specifically referenced in each illustrative example below.

The controller 10 outputs a command signal to the shift actuator 7*b* in accordance with the operating direction of the second lever 22*b*. Movement of the right central motor 1*b* is thus switched between forward movement and rearward movement. The controller 10 outputs a command signal to the engine 2*b* in accordance with the operating amount of the second lever 22*b*. An engine rotational speed of the right central motor 1*b* is thus controlled.

The controller 10 outputs a command signal to the MCU 111*b*. Movement of the right peripheral motor 11*b* is thus determined between forward movement and rearward movement as well as the direction and thrust amount. The controller 10 outputs a command signal to the MCU 111*b* includes operating amount of the first lever 22*b*. The motor rotational speed of the left peripheral motor 11*b* is thus controlled.

The controller 10 outputs command signals to the steering actuators 8*a* and 8*b* in accordance with the operating direction and the operating amount of the steering wheel 21. When the steering wheel 21 is operated leftward from the neutral position, the controller 10 controls the steering actuators 8*b*, 8*a* such that the right and left central motors 1*b*, 1*a* are rotated rightward thereby enabling the watercraft 100 to turn, for example, in a leftward direction. When the steering wheel 21 is operated rightward from the neutral position, the controller 10 controls the steering actuators 8*b*, 8*a* such that the right and left central motors 1*b*, 1*a* are rotated leftward thereby enabling the watercraft 100 to turn, for example, in a rightward direction. The controller 10 can control the rudder angles of the right and left central motors 1*b*, 1*a* in accordance with the operating amount of the steering wheel 21.

The controller 10 outputs command signals to the steering actuators 113*a* and 113*b* in accordance with the operating direction and the operating amount of the steering wheel 21. When the steering wheel 21 is operated leftward from the neutral position, the controller 10 controls the steering actuators 113*a*, 113*b* such that the right and left peripheral motors 11*b*, 11*a* are rotated rightward thereby enabling the watercraft 100 to turn, for example, in a leftward direction. When the steering wheel 21 is operated rightward from the neutral position, the controller 10 controls the steering actuators 113*a*, 113*b* such that the right and left peripheral motors 11*b*, 11*a* are rotated leftward thereby enabling the watercraft 100 to turn, for example, in a rightward direction. The controller 10 can control the rudder angles of the right and left peripheral motors 11*b*, 11*a* in accordance with the operating amount of the steering wheel 21.

Optionally, in some embodiments, the controller 10 can be configured to operate in two different modes, one associated with the use of the steering wheel 21 and the throttle levers 22*a*, 22*b* and another mode of operation associated with use of the joystick 23. In some embodiments, the mode of operation associated with the use of the steering wheel 21 and the throttle levers 22*a*, 22*b* can be configured to provide a more conventional watercraft propulsion control technique. For example, although the central motors 1*a*, 1*b* can included a mechanism for an enlarged rudder angle steering range, such as over 180°, up to 360°. The controller 10 can be configured to limit the rudder angles achievable with the steering wheel 21. For example, in some embodiments, when the controller 10 is operating in the first mode of operation, the controller 10 operates the steering actuators 8*a* so that the rudder angles of the outboard motors 1*a*, 1*b* remain within 30° of straight ahead, for example, within 30° to the right and 30° to the left. This is a steering angle range that is common with conventional outboard motors that steer with a steering bracket. In this mode of operation, the engines 2*a*, 2*b* and shift actuators 7*a*, 7*b* can be controlled with the throttle levers 22*a*, 22*b* as described above. This can improve the comfort of steering wheel operations for a user.

In a second mode of operation, in which the thrust generated by the outboard motors 1*a*, 1*b* is controlled by the joystick 23, the controller 10 can allow for the rudder angles of the outboard motors 1*a*, 1*b* to be adjusted through a larger range of movement, for example, more than 30°, more than 180°, or a full 360°.

In the case of the peripheral motors 11*a*, 11*b* is controlled by the joystick 23, the controller 10 can allow for the rudder angles of the peripheral motors 11*a*, 11*b* to be adjusted through a full 360°. This configuration further improves the comfort of steering the watercraft 100 in a desired direction with a desired speed in relatively lower speed movement when docking the watercraft to the harbor or another boat or approaching designated spot for fishing or picking up a swimmer etc., especially in the Setting P.

The controller 10 also outputs command signals to the engines 2*a*, 2*b*, the shift actuators 7*a*, 7*b*, and the steering actuators 8*a*, 8*b* in accordance with the tilt direction and the tilt amount of the joystick 23. The controller 10 controls the engines 2*a* and 2*b*, the shift actuators 7*a* and 7*b*, and the steering actuators 8*a* and 8*b* such that translation (linear motion) of the watercraft 100 is made at a velocity corresponding to the tilt amount of the joystick 23 in a direction corresponding to the tilt direction of the joystick 23. Additionally, the controller 10 controls the engines 2*a*, 2*b*, the shift actuators 7*a*, 7*b*, and the steering actuators 8*a*, 8*b* such that the watercraft 100 turns the bow at an angular velocity corresponding to the twist amount of the joystick 23 in a direction corresponding to the twist direction of the joystick 23.

The controller 10 also outputs command signals to the motors 112*a*, 112*b* and the steering actuators 113*a*, 113*b* in accordance with the tilt direction and the tilt amount of the joystick 23. The controller 10 controls the motors 112*a*, 112*b* and the steering actuators 113*a*, 113*b* such that translation (linear motion) of the watercraft 100 is made at a velocity corresponding to the tilt amount of the joystick 23 in a direction corresponding to the tilt direction of the joystick 23. Additionally, the controller 10 controls the motors 112*a*, 112*b* and the steering actuators 113*a*, 113*b* such that the watercraft 100 turns the bow at an angular velocity corresponding to the twist amount of the joystick 23 in a direction corresponding to the twist direction of the joystick 23.

Processing executed by the controller 10 in accordance with an operation of the joystick 23 will be hereinafter explained in detail. In the following explanation, the term "composite operation" refers to a condition in which a bow turning operation and any one of forward (or rearward) and a lateral moving operation are both ongoing for the watercraft 100. In other words, the term "composite operation" means that the twist operation about the rotational axis Z and the tilt operation are both ongoing for the joystick 23. On the other hand, the term "sole operation" refers to a condition that only one of the bow turning operation, the forward (or rearward) moving operation, or the lateral moving operation is ongoing for the watercraft 100. In other words, the term "sole operation" means that only one of the twist operation about the rotational axis Z and the tilt operation is ongoing for the joystick 23.

The controller 10 determines which of the composite operation and the sole operation is ongoing based at least in part on the signal from the joystick 23. The controller 10 determines that the composite operation of bow turning and forward, rearward or lateral propulsion is ongoing when receiving both the propulsion signal indicating the tilt operation of the joystick 23 and the bow turning signal indicating the twist operation of the joystick 23. The controller 10 determines that the sole operation of bow turning is ongoing when receiving the bow turning signal without receiving the any of the forward, rearward or lateral propulsion signals. The controller 10 determines that the sole operation of propulsion is ongoing when receiving the forward, rearward, or lateral propulsion signals without receiving the bow turning signal.

The controller 10 can be configured to operate the outboard motors 1*a*, 1*b*, 11*a*, 11*b* so as to provide a continuous proportional response to movements of the joystick 23, stepwise operation of the outboard motors based at least in part on movements of the joystick 23, or a limited number of predetermined operational modes. Additionally, the controller 10 can be configured to accept pulsed inputs to the joystick 23 and to hold an operational condition of the outboard motors 1*a*, 1*b*, 11*a*, 11*b* when the joystick 23 is pulsed and released, for example, when the joystick 23 is "tapped" by an operator. In such a tapping mode of operation, the controller 10 can be configured to cycle the operational parameters of the outboard motors 1*a*, 1*b*, 11*a*, 11*b* through a series of particular operational states which may be predetermined.

For example, the controller 10 can divide forward movement of the watercraft 100 into ten (10) steps of forward propulsion and thus ten (10) taps of the joystick 23 in the forward direction would cause the controller 10 to cycle through ten (10) different operational states of increasing the forward propulsion, for example, between 0% forward propulsion to 100% forward propulsion. In some embodiments, the controller 10 can include an integrator unit configured to integrate one or more inputs from the joystick 23 over time, to produce a more gradual response to movements of the joystick 23. In some embodiments, the controller can be configured to change the operational states of the outboard motors 1*a*, 1*b* in proportional response to the integrated signal from the joystick sensor 230, and hold the then current operational stats of the outboard motors 1*a*, 1*b*, 11*a*, 11*b* when the joystick 23 is released by a user and returned to its default position; a position that otherwise corresponds to a request for no propulsion. Other optional modes of operation are described below.

As previously described, in accordance with still further aspects of the present application, users of the personal watercraft may utilize various controls to operate the selection and switching of one or more operating modes. Illustratively, in one aspect, the switching of operating modes corresponds to user-initiated actions via a physical interface, software interface, or a combination thereof In one example, the switching of the setting can be done by simply physical switches. Optionally, it can be a three-position rotatable setting selector for selecting a specific operating mode. Similarly, in another example, a set of physical switches that can be depressed/activated in a dynamic manner to elicit temporary switching of the operating mode for the duration of the depression or a complete transition of operating mode.

In another example, the user-initiated actions can be implemented through various software-based graphical interfaces. In the case of manual selection, the user can pick and choose the desired setting by selecting on one of icons displayed on a touch screen display. Still further, the user-initiated actions may be elicited through complimentary interfaces on other devices, such as a mobile application on a mobile computing device that present graphical interfaces that either correspond to a similar graphical interface on an instrument panel on the personal watercraft or separate from any interfaces on the personal watercraft. For example, a mobile application may present a simplified interface that provides a streamlined manner to select between operating modes. Still further, in other aspects, the personal watercraft may be configured with additional input devices, such as microphones or vision systems, that allow for a user to provide audio inputs or physical signals that can be translated to user-initiated commands to switch between operating modes. For example, the personal watercraft may be able to access localized or remote processing services that allow for translation of audible commands or physical gestures into commands.

In still other aspects, the switching of operating modes corresponds to automated or predetermined actions. For example, a control unit can be configured with evaluation criteria based on operational attributes of the personal watercraft that be characterized as requiring an automatic change in operation mode. Such processing of operational attributes can include automatic selection made by configuring the control program to respond to signals from a throttle lever or a joystick. The processing of operational attributes can also include selection of operating modes based on battery levels associated with the personal watercraft. In this example, if the peripheral motors correspond to electric motors, the control program may automatically switch the operating mode to either a central motor only (e.g., the first operating mode) or the hybrid operating mode if a calculated battery level become low. As described above, in still other embodiments, the operating parameters of the motors, such as in a hybrid operating mode incorporating second propulsion units (e.g., a plurality of peripheral motors) and second propulsion units (e.g., a plurality of central motors) may be further adjusted based on such operating metrics, including the modification of output ratios or allocation of thrust between propulsion units.

In still another example, the processing of the operational attributes can correspond to location-based criteria such that the control until may be configured with predetermined criteria that allows for the automated switching of operating modes based on a determined location. In this example, the control unit may be configured to automatically switch to the peripheral only operating mode (e.g., the second operating mode) when a determined location of the personal watercraft indicates proximity to a dock, no wake zone, etc. Similarly, the control unit may be configured to automatically switch to central motor only operating mode when a determined location of the personal watercraft indicates a cruising environment. The location-based criteria may be implemented according to default location information, customized user profiles including the selection of geographic zones (e.g., geofencing) for changing operating modes, or learned behaviors tracking patterns in manual selection of operating modes for future automation. Still further, one or more aspects of the location-based processing can be facilitated with interaction with mobile applications, such as for determination or confirmation of currently calculated locations, user profiles/preferences or communications with additional network-based services.

For the automated configuration of the operating modes, additional aspects of the present application can include the inclusion of user verification or confirmation of the intended switching of operation modes, such as via physical actions, audible commands, physical gestures, and the like.

Figure 5B:
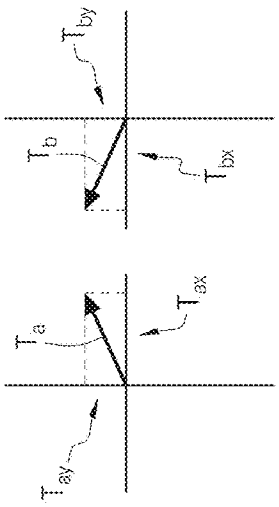
FIG. 5B is a schematic diagram showing control of the peripheral motors in a first mode of operation for forward movement.
Figure 5B:
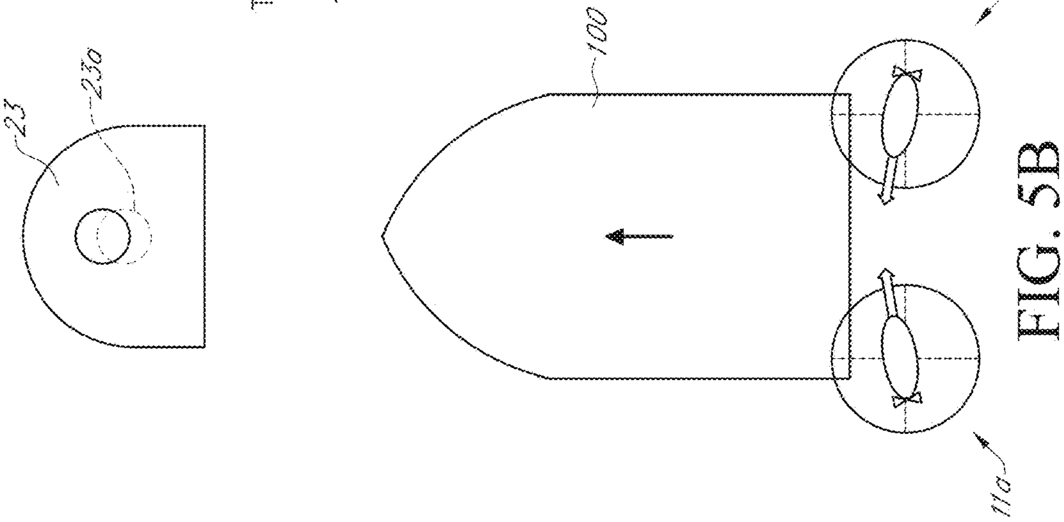
Figure 5A:
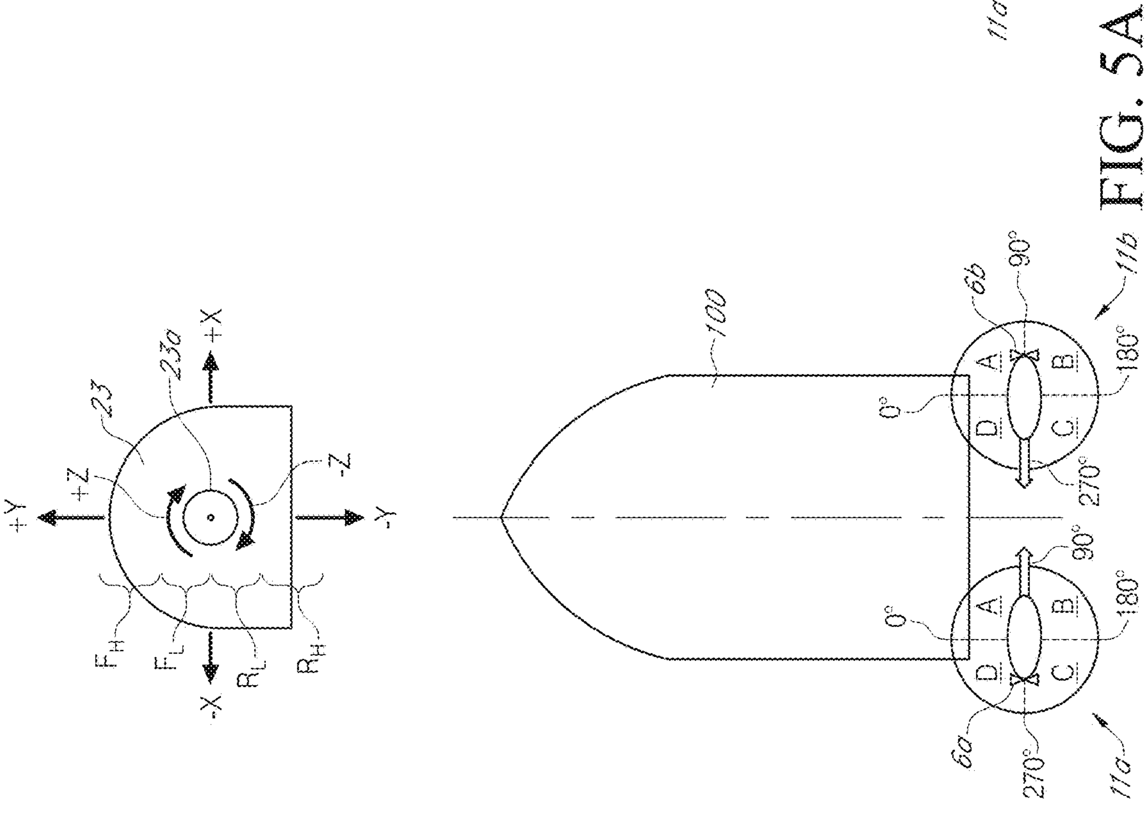
FIG. 5A is a schematic diagram showing control of the outboard motors in a no-thrust operation.

FIG. 5A is a schematic diagram showing an optional control of the outboard motors 1*a*, 1*b* and/or 11*a*, 11*b* in a sole operation of no propulsion. Although the drawing only shows the peripheral outboard motors 11*a*, 11*b* in the figures, the same control will be given to the central outboard motors 1*a*, 1*b* depending on the operating mode In this mode, the joystick 23 is maintained in its default position 23*a* which can be centered in its range of movements and is not twisted about the z axis. As noted above, the joystick 23 can be tiltable. For example, the joystick 23 can tilt forward and rearward along the y axis. As shown in FIG. 5A, +y can correspond to forward movement and −y can correspond to rearward movement. For example, the joystick 23 can move (e.g., tilt) laterally along the x axis. As shown in FIG. 5A, +x can correspond to movement in the rightward direction and −x can correspond to movement in the leftward direction. The joystick 23 is also twistable about the z axis. As shown in FIG. 5A, +z can correspond to clockwise rotation of the joystick 23 and −z can correspond to counterclockwise rotation of the joystick 23.

In the mode of operation illustrated in FIG. 5A, the controller 10 is operating in a no-propulsion mode. In this mode, the shift actuators 7*a* and 7*b* maintain the outboard motors 1*a*, 1*b* in a drive gear, for example but without limitation, the forward gear 14*a* engaged with the drive shaft 3*a* so that the propellers 6*a*, 6*b* are rotating continuously and generating thrust. In this mode of operation, the steering actuators 8*a*, 8*b* can be operated to rotate the outboard motors 1*a*, 1*b* such that the rudder angles are opposed (e.g., directly opposed) so as to generate thrust in opposed orientations (e.g., directly opposed orientations). For purposes of explanation, the lower units $U_L$ can be rotated relative to the upper units $U_U$ such that the propellers 6a, 6b are rotated to desired angles. As used in the present Specification, for explaining the orientations of the lower units $U_L$ of the outboard motors 1a, 1b, 0 degrees will be referred to as a straight ahead direction, e.g., parallel with the longitudinal axis L of the watercraft 100. Going clockwise from 0 degrees in 90 degree increments provides 90 degrees at the far right edge, 180 degrees directed rearwardly and 270 degrees at the left edge. As such, the range of movement of each of the outboard motors 1a, 1b can be considered as being divided into four quadrants, quadrant A extending from zero degrees to 90 degrees, quadrant B extending from 90 degrees to 180 degrees, quadrant C extending from 180 degrees to 270 degrees, and quadrant D extending from 270 degrees to 360 degrees (which is also 0 degrees). As used herein, the term "directly opposed" can mean where the rudder angles point directly at each other, for example, the left outboard motor 1a is at 90 degrees and the right outboard motor 1b is at 270 degrees, or where the rudder angles point in directly opposite directions, i.e., the left outboard motor 1a is at 270 degrees and the right outboard motor 1b is at 90 degrees. In either case, all or substantially all thrust can be cancelled. Additionally, as used herein, "partly opposed" can mean where the rudder angles of the outboard motors 1a, 1b are pointed partly toward or party away from each other, which thereby cancels some or all of the x-component thrust and/or the y-component thrust from each outboard motor.

In the present mode of operation illustrated in FIG. 5A, where the joystick 23 is in its default position, the controller 10 controls the peripheral motors 11a, 11b to produce the same amount of thrust in opposite directions as shown in the case of Setting P. With respect to the central motors 1a, 1b, the shift actuator 7a, 7b to maintain the outboard motors 1a, 1b in the forward gear 14a, at idle speed and additionally controls the steering actuators 8a, 8b so as to direct the lower units $U_L$ of the outboard motors 1a, 1b at Setting C and H, to face toward each other, in other words, with the propellers of the peripheral motors 11a, 11b oriented at about 270 degrees and about 90 degrees, respectively so as to be substantially directly opposed to each other. In this orientation, with the propellers 6a, 6b, 116a, 116b spinning and generating thrust, all or substantially all the thrust generated by each propeller 6a, 6b, 116a, 116b is cancelled because they are directed in opposing directions and are generating approximately the same amount of thrust as both outboard motors 1a, 1b, 11a, 11b are operated at idle speed. In some conditions, the controller 10 in the no-propulsion mode can maintain the watercraft 100 to be stationary and to have no propulsion.

FIG. 5B is a schematic diagram showing control of the peripheral motors 11a, 11b in the sole operation of forward propulsion, at a sub-idle watercraft speed. In FIG. 5B, the joystick 23 is tilted in the forward direction by a first amount in the +y direction. In this case, the controller controls each of the left and right peripheral motors 11a, 11b to generate a first amount of thrust in the forward moving direction. The watercraft 100 thus moves forward.

The controller 10 can be configured to recognize ranges of movement of the joystick 23 as corresponding to different ranges of intended or requested watercraft thrust. For example, with reference to FIG. 5A, a measure of tilt of the joystick 23 in the forward direction can be specified relative to the default position 23a. More specifically, the measure of tilt in the forward direction can be characterized or defined according to a first range $F_L$, from the default position of 23a, through the position illustrated in FIG. 5C (e.g., a first zone). Additionally, the measure of tilt in the forward direction can be characterized or defined according to a second range $F_H$, from the position of FIG. 5C to the position of FIG. 5D. Additionally, the measure of tilt of the joystick 23 in the rearward direction can be specified relative to the default position 23a. More specifically, the measure of tilt in the rearward direction can be characterized or defined according to a first range $R_L$, from the default position of 23a, through the position illustrated in FIG. 6B. Additionally, the measure of tilt in the forward direction can be characterized or defined according to a second range $R_H$, from the position of FIG. 6B to the position of FIG. 6C. The controller 10 can be configured to recognize joystick positions (or tilt) characterized as being within the first range $F_L$ as a request for forward propulsion at sub idle watercraft speeds and joystick positions (or tilt) characterized as being within the second range $F_H$ as a request for forward propulsion at super idle watercraft speeds. The position of FIG. 5C can be considered as residing in the super idle watercraft speed $F_H$ range. Similarly, the controller 10 can be configured to recognize joystick positions (or tilt) characterized as being within the first range $R_L$ as a request for reverse propulsion at sub idle watercraft speeds and joystick positions (or tilt) characterized as being within the second range $F_H$ as a request for reverse propulsion at super idle watercraft speeds.

In the first mode of sole forward propulsion of FIG. 5B, the peripheral motors 11a, 11b can be operated to continue operating at idle speed to generate thrust in the forward direction. For central motor 1a, 1b, the steering actuators 8a, 8b are operated to turn the lower units $U_L$ of the central motors 1a, 1b so that the rudder angles point more forward than the position of FIG. 5A. Thus, the lower unit $U_L$ of the central motor 1a points towards quadrant A and the lower unit $U_L$ of central motor 1b points towards quadrant D. As such, a portion of the thrust generated by each outboard motor 1a, 1b, 11a, 11b can be cancelled by the other. However, there remains a net positive amount of forward thrust for moving the watercraft 100 forward.

Various aspects of the present disclosure can include the realization that by controlling outboard motors in this way, a watercraft speed that is slower than the maximum watercraft speed obtainable during idle operation of the central motors 1a, 1b with the rudder angles at 0 degrees can be achieved, which can be desirable for trolling or docking maneuvers. This is because, as noted above, some of the thrust generated by each outboard motor 1a, 1b is cancelled by the thrust generated by the other outboard motor 1a, 1b because the lower units $U_L$ are directed partially toward each other, thereby cancelling some of the thrust created. However, because the lower units $U_L$ of the outboard motor 1a, 1b are not directly opposed to each other, there is a net positive amount of thrust, in this case, in the forward direction. As used herein, the term "idle watercraft speed" refers to a steady state. For example, the idle watercraft speed can be a steady state at the maximum watercraft speed obtainable during idle operation, with the rudder angles at 0 degrees. The term "sub idle watercraft speed" refers to watercraft speeds that are less than idle watercraft speed. The term "super idle watercraft speed" can be considered as including idle watercraft speeds and higher speeds.

In the case of peripheral motors 11a, 11b the net speed control or producing super idle watercraft speed is relatively easier in comparison with the central motors 1a, 1b, as electric motors are easily generated slower speed of rotation as there is no idling threshold that combustion engines stop running below the certain rotational speed. As a result, it is possible to direct the propeller direction to generate the vessel thrust forward with low speed instead of some of thrust created canceling each other. However, by maintaining the rotational speed of motors 112*a*, 112*b* at certain constant speed, it will be smoother to control the movement of the watercraft 100 in various directions.

With reference to FIG. 5B1, in the orientation illustrated in FIG. 5B, the left outboard motor 1*a* produces a thrust Ta and the outboard motor 1*b* generates a thrust Tb. Broken down into x and y components, the thrust Ta has a positive y component Tay and a positive x thrust component Tax. Similarly, the outboard motor 1*b* produces the thrust Tb with a positive y thrust component Tby but a negative x component Tbx. With the central motors 1*a*, 1*b* both in the forward gear 14*a* and operating at idle speed, the magnitudes of thrust Ta and Tb are theoretically equal, however, with an opposite x component. Thus, the x components of the thrusts produced by the outboard motors 1*a*, 1*b* (Tax and Tbx) cancel each other out. The resulting net thrust produced in its mode of operation is thus Tay plus Tby, which is a net positive forward thrust.

As explained above, it is optional to constantly maintain the rotational speed of motors 112*a*, 112*b* and canceling the part of generated thrust or reducing the rotational speed by controlling the amount of electricity to supply to the motors 112*a*, 112*b* based on the maneuverability and energy consumption concerns.

Figure 5D:
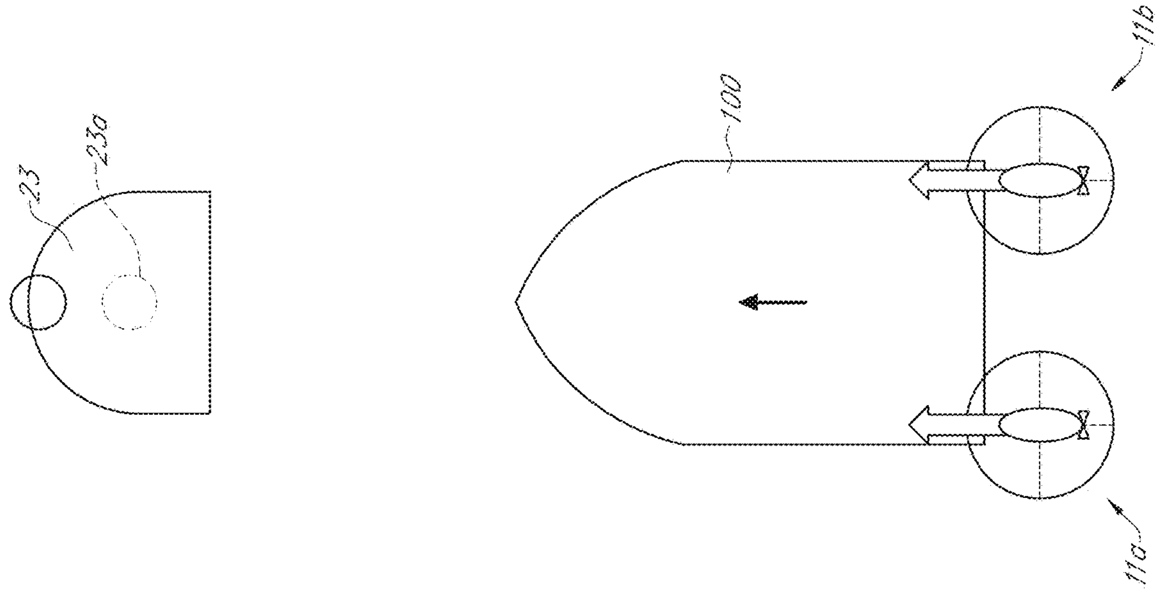
FIG. 5D is a schematic diagram showing control of the peripheral motors in a third mode of operation for forward movement.
Figure 5C:
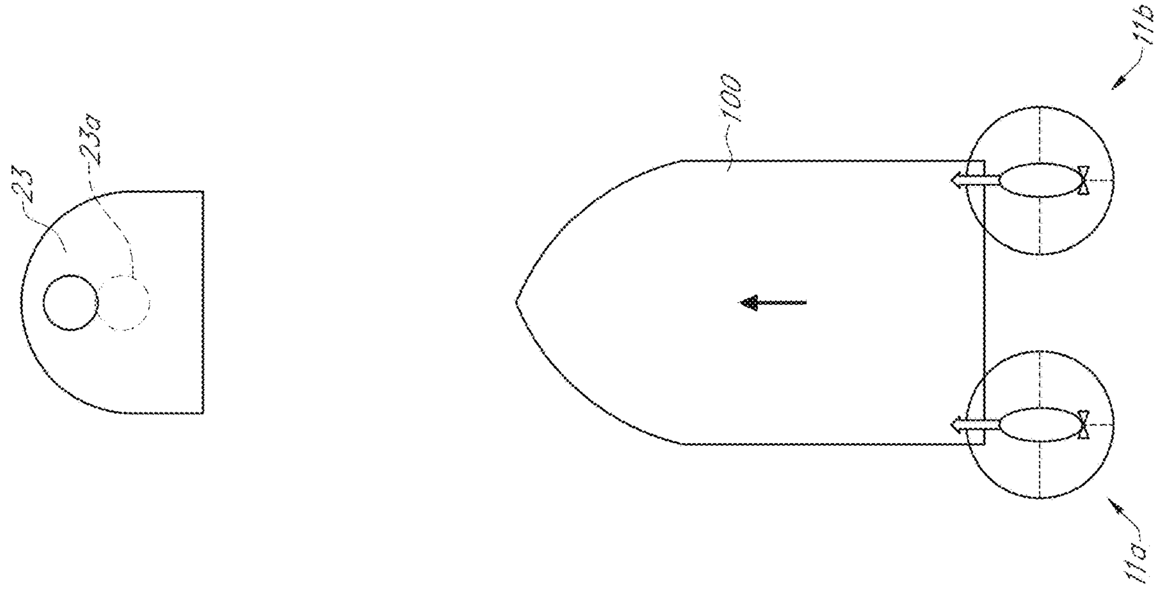
FIG. 5C is a schematic diagram showing control of the peripheral motors in a second mode of operation of forward movement.

FIG. 5C is a schematic diagram showing control of the outboard motors 1*a*, lb in a second forward, sole operation mode for propulsion. In FIG. 4C, the joystick 23 is tilted to a further forward position than that illustrated in FIG. 5B, between the position illustrated in FIG. 5B and a maximum forward deflection position (illustrated in FIG. 5D). In this case, the controller 10 controls the steering actuators 8*a*, 8*b*, 113*a*, 113*b* to adjust the rudder angles to orientate the lower units $U_L$ of the outboard motors 1*a*, 1*b* or propellers 116*a*, 116*b* to a full forward position, e.g., pointing at zero degrees. As such, the rudder angles of the left and right outboard motors 1*a*, 1*b* are both zero degrees. As such, the watercraft 100 would move ahead in a forward direction, at an idle watercraft speed. In some embodiments, the controller 10 can be configured to control the rudder angles of the outboard motors 1*a*, 1*b* in accordance with a lateral, leftward and rightward tilting of the joystick 23, in some modes of operation.

As noted above, the controller 10 can be configured to provide for a proportional change in forward thrust produced by gradually adjusting the rudder angles of the outboard motors 1*a*, 1*b* between the position illustrated in FIG. 5A and the position illustrated in FIG. 5C (FIG. 5B illustrating an intermediate position therebetween) in response to detected positions of the joystick 23 (or integrated detection signals thereof) falling in the range $R_L$. The controller 10 can be configured to provide for any number of particular steps (e.g., predetermined steps) of rudder angles corresponding to joystick positions in the $R_L$ range, between the rudder angles illustrated in FIGS. 5A and 5C or continuous proportional adjustments, for example, based at least in part on a magnitude of deflection of the joystick 23 from the default position 23*a* and the position illustrated in FIG. 5C. Further, the controller 10 can include an integrator module (not shown) for integrating the detected position of the joystick 23 to provide an integrated position signal value. Integrator modules are well known in the art. The position of the joystick 23 detected by sensor 230 can be input into a commonly available integrator module as a source value (Integrand) and an amount of time (Divisor) can be selected to provide the desired responsiveness in the system.

FIG. 5D is a schematic diagram showing control of the outboard motors 1*a*, 1*b*, 11*a*, 11*b* in a third mode of sole operation for forward movement. In this mode, the rudder angles of the left and right outboard motors 1*a*, 1*b* remain at zero degrees. However, in this mode of operation, the joystick 23 has been moved to its full forward position, e.g., 100% of its range of movement. In this case, the controller 10 controls the engines 2*a*, 2*b* and motors 112*a*, 112*b* of the outboard motors 1*a*, 1*b*, 11*a*, 11*b* so as to increase the power output and thus a rotational speed of the propellers 6*a*, 6*b*, 116*a*, 116*b*.

The controller 10 can be configured to allow for full power output from the outboard motors 1*a*, 1*b*, 11*a*, 11*b* or configured for limiting maximum output to a particular engine output (e.g., a predetermined engine output), which would correspond to a maximum thrust generated by the outboard motors 1*a*, 1*b*, 11*a*, 11*b*. In some embodiments, where the engines 2*a*, 2*b* are internal combustion engines, the controller 10 can be configured to control a throttle opening of the engines 2*a*, 2*b*, to thereby control the output from the engines 2*a*, 2*b*. Thus, in such embodiments, the controller 10 can be configured to limit the maximum throttle opening achievable by operation of the joystick 23. For example, the controller 10 may be configured or programmed with a maximum of a 35% opening of the throttle valves of the engines 2*a*, 2*b*. In some embodiments, the controller 10 can be configured to adjust the power output from the engines 2*a*, 2*b*, e.g., adjusting the opening of the throttle valves, between the idle speed setting associated with the operational mode of FIG. 5C and the operational mode of FIG. 5D, between the idle speed setting and the maximum output setting.

As another embodiment, the controller 10 can be configured to make the joystick 23 operable only when the throttle opening of the engines 2*a*, 2*b* are 35% or less of the maximum opening, i.e., relatively slower thrust output from the engines 2*a*, 2*b*. At the same time, when the joystick 23 is control the watercraft 100, the central motor 1*a*, 1*b* inoperable by retracting the propellers 6*a*, 6*b* and making any portion of the central motors 1*a*, 1*b* outside of water. It can be achieved by the controller 10 sending command to ECU 9*a*, 9*b* to activate the tilting mechanism to rotate the change bracket 17*a* by 90 degrees (as seen FIG. 2). By achieving this configuration, there will be less drug or friction no obstacle between the propellers 116*a*, 116*b*. As a result, the thrust amount generated by the peripheral motors 11*a*, 11*b* become more predictable and improve the control of the movement of the watercraft 100. Otherwise, the propellers 6*a*, 6*b* interposed sometime interfere the thrust generated by the peripheral motors 11*a*, 11*b* and correspondence between the joystick control and actual movement of the watercraft can be disturbed particularly when the thrust generated by the peripheral motor 11*a* is pointing towards quadrant A or B, and/or the thrust generated by the peripheral motor 11*b* is pointing towards quadrant C or D.

This feature is one embodiment of automatic setting control from Setting H to Setting P. The automatic setting change can be achieved from Setting P to Setting H when the throttle opening exceeds more than 35% of the maximum opening for predetermined amount of time such as about 60 seconds. Alternatively, the automatic change of the setting can take place immediately after the throttle opening exceeds 50% of the maximum opening, irrespective of the joystick control is available or not. If enabling or disabling either the throttle levers 22*a*, 22*b* or the joystick 23 is a matter of design based on the maneuvering comfort and safety. Not only based on the throttle opening, but also actual watercraft speed relative to the water is also factored in to decide appropriate threshold level to enable/disable the control by the throttle levers 22a, 22b or the joystick 23.

In some embodiments, the controller 10 can be configured to adjust the throttle openings proportionally corresponding to proportional movements of the joystick 23 over the range $F_H$, between the position illustrated in FIG. 5C and the position illustrated in FIG. 5D. Optionally, the controller 10 can be configured to adjust the throttle openings of the engines 2a, 2b in a stepwise manner, for example, with any number of predetermined steps between the idle speed associated with the joystick position over range $F_H$.

Thus, when a user operates the joystick 23 starting from the default position illustrated in FIG. 5A to the maximum displacement position illustrated in FIG. 5D, the controller 10 first adjusts the rudder angle of the outboard motors 1a, 1b from the zero watercraft thrust position illustrated in FIG. 5A in which the rudder angles are directly opposed and thus cancelling all thrust produced by the peripheral motors 11a, 11b, then through one or more intermediate steps of changing the rudder angles of the peripheral motors 11a, 11b as the joystick 23 is moved from the position of FIG. 5A, through the range $F_L$. Thus, the controller 10 can be configured to adjust a forward speed of the watercraft 10 into different ranges of watercraft speeds using two different types of adjustments of the peripheral motors 11a, 11b. For example, in some embodiments, the first range $F_L$ is associated with speeds from zero up to idle speed by adjusting the rudder angle of the outboard motors 1a, 1b, 11a, 11b, and in some embodiments, only adjusting the rudder angles of the outboard motors 1a, 1b, 11a, 11b. The second $F_H$ is associated with changing the power output from the outboard motors 1a, 1b, 11a, 11b for adjustment of watercraft speed between idle speed (FIG. 5C) and a full power speed (FIG. 5D). As noted above, the full power speed of FIG. 5D can be limited to a predetermined maximum that is less than the maximum power output possible from the outboard motors 1a, 1b.

Figure 6A:
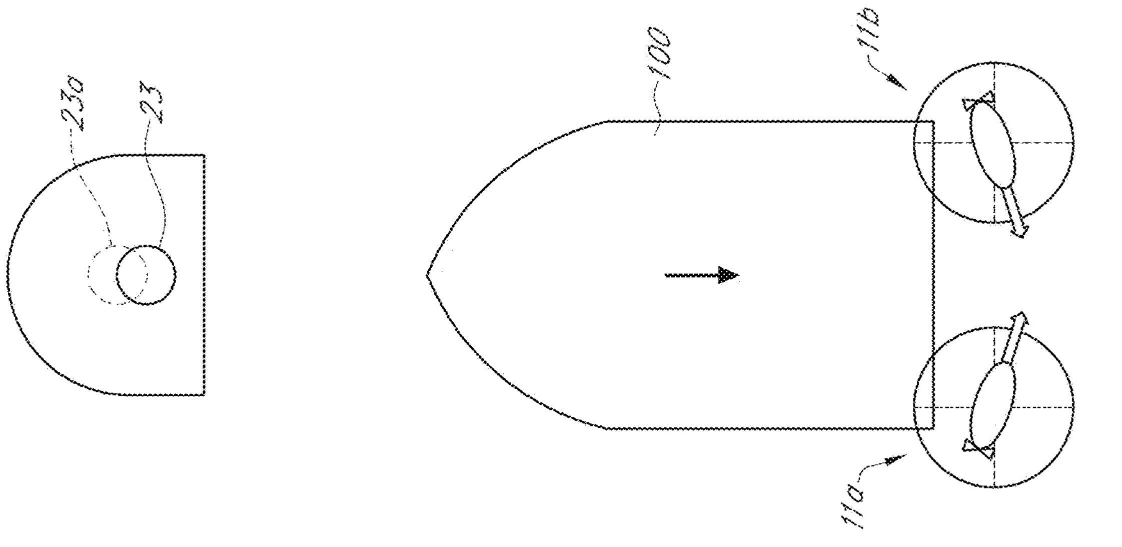
FIG. 6A is a schematic diagram showing control of the peripheral motors in a first mode of operation for rearward movement.

FIG. 6A is a schematic diagram showing control of the outboard motors 1a, 1b in a first rearward sole operation for propulsion in the rearward direction, in which the joystick 23 has been moved into the range $R_L$. Similarly to the operation illustrated in FIG. 5B, the controller 10, in this case, controls the steering actuators 8a, 8b to adjust the rudder angles of the outboard motors 1a, 1b from the opposing orientation of FIG. 5A, to the orientation illustrated in FIG. 6A in which the rudder angles of the outboard motors 1a, 1b are still pointing partially towards each other, but also partially rearward. For example, the outboard motor 1a is pointing towards quadrant B and the rudder angle of outboard motor 1b is pointing towards quadrant C. Similarly to the mode of operation of FIG. 5B, this produces a net rearward thrust to thereby move the watercraft 100 rearwardly. Because the rudder angles of the outboard motors 1a, 1b are pointed towards each other, the x component of the thrust values cancel each other out, similarly to that described above with reference to FIG. 5B1.

In the case of peripheral motors 11a, 11b the net speed control or producing super idle watercraft speed is relatively easier in comparison with the central motors 1a, 1b, as electric motors are easily generated slower speed of rotation as there is no idling threshold that combustion engines stop running below the certain rotational speed. As a result, it is possible to direct the propeller direction to generate the vessel thrust forward with low speed instead of some of thrust created canceling each other. However, by maintaining the rotational speed of motors 112a, 112b at certain constant speed, it will be smoother to control the movement of the watercraft 100 in various directions.

Figure 6B:
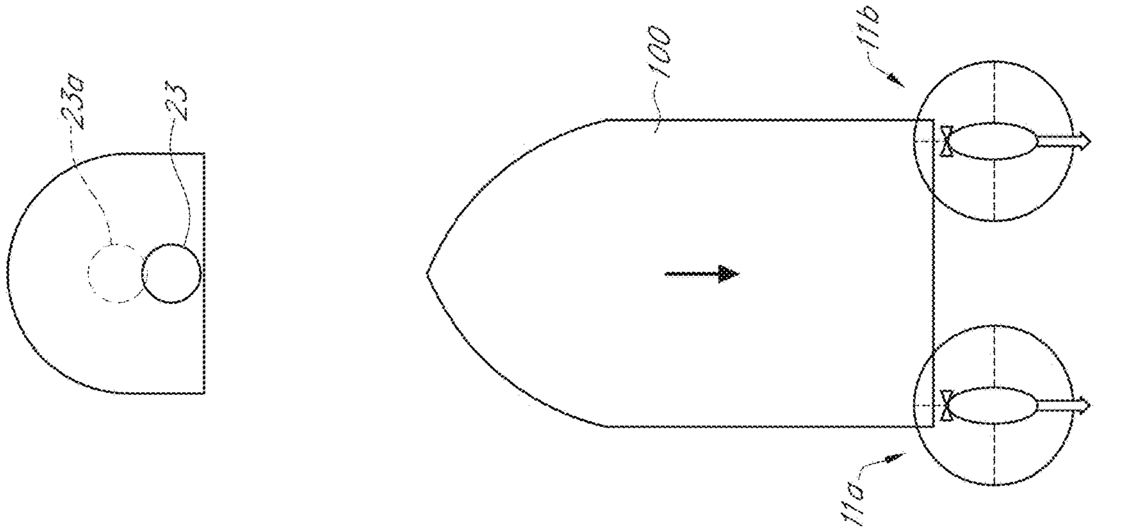
FIG. 6B is a schematic diagram showing control of the peripheral motors in a second mode of operation for rearward movement.

FIG. 6B is a schematic diagram showing control of the peripheral motors 11a, 11b in a second rearward sole operation for rearward propulsion. In this case, the joystick 23 has been moved to a second rearward position, into the range $F_H$, further rearward than that associated with FIG. 6A. In this case, the controller 10 controls the steering actuators 8a, 8b to adjust the rudder angles of the outboard motors 1a, 1b so as to point in the full rearward direction, i.e., 180 degrees. The controller 10 also maintains the central motors 1a, 1b in a "forward" gear position with the engines 2a, 2b at idle speed. As such, the watercraft 100 would move rearwardly at the idle watercraft speed, similarly to the forward movement of the watercraft 100 described above with reference to FIG. 5C. The peripheral motors 11a, 11b can achieve the same result by changing the motor 112a, 112b directions by the steering actuators 113a, 113b.

Figure 6C:
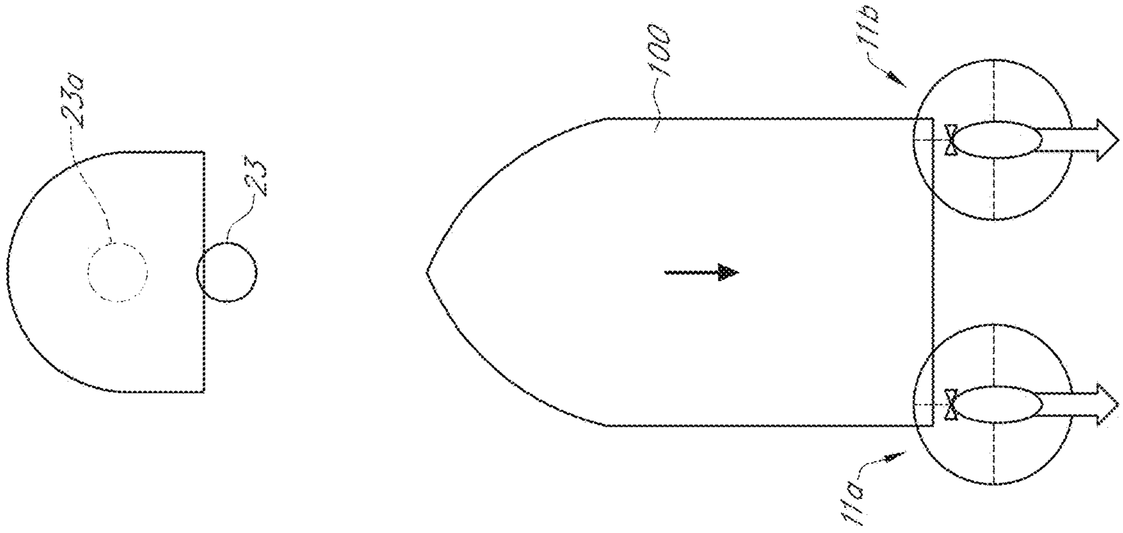
FIG. 6C is a schematic diagram showing control of the peripheral motors in a third mode of operation for rearward movement.

FIG. 6C is a schematic diagram showing control of the peripheral motors 11a, 11b in the third rearward sole operation mode for rearward propulsion. In FIG. 6C, the joystick 23 is tilted to the rearward most position, further into the range RH. In this case, the controller 10 controls the peripheral motors 11a, 11b so as to maintain the rudder angles in the straight rearward direction, i.e., 180 degrees, and increases the output from the motors 112a, 112b to a maximum setting. As noted above, with reference to FIG. 5D, the maximum output from the engines 2a, 2b in such a mode of operation can be limited to a predetermined amount that is less than the maximum power output from the engines 2a, 2b possible.

As such, the controller 10 can adjustment the watercraft speed in rearward direction in various ranges of watercraft speeds, similarly to that described above with regard to the forward modes of sole operation. For example, the controller 10 can be configured to provide an adjustment of rearward speeds from zero speed associated with FIG. 5A to idle speed in the rearward direction associated with FIG. 6B, by adjusting the rudder angles of the outboard motors 1a, 1b and maintaining the power output from the engines 2a, 2b and/or motors 112a, 112b at idle speed. As such, over this first range of adjustment, the watercraft 100 is driven rearwardly between zero up to idle watercraft speed which includes one or more speeds that is less than idle watercraft speed associated with the mode of FIG. 6B. A second range of adjustment is achieved by way of maintaining the rudder angles of the outboard motors 1a, 1b and 11a, 11b at 180 degrees but increasing the power output from the engines 2a, 2b and/or motors 112a, 112b, for example, in proportion to movement of the joystick 23 between the positions illustrated in FIG. 6B and the position illustrated in FIG. 6C.

Further, as described above with reference to FIGS. 5A-5D, the controller 10 can be configured to allow a user to cycle through a plurality of predetermined rearward propulsion modes by "tapping" the joystick in the rearward direction. For example, in such a mode of operation, the controller 10 can be configured to detect a "tap" of the joystick 23 toward the rearward direction and adjust the rudder angles of the peripheral motors 11a, 11b from the position illustrated in FIG. 5A, to a position between the position of FIG. 5A and the position of FIG. 6B, such as the position illustrated in FIG. 6A. Additionally, the controller 10 can be configured to, in a stepwise manner, increase rearward propulsion each time a user "taps" the joystick 23 in the rearward direction cycling the rearward propulsion modes between the sub-idle range by adjustment of rudder angles and through the super idle speed range by adjustment of the power output of the outboard motors 2a, 2b and/or motors 112a, 112b, up to the maximum rearward propulsion mode associated with FIG. 6C.

Figure 7:
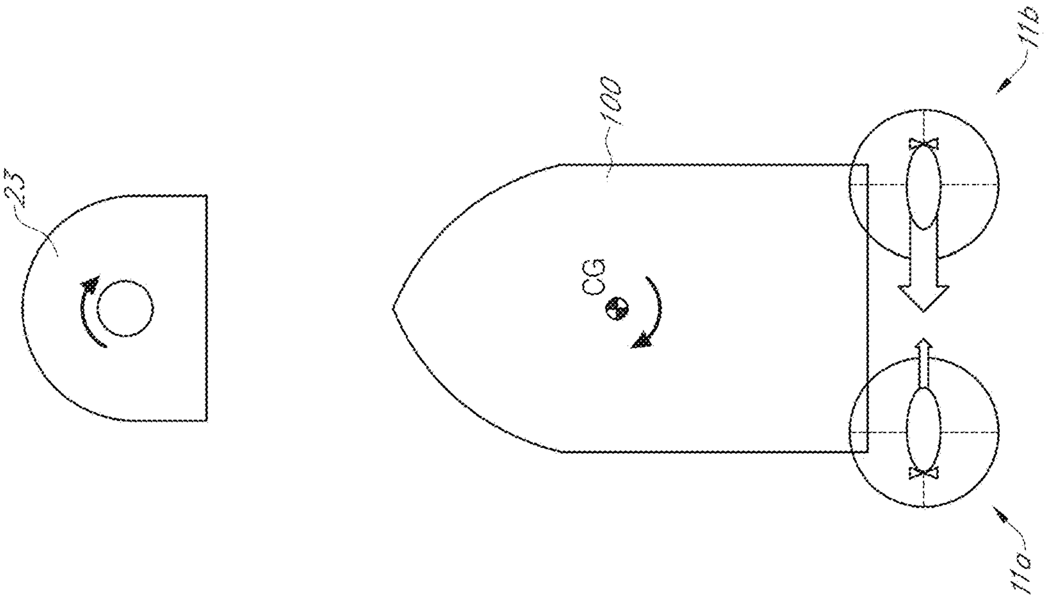
FIG. 7 is a schematic diagram showing control of the peripheral motors in a first mode of operation for rightward or clockwise rotation.

FIG. 7 is a diagram showing control of the outboard motors 2a, 2b and/or motors 112a, 112b in a sole operation mode of bow turning in a clockwise direction. In FIG. 7, the joystick 23 has been rotated from its default position 23a clockwise about the z axis in the positive z direction, to a rotated position of the joystick 23. In this case, the controller 10 maintains the rudder angles of the outboard motors 1a, 1b in the directly opposed orientation of FIG. 5A, and increases the power output from the engine 2b or motor 112b of the right outboard motor 1b, 11b. Thus, there is a net thrust produced by the combined thrusts of the outboard motors 1a, 1b, 11a, 11b (a greater thrust of the right outboard motor 1b, 11b in the—x direction in the illustrated embodiment), causing a clockwise torque Tcw to be exerted on the watercraft 100 that generally rotates the watercraft 100 about its center of pressure CP. The term "center of pressure" is also referred to as "center of resistance," "center of lateral resistance," and "center of lateral plane," all of which refer to geometric center of the underwater profile of the hull. In some embodiments, the controller 10 can be configured to proportionally increase the power output from the engine 2b or motor 112b of the right outboard motor 1b in proportion to the magnitude of clockwise rotation of the joystick 23 about the z axis, in a continuously proportional linear or non-linear, or a stepwise fashion.

various aspects of the present disclosure can include the realization that initiation of rotation or bow turning of a watercraft 100 can be significantly quicker and smoother compared to conventional techniques. For example, some conventional outboard motor control systems, when switching from a zero propulsion mode to a rotation mode, shift one outboard motor into forward gear, one outboard motor into rearward gear, which would cause multiple shocks, one from the gear shifting of each outboard motor, after which, the watercraft begin to rotate. However, in accordance with some embodiments of modes of operation, by continuing to operate the outboard motors 1a, 1b, 11a, 11b in the forward gear 14a or forward drive motor current supply to motor 112a and at idle speed and with diametrically opposed rudder angles for zero propulsion, then only increasing the power output from one outboard motor to induce rotation of the watercraft, the initiation of rotation is significantly smoother than the conventional technique noted above. In accordance with various embodiments, certain disadvantages associated with conventional systems can be eliminated or reduced the system for controlling a watercraft disclosed herein.

Further, no adjustment of the rudder angles of the outboard motors 1a, 1b is necessary in this mode of operation. Further, because watercraft are generally elongated, the distance between the center of pressure and the net thrust vector is much larger, thereby providing an opportunity to generate much larger torques on the watercraft 100 for rotation of the watercraft 100 than when the thrust vector were located closer to the center of pressure. As such, the rotation of the watercraft 100 can be more responsive to rotational inputs to the joystick 23.

In some embodiments, the controller 10 can be configured to proportionally increase the power output of the engine 2b and/or motor 112b between idle and a maximum output based on the proportional twisting of the joystick 23 between its default position and a maximum twisted position.

Figure 8:
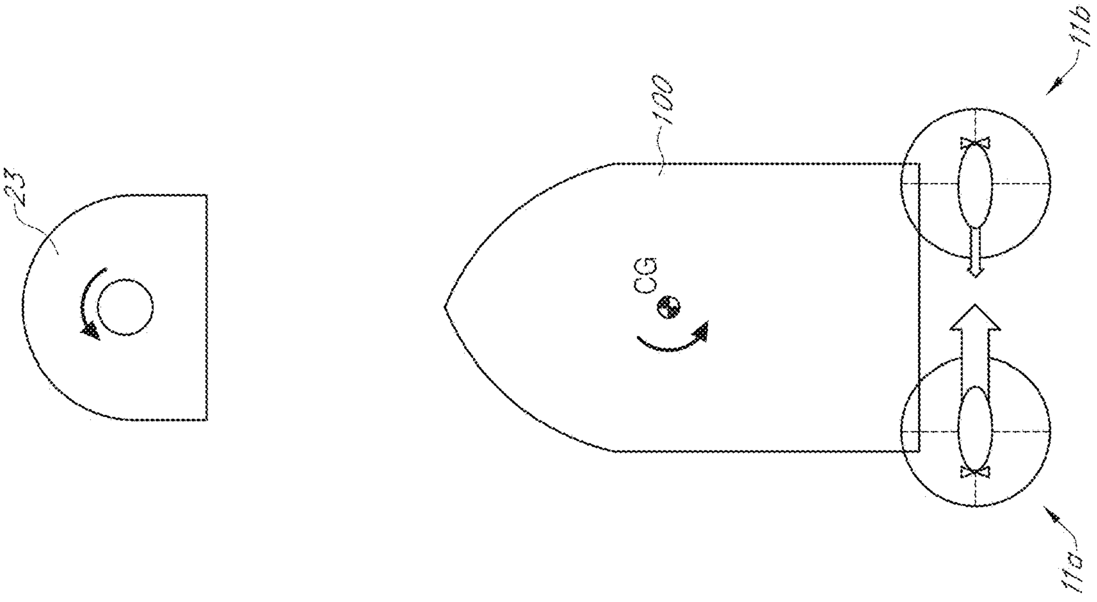
FIG. 8 is a schematic diagram showing control of the peripheral motors in a mode of operation for leftward or counterclockwise rotation.

FIG. 8 is a schematic diagram showing control of the outboard motors 11a, 11b in the counterclockwise sole operation mode of bow turning or rotation in the counterclockwise direction. In FIG. 8, the joystick 23 is twisted counterclockwise about the z axis, or in other words, in the −z direction. In this case, the controller 10 increases the power output from the motor 112a of the left peripheral motor 11a, thereby increasing the thrust generated by the left outboard motor 11a, while maintaining the rudder angles of the outboard motors 11a, 1b in the diametrically opposed orientation of FIG. 5A. As such, there is a net thrust in the positive x direction generated by the combined thrusts of the outboard motors 11a, 11b, thereby generating a counter clockwise torque Tccw on the watercraft 100, and causing rotation of the watercraft 100 generally about its center of pressure CP.

Figure 9C:
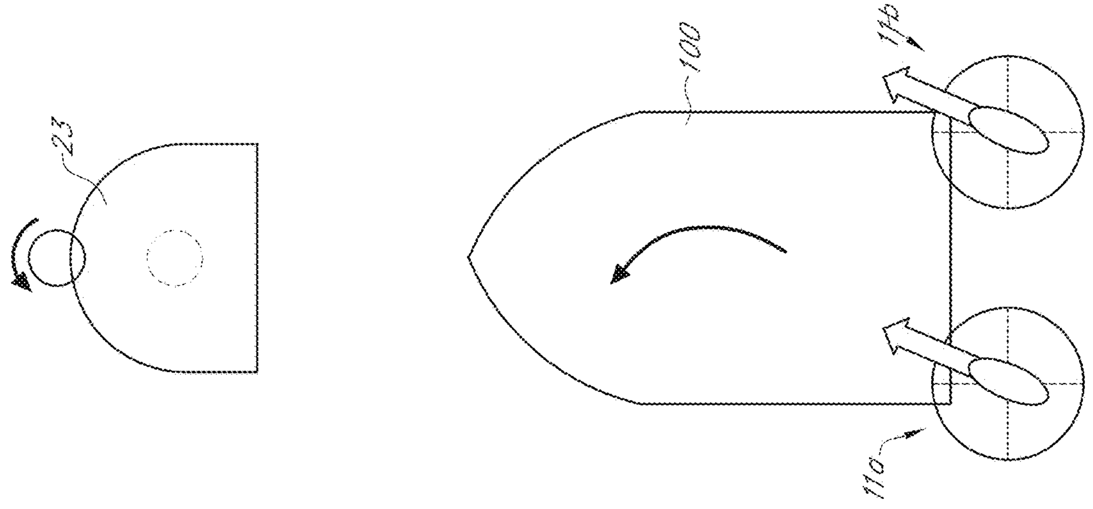
FIG. 9C is a schematic diagram showing control of the peripheral motors in a second composite mode of operation for forward movement and counterclockwise rotation.
Figure 9B:
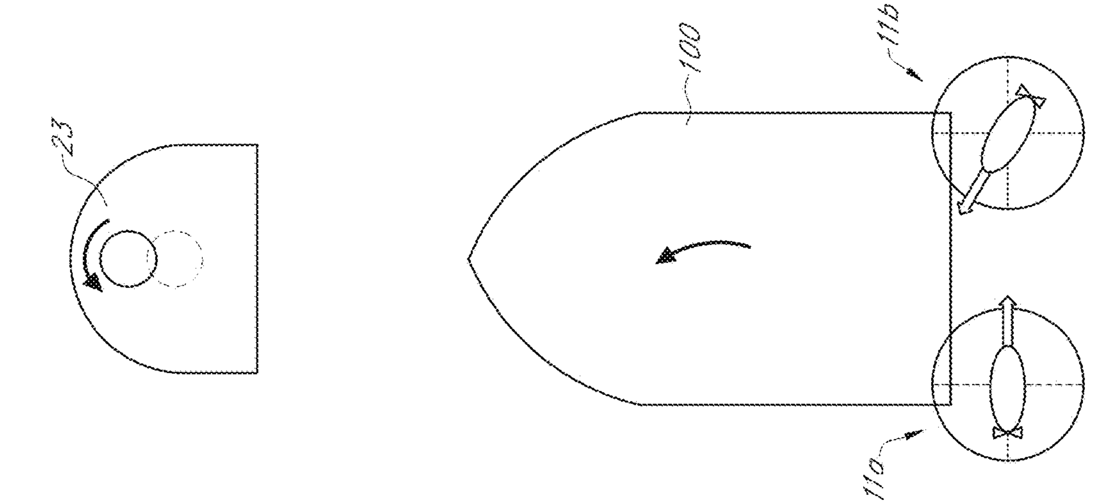
FIG. 9B is a schematic diagram showing control of the peripheral motors in a first composite mode of operation for forward movement and counterclockwise rotation.
Figure 9A:
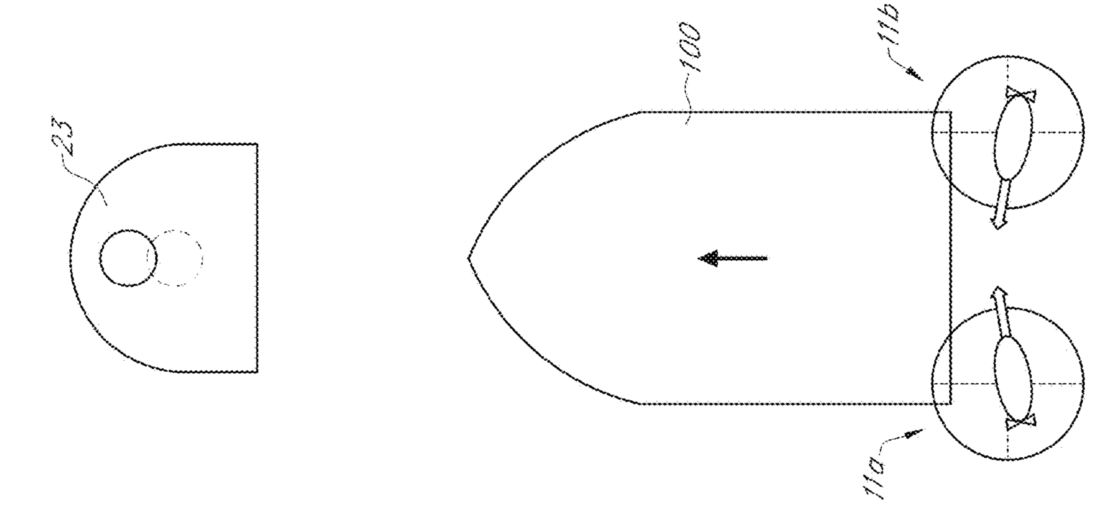
FIG. 9A is a schematic diagram showing control of the peripheral motors in the first mode of operation for forward movement.

FIG. 9A is a schematic diagram showing control of the outboard motors 1a, 1b under the first forward sole mode of operation as described above with reference to FIG. 5B, repeated here for illustrating composite modes of operation illustrated in FIGS. 9B and 9C.

FIG. 9B is a schematic diagram showing control of the outboard motors 11a, 11b under the first composite operation of forward movement and counterclockwise rotation. In this scenario, the joystick 23 is initially moved to a forward propulsion position as illustrated in FIG. 9A, in which the controller 10 adjusts the rudder angles of the outboard motors 11a, 11b to be pointing slightly forward so as to produce a net forward thrust. In FIG. 9B, the joystick maintains a forward tilted position and twisted counterclockwise (in the −z direction). In this case, the controller 10 adjusts the rudder angle of the outboard motor 1a to reduce its y axis thrust component and thereby increase its x axis thrust component.

For example, in the embodiment of FIG. 9B, the rudder angle of the left peripheral motor 11a is adjusted to 90 degrees from an angle in the quadrant A, and the right peripheral motor 11b is adjusted to have a more forward thrust (angled more towards the +y direction) relative to the orientation of the right peripheral motor 1b of FIG. 9A. There is a net propulsion directed in the +x direction generated by the peripheral motor 1a only partially offset by the smaller −x thrust component from the peripheral motor 1b. Additionally, the peripheral motor 1b provides some +y component thrust due to its rudder angle orientation into the D quadrant. As such, the watercraft 100 moves forward and rotates counterclockwise, with the peripheral motors remaining in the forward gear 14a and operating at idle speed.

FIG. 9C is a schematic diagram showing control of the peripheral motors 1a, 1b in a second composite mode of operation for forward movement and counterclockwise rotation. In FIG. 9C, the joystick 23 has been moved to the forward most position and has been rotated counterclockwise. In this case, the controller 10 adjusts the rudder angle of the peripheral motors 11a, 11b to be generally parallel, like in the forward mode of operation of FIG. 5D, and further adjusts the rudder angles of the peripheral motors 11a, 11b to provide for rotation or turning to the left, or counterclockwise. Additionally, like in the mode of FIG. 5D, the controller 10 increases the power output of the engines 2a, 2b of the peripheral motors 1a, 1b, respectively. This provides greater than idle speed propulsion and turning.

The composite mode of operation illustrated in FIG. 9C can also be combined with tap-mode operation described above. For example, the controller 10 can be configured to gradually or stepwise increase the forward propulsion of the watercraft 100 in the super idle watercraft speed range in which the rudder angles of the peripheral motors 1*a*, 1*b* are held to be generally parallel and also to maintain the power output of the engines 2*a*, 2*b* and/or motor 112*a*, 112*b* at a speed above idle. Thus, a user could tilt or tap the joystick 23 a number of times until the watercraft 100 enters a speed range that is greater than idle speed with the joystick 23 returning to the default position 23*a*. Then, a user could subsequently twist the joystick 23 clockwise or counter-clockwise so as to turn the watercraft 100 in the desired direction, while the controller 10 maintains the elevated output of the engines 2*a*, 2*b* or motor 112*a*, 112*b* and thus the super idle watercraft speed. This can provide the user with a more user-friendly convenient mode of operation in which a user is not required to hold the joystick 23 in a tilted position to maintain the watercraft 100 operating at a super idle watercraft speed, and use the twisting motions of the joystick 23 to control heading or a direction of travel. In some embodiments, the controller 10 can be configured to control the rudder angles of the peripheral motors 11*a*, 11*b* in accordance with a lateral, leftward and rightward tilting of the joystick 23, in this mode of operation. Based on the above disclosure, those of ordinary skill in the art will understand how to achieve forward and propulsion and clockwise rotation.

Additionally, the controller 10 can be configured to, when operating in super idle speed mode, further limit the maximum steering angles used during super idle operation. For example, with reference to FIG. 17, the controller 10 can include a map of values including any of those illustrated in FIG. 17 correlating the throttle angle of the outboard motors 1*a*, 1*b* to the maximum steering angle. In the illustrated embodiment of FIG. 17, at 0% throttle, the maximum steering angle is limited to a particular angle (e.g., a first predetermined steering angle) for operation at smaller throttle openings. This corresponds to operation at the beginning of super idle mode, where throttle angle is 0% and the engines 2*a*, 2*b* are operating at idle. As the controller 10 responds to further joystick inputs to increase thrust, the super idle mode requires increasing the output from the outboard motors 1*a*, 1*b*, for example, by increasing the opening of the throttle valves above 0%. In the illustrated embodiment, the maximum steering angle falls to another angle (e.g., a second steering angle that is smaller than the first steering angle) at 100% throttle opening.

Figure 17:
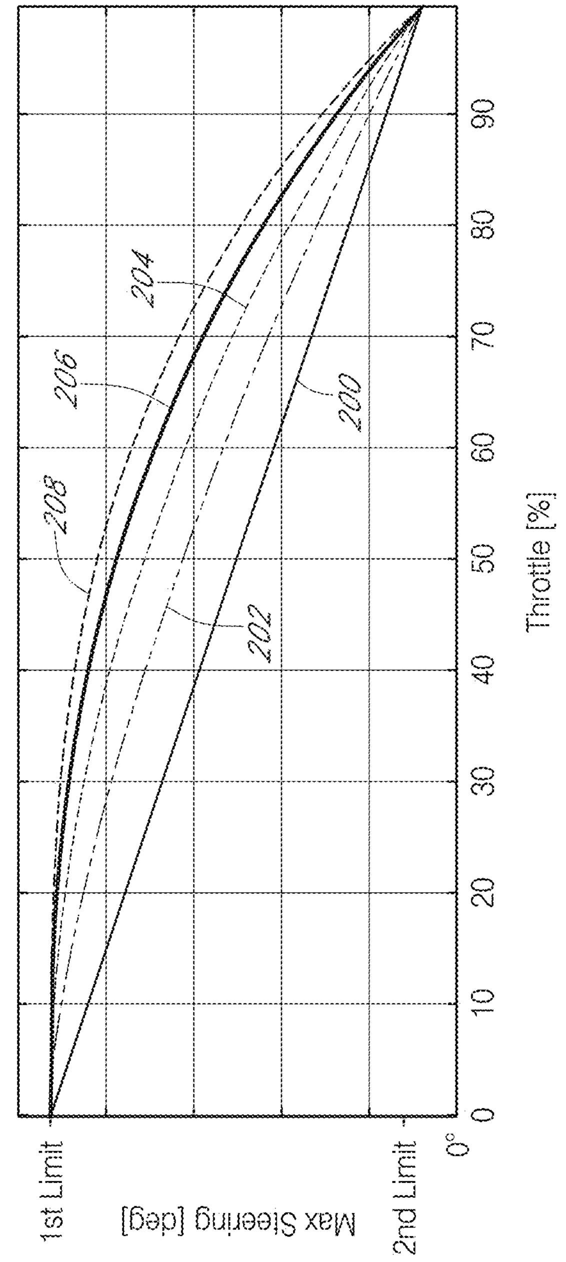
FIG. 17 is a graph illustrating an optional map for limiting steering angles or rudder angles of the outboard motors during cruise control operation, such as those cruise control operations of FIGS. 15 and 16.

With continued reference to FIG. 17, various different proportional relationships of throttle angle, and max steering angle can be used. For example, FIG. 17 includes a first linear curve 200 defining as direct proportional relationship of max steering angle between the first and second angles over the range of throttle openings from 0-100%. FIG. 17 also includes four additional curves 202, 204, 206, 208 which define other predetermined relationships between max steering angle and throttle opening. The curves 202, 204, 206, 208 can be exponential curves. In the illustrated embodiment, the curve 208 provides the most gradually introduced limit on max steering angle and the curve 202, of the curves, is the most linear, line 200 being directly linear. Other curves can also be used.

Figure 10C:
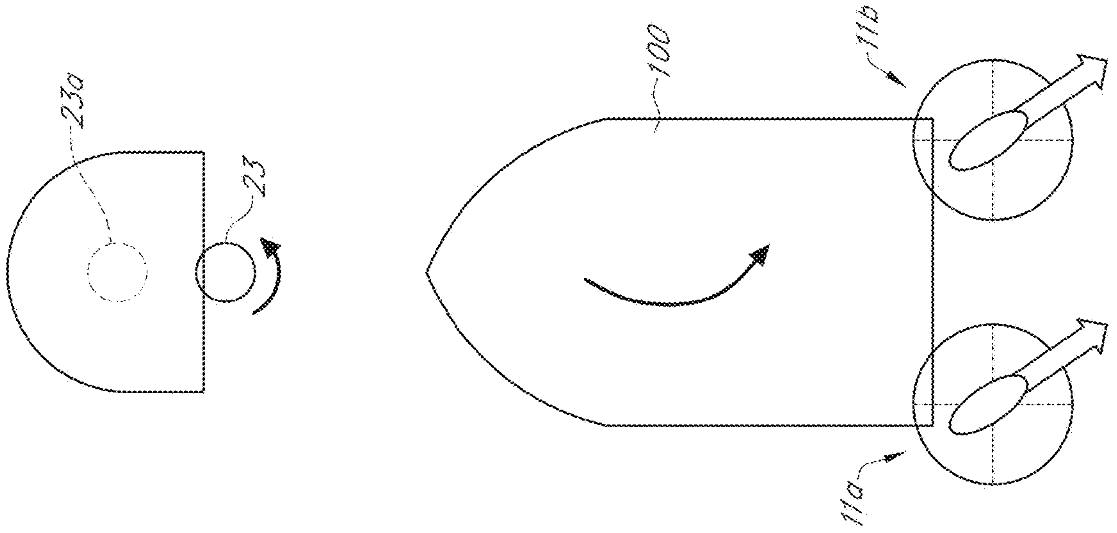
FIG. 10C is a schematic diagram showing control of the peripheral motors in a second composite mode of operation for rearward movement and counterclockwise rotation.
Figure 10B:
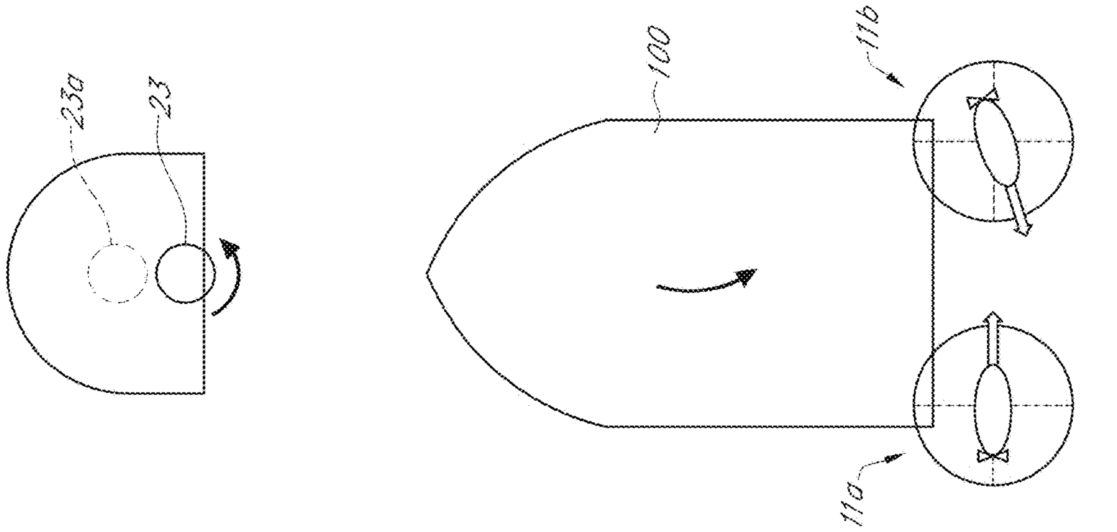
FIG. 10B is a schematic diagram showing control of the peripheral motors in a first composite mode of operation for rearward movement and counterclockwise rotation.
Figure 10A:
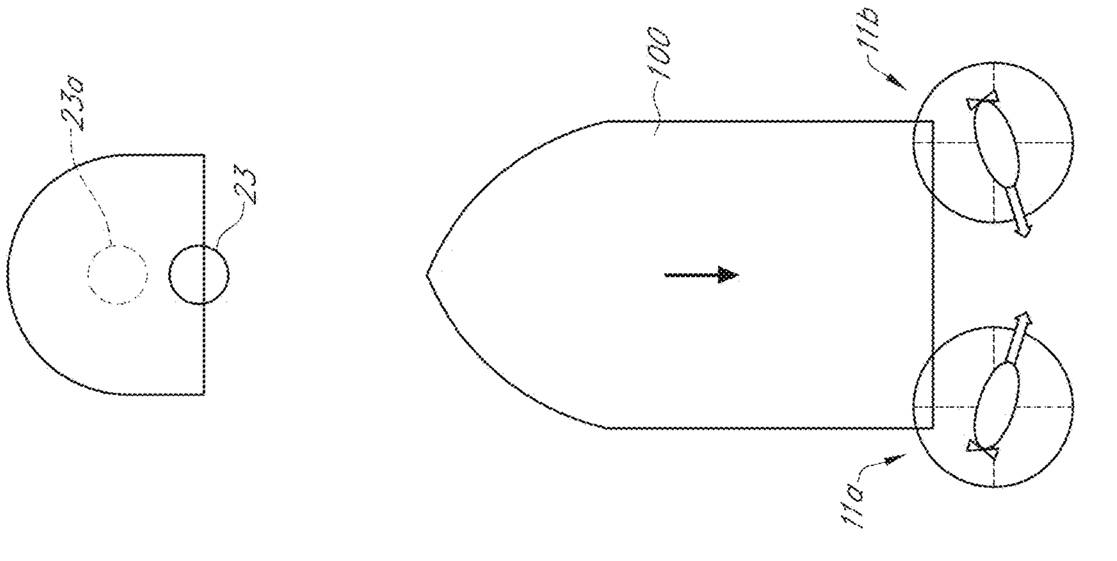
FIG. 10A is a schematic diagram showing control of the peripheral motors in the first mode of operation for rearward movement.

FIG. 10A is a schematic diagram showing control of the peripheral motors in a reverse sole operation for reverse movement, which can be the same as that described above with reference to FIG. 6A.

FIG. 10B is a schematic diagram illustrating control of the peripheral motors 1*a*, 1*b* under a first reverse composite operation for reverse propulsion with counterclockwise rotation. In FIG. 10B, the joystick 23 has been moved to a first rearward position in the $R_L$ range, and twisted counterclockwise. In this case, the controller 10 can adjust the rudder angles of the peripheral motors 11*a*, 11*b* such that the rudder angle of the left peripheral motor 1*a* points directly towards or more towards the right peripheral motor 1*b* such as about or approximately 90 degrees (e.g., the angle with potential variances of +/−5 degrees). Additionally, the controller 10 can adjust the rudder angle of the right peripheral motor 1*b* to be directly at or more towards 180 degrees. Additionally, the controller 10 can maintain both peripheral motors 11*a*, 11*b* in the forward gear 14*a* and at idle speed operation. As such, all, substantially all, or part of the thrust generated by the left peripheral motor 11*a* is directed laterally in the +x direction. On the other hand, the right peripheral 11*b* motor creates a thrust that is all, substantially or partly directed in the −y direction. Together, the net thrust generated by both peripheral motors 11*a*, 11*b* creates a reverse thrust with counterclockwise rotation.

FIG. 10C is a schematic diagram illustrating control of the peripheral motors 1*a*, 1*b* in a second rearward composite mode of operation for rearward movement and counter-clockwise rotation. In FIG. 10C, the joystick 23 has been tilted to its rearward most position and has been rotated in the counterclockwise direction. In this case, the controller 10 operates in a reverse, super idle watercraft speed mode similar to that of FIG. 6B, and adjusts the rudder angles of the peripheral motors 11*a*, 11*b* to provide for counterclockwise rotation. Thus, in the illustrated embodiment, the controller 10 adjusts the rudder angles of both of the peripheral motors 11*a*, 11*b* to point towards quadrant B.

Figure 11C:
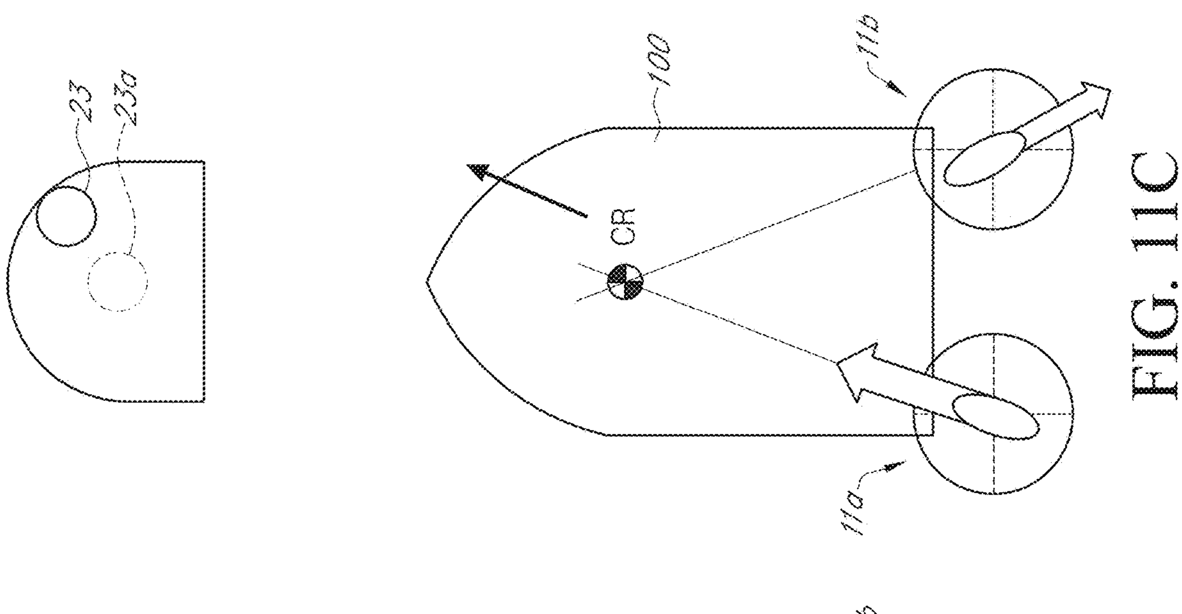
FIG. 11C is a schematic diagram showing control of the peripheral motors in a first composite side and forward mode of operation for lateral movements toward the starboard side and forward.
Figure 11B:
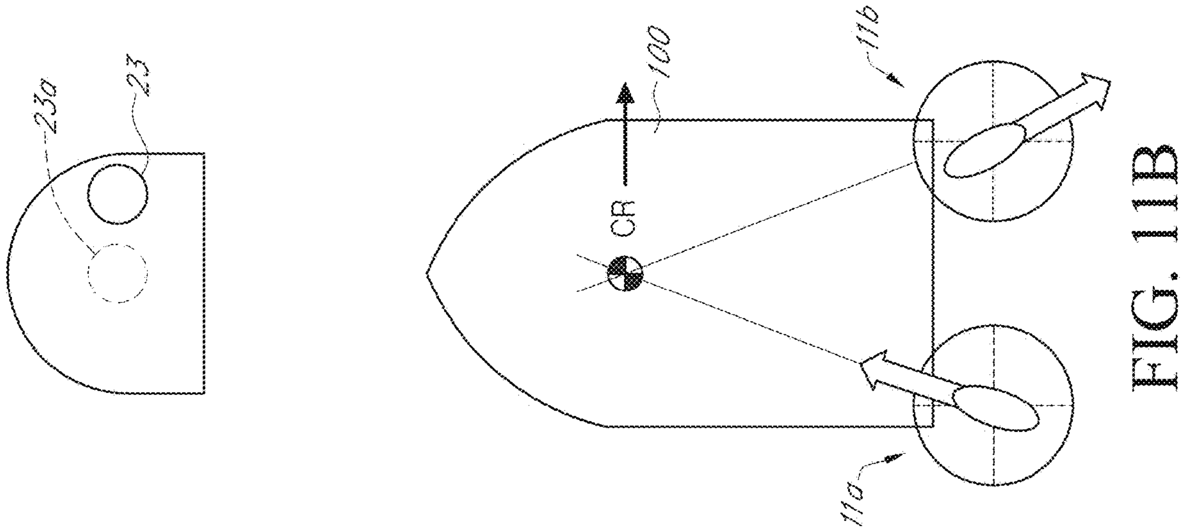
FIG. 11B is a schematic diagram showing control of the peripheral motors in a first starboard side mode of operation for lateral movements toward the starboard side.
Figure 11A:
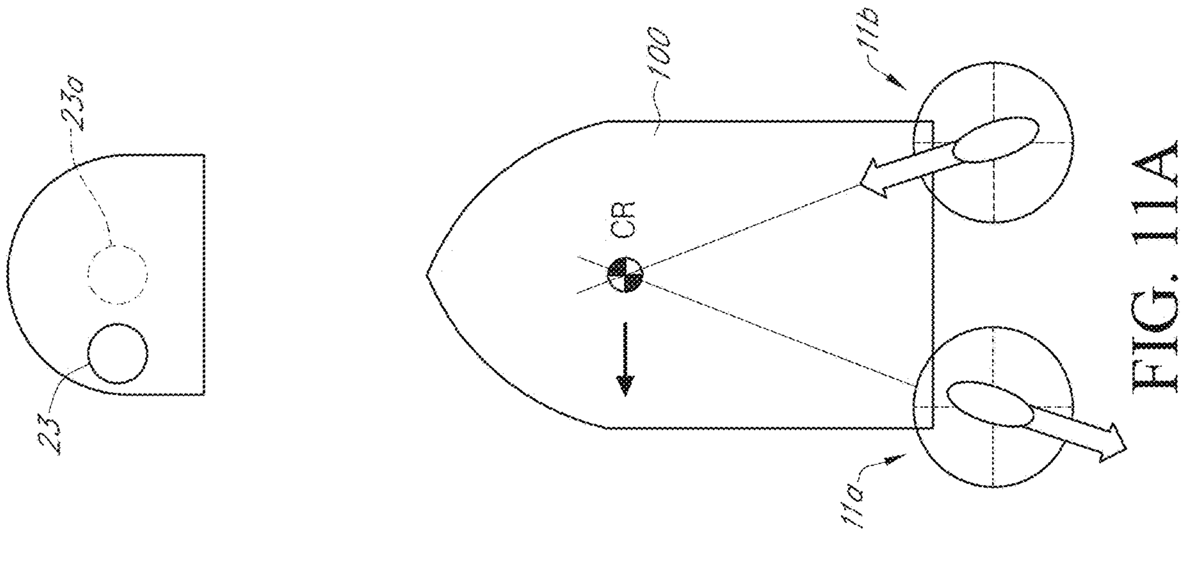
FIG. 11A is a schematic diagram showing control of the peripheral motors in a first port side operation for lateral movement in the port side direction.

FIG. 11A is a schematic diagram illustrating control of the peripheral motors 11*a*, 11*b* and a sole lateral movement operation for lateral movement to the left or portside. In FIG. 11A, the joystick 23 has been tilted to left of its default position 23*a*, in the −x direction. In this case, the controller 10 adjusts the rudder angles of the peripheral motors 1*a*, 1*b* so as to generate no torque on the watercraft 100 and provide a net thrust in the −x lateral direction. This technique has been used commercially and disclosed in various patent publications, including U.S. Pat. No. 8,700,238 the entire contents of which is hereby incorporated by reference. As is well known, to create a lateral movement of a watercraft with two peripheral motors, in the −x direction, or to the left, the rudder angle of the left peripheral motor 1*a* is adjusted to point substantially directly away from the center of pressure CP of the watercraft, for example in quadrant C. This creates a thrust vector that passes through the center of pressure CP of the watercraft 100, thereby imparting no torque on the watercraft 100. Additionally, the controller 10 can be configured to adjust the rudder angle of the right peripheral motor 1*b* to point towards quadrant D, directly or substantially directly at the center of pressure CP. As such, the right peripheral motor 1*b* would create a torque vector that is directly or substantially directly at the center of pressure CP, thereby imparting no torque on the watercraft 100. However, with the ruder angles as such, a net lateral thrust is imparted to the watercraft, in the −x direction, thereby providing leftward lateral propulsion of the watercraft 100. In some embodiments, the controller 10 can also increase the power output of the engines 2*a*, 2*b* and/or motor 112*a*, 112*b* to move the watercraft 100 at a desirable speed.

FIG. 11B is a schematic diagram illustrating control of the peripheral motors 11*a*, 11*b* in a sole mode of operation for lateral movement in the +x direction or towards the starboard side. In FIG. 11B, the joystick 23 has been tilted to the right side, in the +x direction. In this case, the controller 10 adjusts the rudder angles of the left and right peripheral motors 11a, 11b to create a lateral movement of the watercraft 100 in the +x direction or to the starboard side. Thus, the controller adjusts the rudder angles of the left peripheral motors 11a to point towards the quadrant A, directly at the center of pressure CP and the rudder angle of the right peripheral motor 11b to point towards the quadrant B, directly away from the center of pressure CP. Similarly to the mode of FIG. 11A, the peripheral motors 11a, 11b thus do not impart any torques on the watercraft 100, but do impart a net lateral thrust in the +x direction.

FIG. 11C is a schematic diagram illustrating control of the peripheral motors 1a, 1b in a composite mode of operation for lateral movement in the +x direction or towards the starboard side, and forward. In FIG. 11C, the joystick 23 has been tilted to the right side, in the +x direction and tilted forward in the +y direction. In this case, the controller 10 adjusts the rudder angles of the left and right peripheral motors 11a, 11b to create a lateral movement of the watercraft 100 in the +x direction or to the starboard side. Thus, the controller adjusts the rudder angles of the left peripheral motors 11a to point towards the quadrant A, directly at the center of pressure CP and the rudder angle of the right peripheral motor 11b to point towards the quadrant B, directly away from the center of pressure CP. Similarly to the mode of FIG. 11A, the peripheral motors 11a and 11b thus do not impart any torques on the watercraft 100, but do impart a net lateral thrust in the +x direction. To obtain the additional forward thrust, the controller 10 increases the output of the outboard motor with the rudder angle that points forwardly, in this case, the left peripheral motor 11a. As such, the watercraft 100 moves both rightward and forward.

Figure 12A:
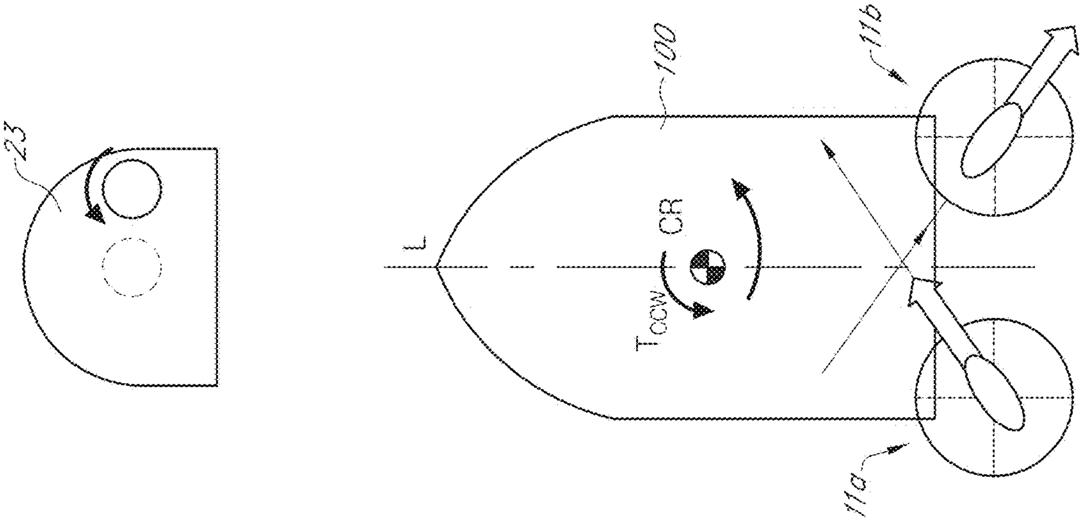
FIG. 12A is a schematic diagram showing control of the peripheral motors in a first composite lateral mode of operation for movement toward the starboard side and with counterclockwise rotation.

FIG. 12A is a schematic diagram illustrating the control of the peripheral motors 11a, 11b under a first composite operation for rightward movement and counterclockwise rotation. In this case, the controller 10 adjusts the rudder angle of the peripheral motors 11a, 11b to create a lateral movement in the +x direction or towards the starboard side as well as a torque for rotating the watercraft in a counterclockwise direction. In this case, the controller 10 adjusts the rudder angles of the left peripheral motor 11a to point towards quadrant A and the adjusts the rudder angle of the right peripheral motor 11b to point towards quadrant B, both crossing the centerline L of the watercraft on the aft side of the center of pressure CP. The resulting thrust vectors of the peripheral motors 11a and 11b both create a counterclockwise torque Tccw on the watercraft 100 and also produce a net lateral thrust in the +x direction. Thus, the watercraft 100 moves laterally to the starboard side as well as rotates in the counterclockwise direction.

Figure 12B:
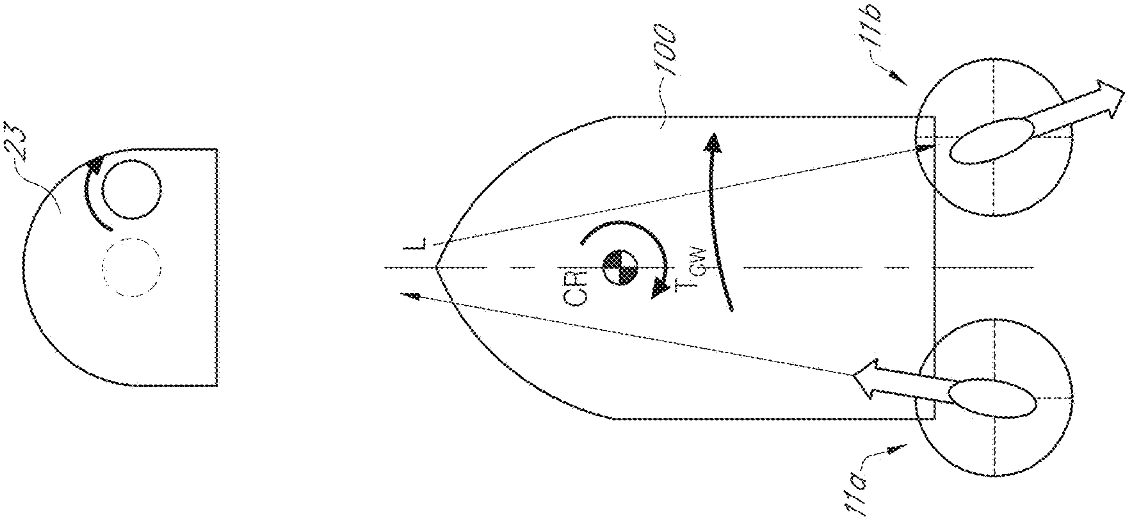
FIG. 12B is a schematic diagram showing operation of the peripheral motors in a second starboard composite mode of operation for movement in the starboard lateral direction with clockwise rotation.

FIG. 12B is a schematic diagram illustrating a second composite lateral mode of operation for movement rightward with clockwise rotation. In this case, the controller 10 adjusts the rudder angles of the peripheral motors 11a, 11b to create a net clockwise torque about the center of pressure as well as a net lateral thrust in the +x direction. For example, the controller 10 can adjust the rudder angle of the left peripheral motor 11a to create a thrust vector generally in the forward direction but greater than zero degrees. Additionally, the controller 10 can adjust the rudder angle of the right peripheral motor 11b to create a generally rearward thrust vector largely rearward, both thrust vectors crossing the centerline L of the watercraft on the forward side of the center of pressure CP. As such, the thrusts generated by the peripheral motors 11a, 11b can combine to create a net clockwise torque Tcw about the center of pressure CP. Additionally the thrust vectors have lateral components that produce a net lateral thrust on the watercraft 100 in the +x direction. Based on the above disclosure, those of ordinary skill in the art will understand how to achieve leftward lateral propulsion with clockwise and counter clockwise rotation.

Figure 13:
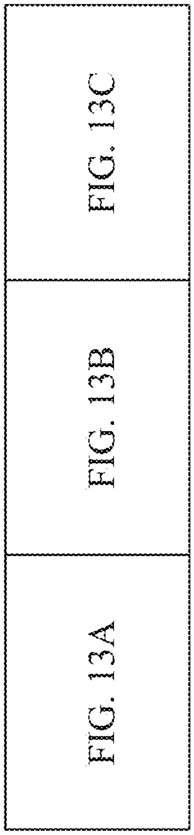
FIG. 13 shows FIGS. 13A-13C.
Figure 13A:
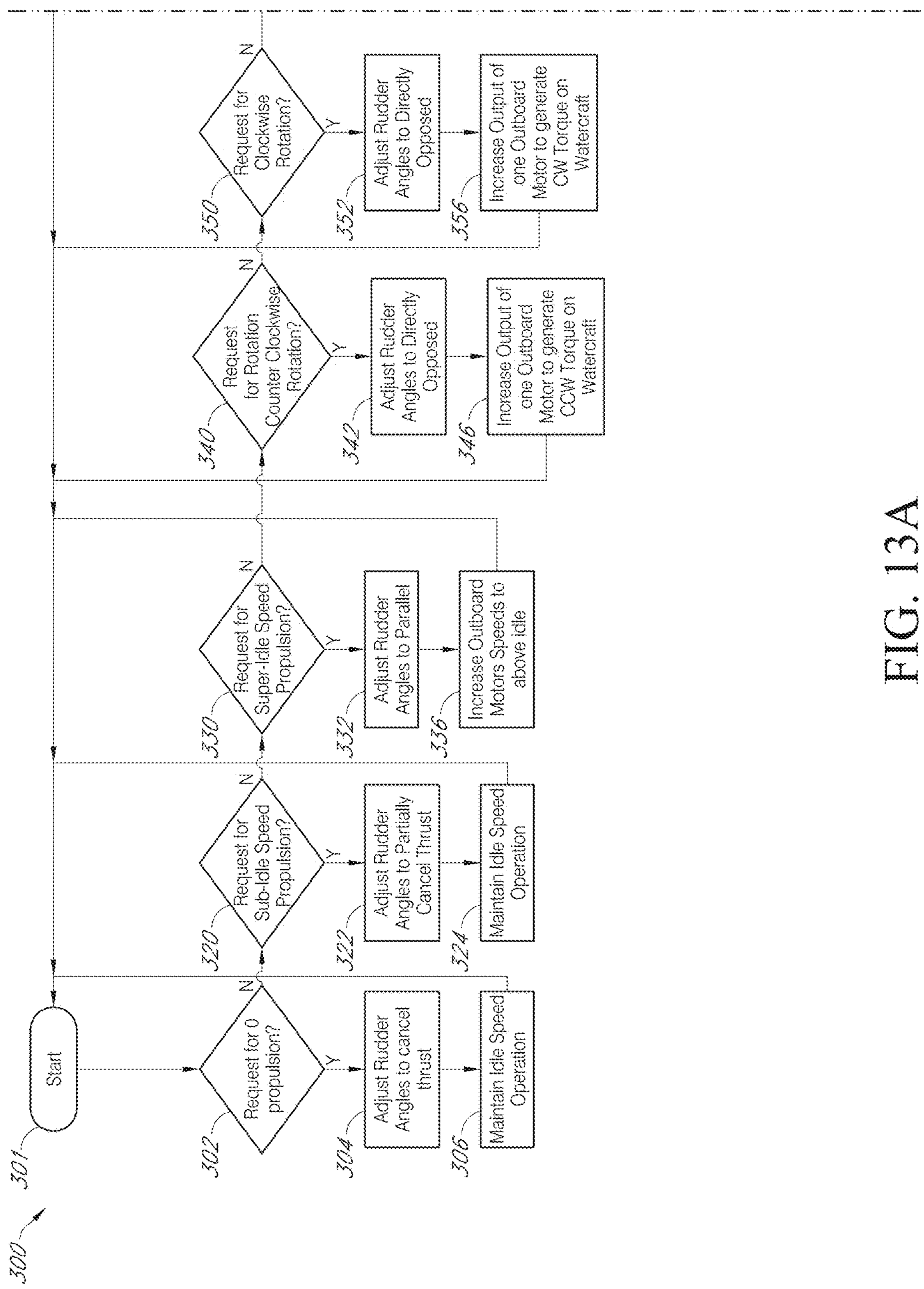
FIG. 13A is a first portion of a flowchart illustrating a control routine that can be used with the watercraft system of FIG. 4.
Figure 13B:
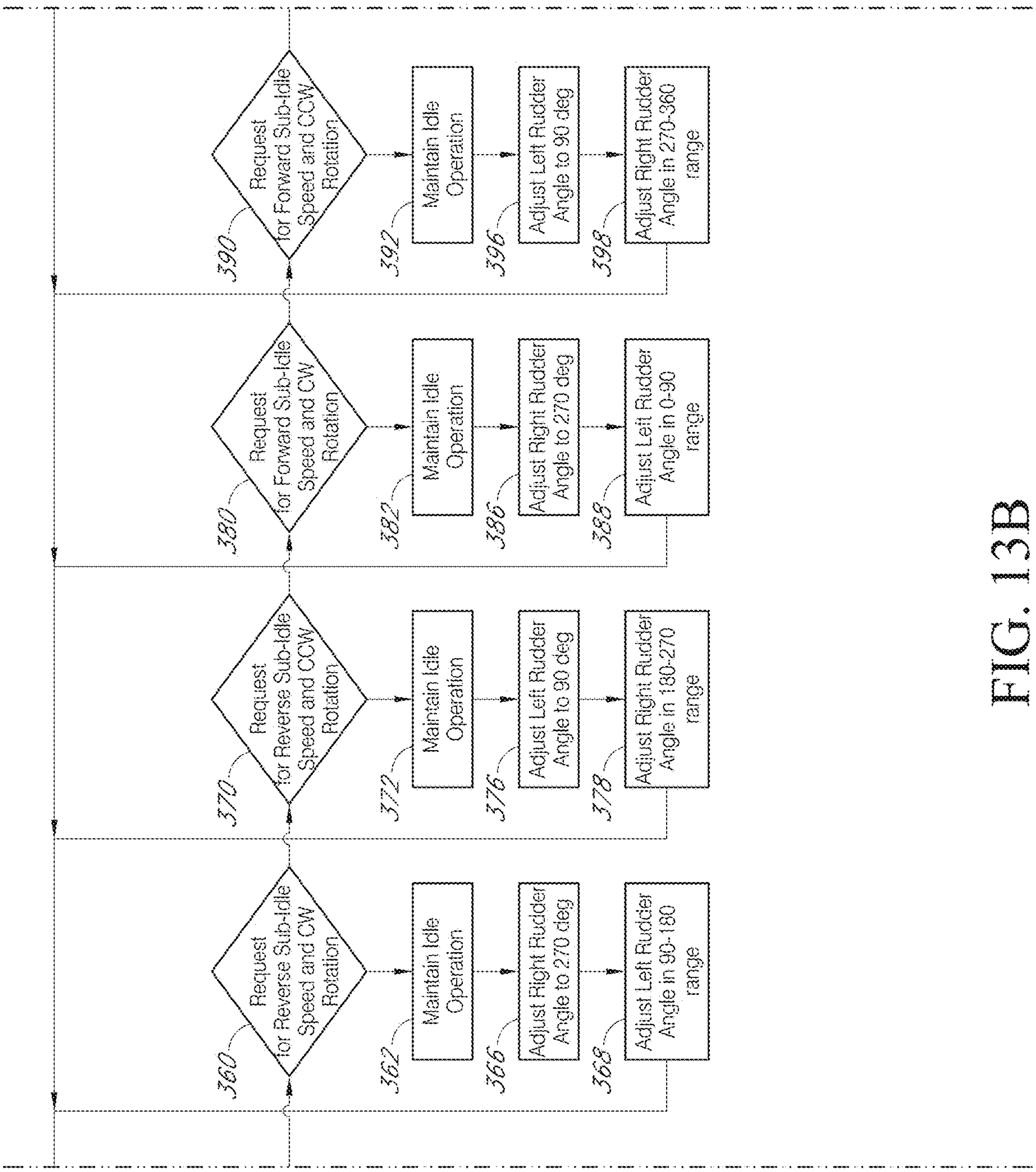
FIG. 13B is a second portion of the flowchart partially illustrated in FIG. 13A.
Figure 13C:
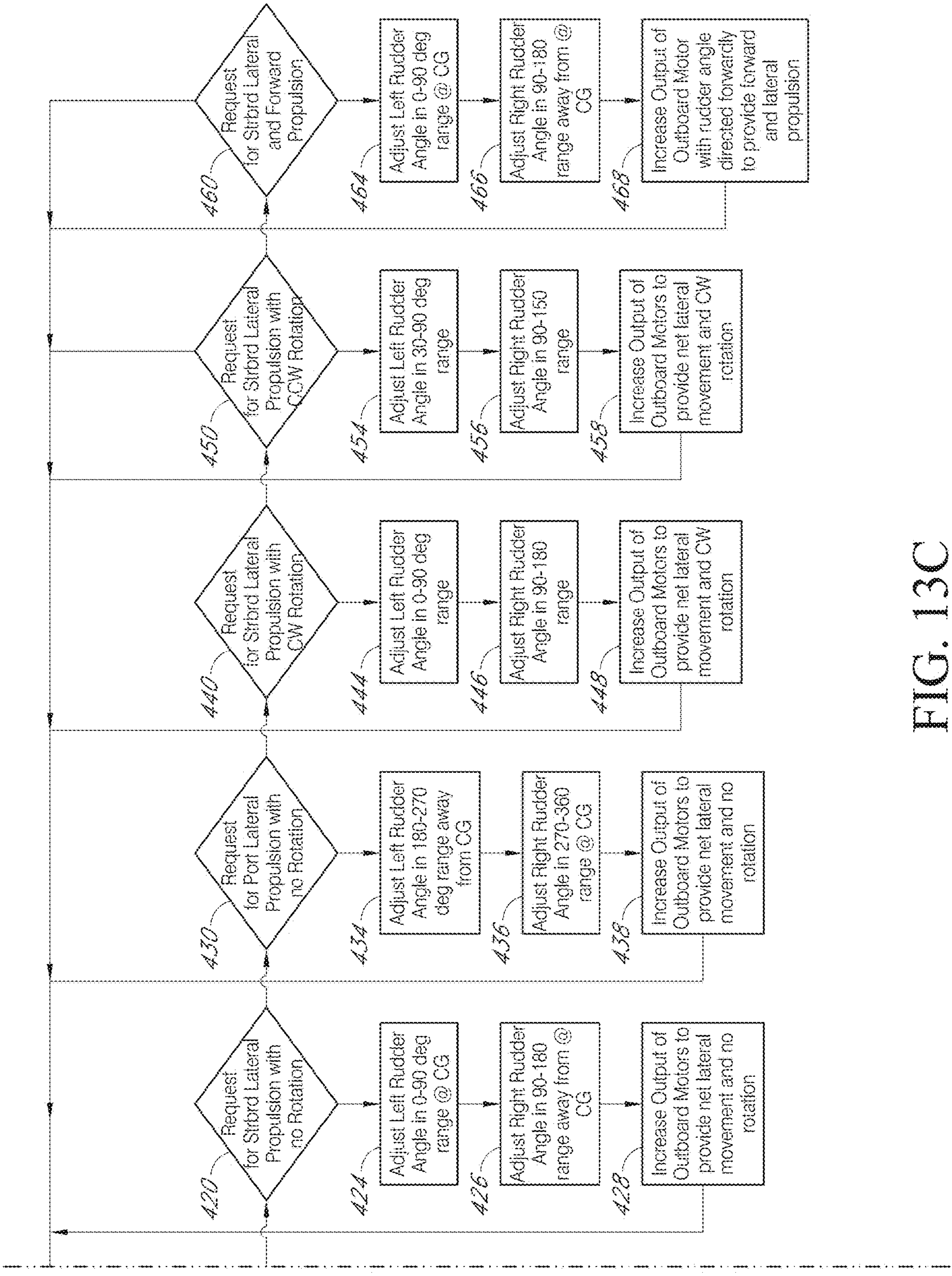
FIG. 13C is a third portion of the flowchart partially illustrated in FIG. 13A.

FIGS. 13A-13C illustrate a control routine 300 that can accommodate various modes of operation, including "sole operation" and "composite operations". For example, the control routine 300 can include an operation block 301 in which the routine starts. The control routine, as noted above, can accommodate various different modes of operation.

While the explanation of an embodiment based on FIGS. 13A-13C is limited to the control of the peripheral motors 11a, 11b, the control of the central motors 1a, 1a are fully disclosed in the co-pending Non-provisional patent application Ser. No. 17/655,962, filed Mar. 22, 2021 the entire contents of which is hereby incorporated by reference.

For example, with respect to the zero propulsion mode described above with FIG. 5A, the control routine can include decision block 302 in which whether the user has issued a request for zero propulsion is determined. For example, the controller 10 can determine, with the sensor 230, whether the joystick 23 is in its default position 23a (FIG. 5A). When it is determined that the joystick 23 is in the default joystick position 23a, the routine can move on to operation block 304.

In operation block 304, the controller 10 can adjust the rudder angles of the peripheral motors 11a, 11b to be in direct opposition, to thereby cancel all thrust or substantially all thrust generated by the peripheral motors 11a, 11b. The motors 112a, 112b can be maintained at an idle speed operation (operation block 306).

After the operation bock 306, the routine 300 can return to start (the operation block 301). On the other hand, when in the decision block 310, it has been determined that the peripheral motors 11a, 11b have not been operating in the zero propulsion mode for the predetermined amount of time, the routine 300 can return to the start (the operation block 301).

Further, when in the decision block 302 it is determined that there has not been a request for a zero propulsion, the operation 300 can move to decision block 320.

In the decision block 320, it can be determined whether there has been a request for sub idle speed propulsion. For example, the controller 10 can determine whether the joystick 23 has been moved to any position within a first range of movement $R_L$ associated with sub idle speed movement. When it is determined that there has been a request received for sub idle speed movement, the rudder angles of the peripheral motors 11a, 11b can be adjusted to provide some net thrust (forward or rearward) and also to partially cancel thrust (operation block 322). For example, the rudder angles of the peripheral motors 11a, 11b can be adjusted as described above with reference to FIGS. 4B and 5A. Additionally, the peripheral motors 11a, 11b can be maintained at idle operation, for example, leaving the throttle valves of the peripheral motors 11a, 11b at the idle positions (operation block 324). After the operation block 324, the routine 300 can return to the start (the operation block 301).

When, at the decision block 320, it is determined that a request for sub idle speed propulsion has not been received, the routine 300 can move to decision block 330. In the decision block 330 whether there has been a request for super idle speed propulsion can be determined. For example, the controller 10 can detect whether the joystick 23 has been moved to super idle speed range $F_H$ or $R_H$, as described above with reference to FIGSs. 5C, 5D, 6B, and 6C. When it has been determined that the joystick 23 has been moved into the super idle speed propulsion range $F_H$ or $R_h$, the routine can continue to adjust the rudder angles of the peripheral motors 11*a*, 11*b* to parallel, for example, parallel with the longitudinal axis L of the watercraft 100 (operation block 332). After the operation block 336, the routine 300 can return to the start (the operation block 301).

When, in the decision block 330, it is determined that there has not been a request for super idle speed propulsion, the operation 300 can move to decision block 340. In the decision block 340, it can be determined whether there has been a request for counterclockwise rotation. For example, the controller 10 can read an output of the sensor 230 to determine if the joystick 23 has been twisted about the z axis. When it is determined that there has been a request for counterclockwise rotation, the operation 300 can continue to operation block 342 in which the rudder angles of the peripheral motors 11*a*, 11*b* are adjusted to be directly opposed, for example, in the orientation illustrated in FIG. 8. Additionally, the output of the left peripheral motor 11*a* can be increased to an output greater than an output of the right peripheral motor 11*b* then operating, to thereby create a net positive counterclockwise torque on the watercraft 100, as described above with reference to FIG. 8(the operation block 346). After the operation block 346, the routine 300 can return to start (the operation block 301).

When, in the decision block 340, it is determined that counterclockwise rotation has not been requested, the routine 300 moves on to decision block 350. In the decision block 350, it can be determined whether a request for clockwise rotation has been requested. When a request for clockwise rotation has been requested, the rudder angles of the left and right peripheral motors 11*a*, 11*b* can be adjusted to be in direct opposition (operation block 352), and the output of the right peripheral motor 11*b* can be increased to an output greater than that of the left peripheral motor 11*a*, to thereby create a clockwise torque on the watercraft 100, as described above with reference to FIG. 7 (the operation block 356). After the operation block 356, the routine 300 can return to start (the operation block 301). When, in the operation block 350, it is determined that clockwise rotation has not been requested, the routine 300 can move to decision block 360.

In the decision block 360, it can be determined whether a request for a reverse sub idle speed and clockwise rotation has been requested. when a request for a reverse sub idle speed and clockwise rotation has been requested, the routine 300 can move on to operation block 362 and adjust the right rudder angle to approximately 270°, including variances of +/−5° (operation block 366), and adjust the left rudder angle to the range of 90° to 180° (operation block 368), in the manner described above with reference to FIG. 10B. As such, reverse sub idle speed and clockwise rotation of the watercraft 100 would result. After operation block 368, the routine 300 can return to start (the operation block 301).

When, in the decision block 360, it has been determined that there has been no request for reverse sub idle speed and clockwise rotation, the routine 300 can move to decision block 370. In the decision block 370, it can be determined whether a reverse sub idle speed and counterclockwise rotation has been requested. When a reverse sub idle speed and counterclockwise rotation has been requested, the routine 300 can move on to operation block 372 and maintain both peripheral motors 11*a*, 11*b* in idle operation. Additionally, the left rudder angle can be adjusted to approximately 90°, such as 90+/−5° (operation block 376), and the right rudder angle can be adjusted in a range of 180° to 270°, as described above with reference to FIG. 10B. As such, reverse sub idle speed and counterclockwise rotation of the watercraft 100 would result. After the operation block 378, the routine 300 can return to start (the operation block 301).

When, in the decision block 370, it is determined that a request for reverse sub idle and counterclockwise rotation has not been requested, the routine 300 can move to decision block 380. In the decision block 380, it can be determined whether a request for forward sub idle speed and clockwise rotation has been requested. When a request for forward sub idle speed and clockwise rotation has been requested, the peripheral motors 11*a*, 11*b* can be maintained in an idle operation (operation block 382). The right rudder angle can be adjusted to approximately 270°, such as 270+/−5° (operation block 386) and the left rudder angle can be adjusted to an angle within the range of 0° to 90° (operation block 388). As such, forward sub idle speed and clockwise rotation of the watercraft 100 would result. After the operation block 388, the routine 300 can be returned to start the (operation block 301).

When, in the decision block 380, it is determined that a request for forward sub idle speed and clockwise rotation has not been requested, the routine 300 can move to decision block 390. In the decision block 390, it can be determined whether a forward sub idle speed and counterclockwise rotation has been requested. When a forward sub idle speed and counter-clockwise has been requested, the peripheral motors 11*a*, 11*b* can be maintained at idle (operation block 392), the left rudder angle can be adjust to approximately 90°, such as 90+/−5° (operation block 396), and the right rudder angle can be adjust to an angle within the range of 270°-360° (operation block 398), as described above with reference to FIG. 9B. As a result, forward sub idle speed and counterclockwise rotation of the watercraft 100 would result. After the operation block 398, the routine 300 can return to start (the operation block 301).

When, in the decision block 390, a forward sub idle speed and counterclockwise rotation has not been requested, the routine 300 can move onto decision block 420 (FIG. 13C).

In decision block 420 it can be determined whether there has been a request for starboard lateral propulsion with no rotation and if so the routine 300 moves to operation block 424. In operation block 424, the left rudder angle can be adjusted in the 0° to 90° range to be directed at the center of pressure CP of the watercraft 100 and in operation block 426, the right rudder angle can be adjusted to the range of 90° to 180° and directed substantially away from the center of pressure CP, as described above with reference to FIG. 11B. Optionally, operation block 428, the output of the peripheral motors 11*a*, 11*b* can be increased to provide the desired amount of movement of the watercraft 100 by the peripheral motors 11*a*, 11*b*. After the operation block 428, the routine 300 can return to start (the operation block 301).

When, in the decision block 420, it is determined that a request for starboard lateral propulsion has not been received, the routine can move to the decision block 430. In the decision block 430, it can be determined whether there has been a request for port lateral movement with no rotation. When it has been determined that a request has been received for port lateral propulsion with no rotation, and the left rudder angle can be adjusted to 180° to 270° substantially away from the center of pressure CP of the watercraft 100 (operation block 434) and the right rudder angle can be adjusted to a range of 270° to 360°, and substantially directly at the center of pressure CP (operation block 436), such as that described above with reference to FIG. 11A. Optionally, the output of the peripheral motors

11*a*, 11*b* can be increased to provide the desired speed of lateral movement (operation block 438), as described above with reference to FIG. 11A. After the operation block 438, the routine 300 can return to start (the operation block 301).

When, in the decision block 430, it is determined that a request for port-side lateral movement with no rotation has not been received, the routine 300 can move on to decision block 440. In the decision block 440 it can be determined whether a request has been received for starboard lateral propulsion with clockwise rotation. When such a request has been received, the left rudder angle can be adjusted to the 0° to 90° range so as to pass on the left side of the center of pressure CP of the watercraft 100 (operation block 444) and the right rudder angle can be adjust to the 90° to 100° range along the direction passing to the right of the center of pressure CP of the watercraft 100 (operation block 446). This would result in a net clockwise torque on the watercraft 100, as well as a net starboard lateral thrust on the watercraft 100, causing both lateral movement towards the starboard-side plus clockwise rotation, as described above with reference to FIG. 12B. Additionally, in operation block 448, the output of the peripheral motors 11*a*, 11*b* can be increased to provide the desired rate of movement and rotation (operation block 448). After the operation block 448, the routine can return to start (the operation block 301).

When, in the decision block 440, it is determined that a request for starboard lateral propulsion with clockwise rotation has not been received, the routine 300 can move to the decision block 450. In the decision block 450, it can be determined whether a request for starboard lateral propulsion with counterclockwise rotation has been received. When such a request has been received, the left rudder angle can be adjusted to the 0° to 90° range along an angle that passes to the right of the center of pressure CP of the watercraft (operation block 454) and the right rudder angle can be adjust to the 90° to 180° range along a direction that passes to the left of the center of pressure CP of the watercraft 100 (operation block 456). These orientations would generate a net starboard lateral thrust and a net counterclockwise torque on the watercraft as described above with reference to FIG. 12A. Optionally, the output of the peripheral motors 11*a*, 11*b* can be increased to provide a desired rate of movement of the watercraft (operation block 458). After the operation block 458, the routine can return to start (the operation block 301).

When, in the decision block 450, a starboard lateral propulsion with counterclockwise rotation has not been requested, the routine 300 can move onto decision block 460.

In the decision block 460 it can be determined whether there has been a request for starboard lateral and forward propulsion has been received, and when so, the routine 300 moves to operation block 464. In the operation block 464, the left rudder angle can be adjusted in the 0° to 90° range to be directed at the center of pressure CP of the watercraft 100 and in operation block 466, the right rudder angle can be adjusted to the range of 90° to 180° and directed substantially away from the center of pressure CP, as described above with reference to FIG. 11C. In operation block 468, the output of the left peripheral motors 1*a* can be further increased to provide additional forward thrust, thereby providing both starboard lateral and forward movement of the watercraft 100. After the operation block 468, the routine 300 can return to start (the operation block 301).

Figure 14:
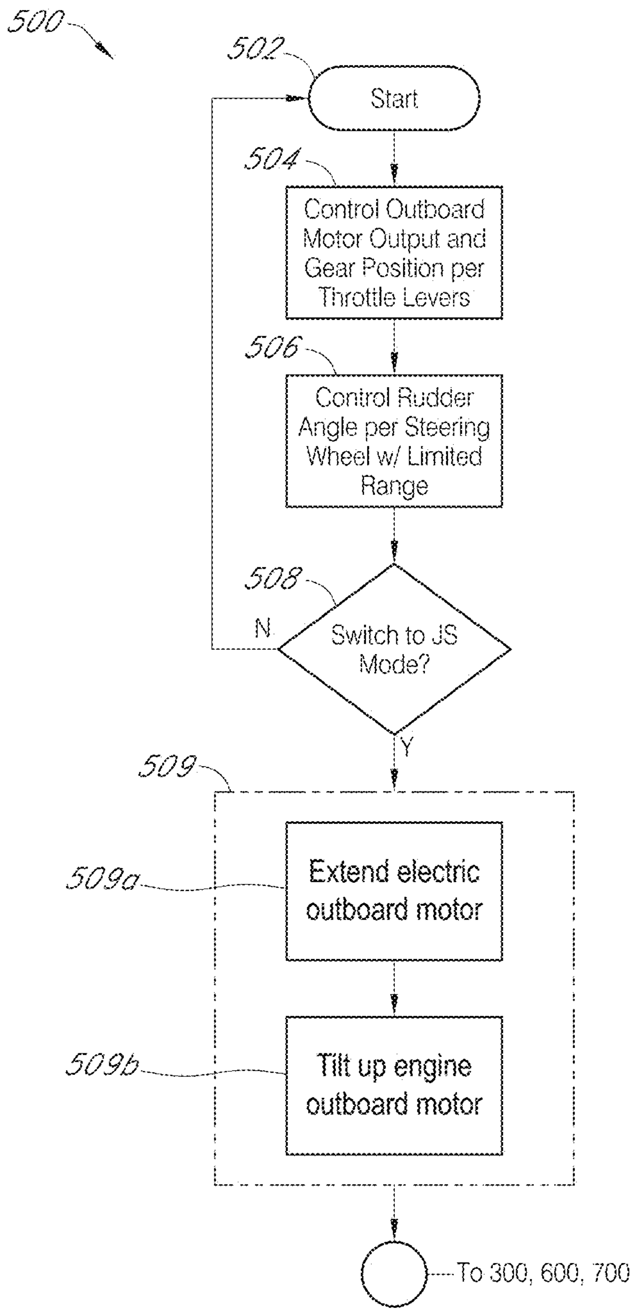
FIG. 14 is a flowchart illustrating a control routine that can be used with the watercraft system of FIG. 4 for controlling the transition to joystick mode control.

FIG. 14 illustrates a control routine 500 that can be used for transitioning control of the peripheral motors 11*a*, 11*b* and central motors 1*a* and 1*b* from an operating mode in which they are controlled based at least in part on the steering wheel and throttle levers 22*a*, 22*b*, to a second (joystick) mode in which the joystick 23 is used for propulsion control. Accordingly, control routine 500 illustratively may be implemented for use in controlling the central motors and peripheral motors depending on a determined operating mode. For example, the control routine 500 can start with operation block 502 and move to operation block 504.

In the operation block 504, the throttle opening and gear position of the peripheral motors 11*a*, 11*b* are controlled in accordance with the position of the throttle levers 22*a*, 22*b*. Additionally, the rudder angles of the peripheral motors 11*a*, 11*b* are controlled in accordance with the position of the steering wheel 21. Optionally, in some embodiments, the maximum rudder angles of the peripheral motors 11*a*, 11*b* can be limited to approximately 30° or less when the controller 10 is adjusting the rudder angles according to the position of the steering wheel 21. In other embodiments, the controller 10 can be configured to limit maximum rudder angle of the peripheral motors 11*a*, 11*b* in accordance with the curves 200-208 of FIG. 17, as described above.

The routine 500 can move to decision block 508 in which it is determined whether or not propulsion control has been switched to joystick mode. For example, the housing for mounting the throttle levers 22*a*, 22*b*, or the housing for mounting the joystick 23 can include a button for signaling the controller 10 to switch modes, or other techniques can be used to switch to joystick mode. When it is determined that the joystick mode has not been activated, the routine can return to start block 502. On the other hand, when it is determined that the joystick mode has been initiated, the routine 500 moves to operation block 509.

In the operation block 509, the controller 10 extend the control to the peripheral motors 11*a*, 11*b* that is electric outboard motors (the operation block 509*a*). In the case that the propellers 116*a*, 116*b* are in retract position, then extend the supporting rod and move the propellers 116*a*, 116*b* in deployment position. After that, controller 10 can send a control signal to tilt up the central motors 1*a*, 1*b* stopping their propeller rotation so as not to touch any portion thereof to the water to avoid unwanted drag. This is another example of automatic change of an operating mode. In another operating condition, when, prior to the time operation block 509 is initiated, the controller 10 can continue operating the left and right peripheral motors 11*a*, 11*b* at idle, adjust the rudder angles to be directly opposed. After the operation block 509, the routine 500 can continue to the routine 300 (FIG. 13), a routine 600 (FIG. 15, below), or a routine 700 (FIG. 16, below).

Figure 15:
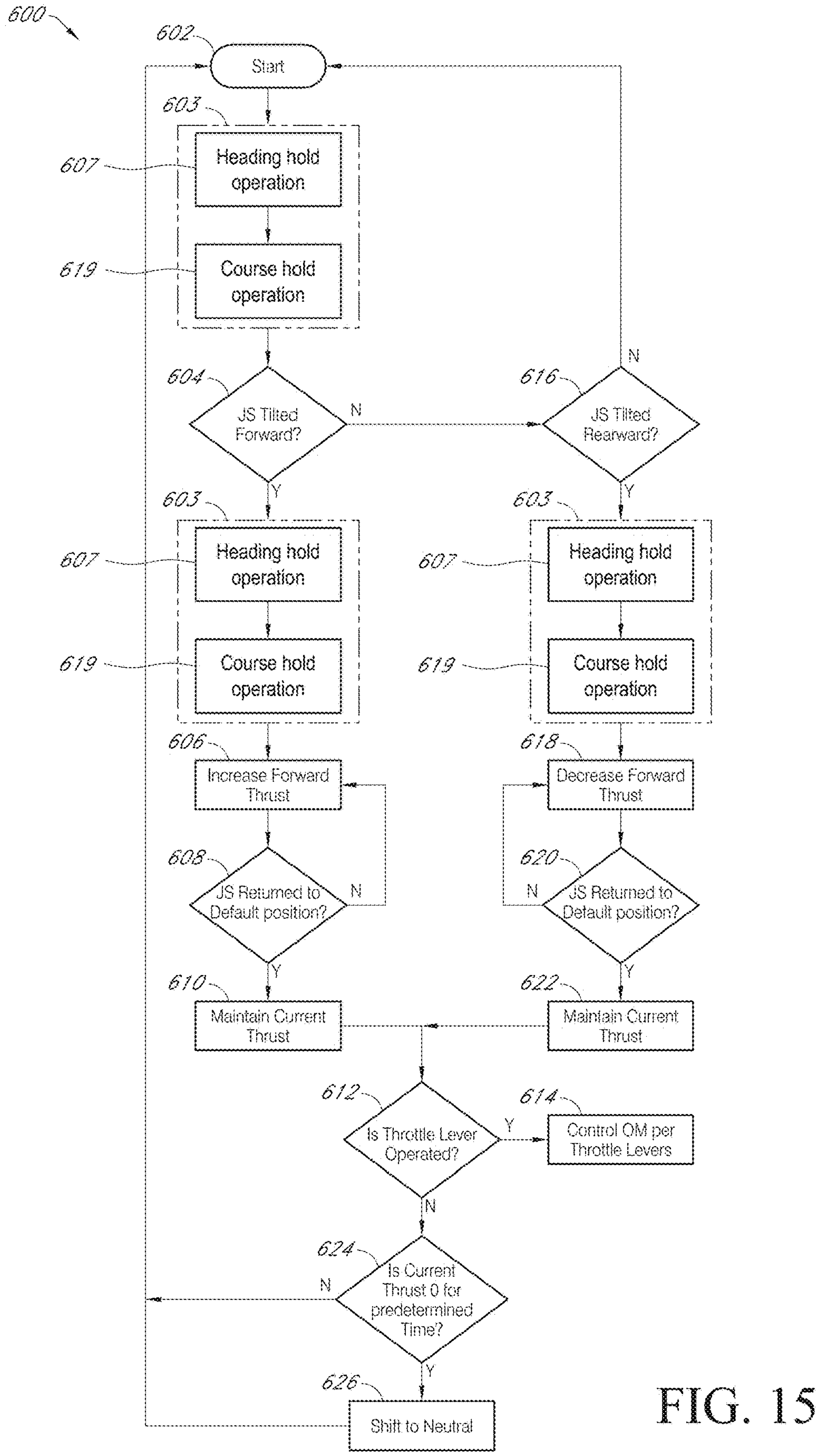
FIG. 15 is a flowchart of a control routine that can be used with a watercraft system of FIG. 4 for cruise control mode operation with joystick position integration.
Figure 16:
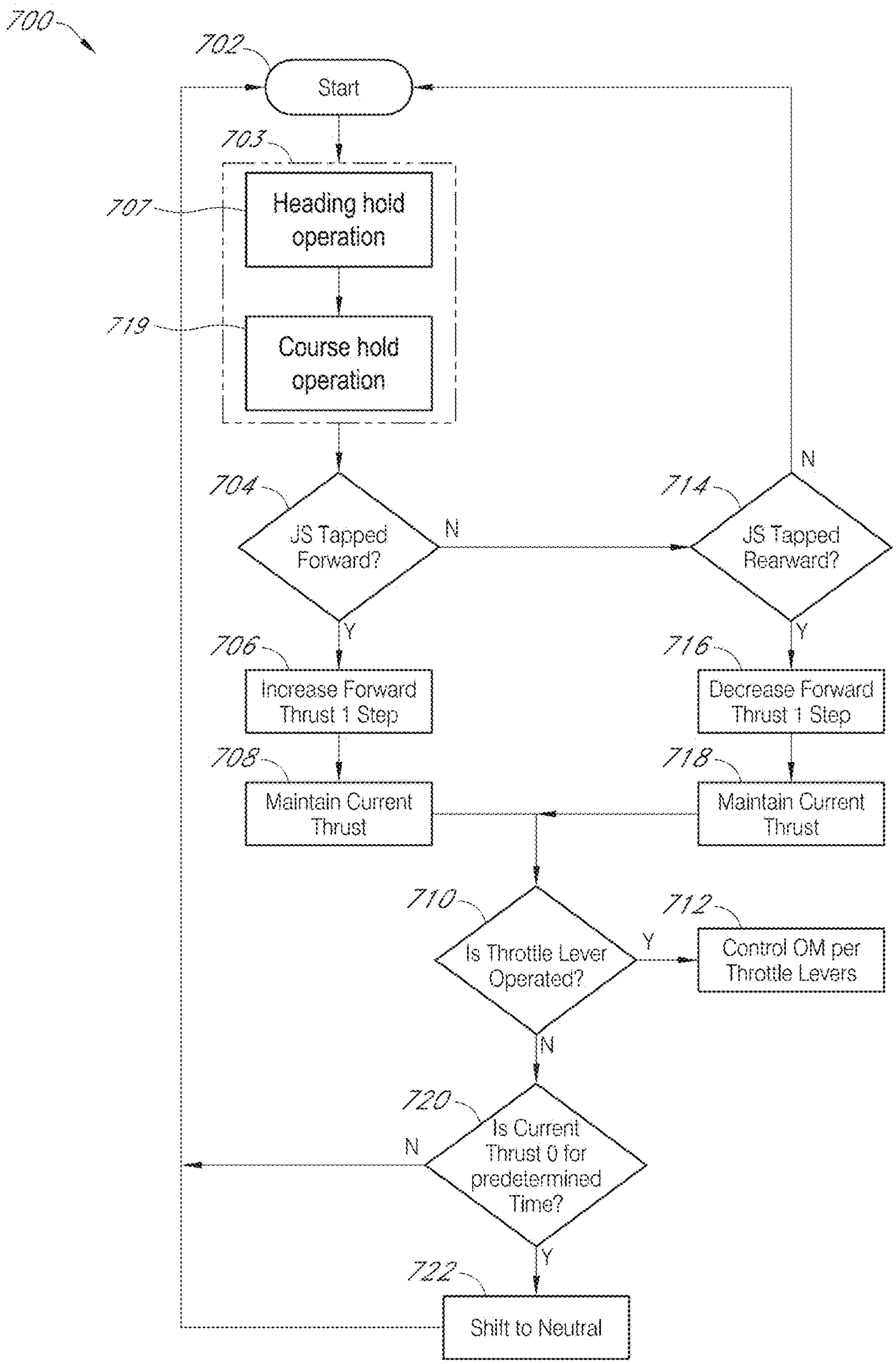
FIG. 16 is a flowchart illustrating a control routine that can be used with a watercraft system of FIG. 4 for cruise control operation with tap mode.

FIG.15 illustrates the control routine 600 that can be used in a joystick-operated, cruise control mode. For example, the controller 10 can be configured to operate the peripheral motors 11*a*, 11*b* in a cruise control mode for operation at various watercraft speeds, based at least in part on inputs to the joystick 23 in which propulsion is maintained even after the joystick 23 has been returned to its default position 23*a*. Accordingly, control routine 600 illustratively may be implemented for use in controlling at least the central motors and peripheral motors depending on a determined operating mode For example, the routine 600, can be considered a sub routine, can begin operation block 602.

In this embodiment, a navigation operation is included (the operation blocks 603). There are three places to see the operation blocks 603 in FIG. 15, which conduct the same operation as describe below and a duplicated explanation is omitted.

Immediately after starting the sub routine, the heading hold operation is executed, if activated, at operation block 607 then followed by course hold operation, if any, at operation block 619. The heading hold operation is an operation performed when a head hold mode is engaged, which means to operate the output and steering of the outboard motors to maintain a target heading by utilizing geomagnetic or GPS. And the course hold operation means manipulating the output and steering to trace a predetermined target course when a course hold mode is engaged. Both of the heading hold mode and the course hold mode are another type of sub routines and use of the watercraft selects the target heading and/or the predetermined target course beforehand and input the corresponding data to the memory connected to the controller 10.

The controller 10 can determine if the joystick 23 has been tilted in a forward position (decision block 604), and when so increase forward thrust or reduce rearward thrust (operation block 606). For example, in this mode of operation, the controller 10 can provide for a smooth and/or continuous increase in thrust depending on the tilting of the joystick 23 in the forward direction. In some operating conditions, prior to the execution of operation block 606, the controller 10 might be currently operating the peripheral motors 11*a*, 11*b* to produce a net forward thrust and thus forward propulsion of the watercraft 100. As such, the controller 10 would increase forward thrust in operation block 606. In other scenarios, for example, when the controller 10 was currently operating the peripheral motors 11*a*, 11*b* to produce a net rearward thrust and thus rearward propulsion of the watercraft 100, the controller 10 would then decrease rearward thrust in operation block 606.

In some embodiments, to increase forward thrust, the controller 10 can be configured to increase the power output from the outboard motors 1*a*, 1*b*, 11*a*, 11*b*, for example by opening the throttle valves of the engines 2*a*, 2*b* and/or increase the electric current input to the motor 116*a*, 116*b* to a degree proportional to the deflection or tilting of the joystick 23. Optionally, the controller 10 can incorporate an integrator unit, to increase the power output of the outboard motors 1*a*, 1*b*, 11*a*, 11*b*, for example, by opening the throttle valves and/or decrease the electric current input to the motor 116*a*, 116*b* more gradually than the detected movement of the joystick 23, based at least in part on an integration of the detected position of the joystick 23. As described above with reference to FIG. 4, the controller 10 can include an integrator unit, other structures or software for providing such an integrator operation.

After the operation block 603 and 606, the routine 600 can move to decision block 608 in which it is determined whether the joystick 23 has been returned to the default position 23*a*. When it is determined that the joystick 23 has not been returned to the default position 23*a*, the routine 600 can return to operation block 606 and continue to increase forward thrust. On the other hand, when it is determined in decision block 608 that the joystick 23 has not been returned to the default position 23*a*, the routine 600 can move to operation block 610.

In the operation block 610, the then-current thrust generated by the outboard motors 1*a*, 1*b*, 11*a*, 11*b* can be maintained. For example, the controller 10 can maintain the power output of the outboard motors 1*a*, 1*b*, 11*a*, 11*b* by maintaining the position of the throttle valves in the engines 2*a*, 2*b* and/or the electric current input to the motor 116*a*, 116*b* at their then-current position. As such, the watercraft 100 will continue under the thrust generated by the outboard motors 1*a*, 1*b*, 11*a*, 11*b*, despite the joystick 23 having returned to the default position 23*a*. Alternatively, in the operation block 610, the controller 10 can incorporate a speed control function to maintain a detected watercraft speed.

The routine 600 can then move to decision block 612 in which it is determine whether the throttle levers 22*a*, 22*b* have been operated. For example, the controller 10 can detect the output of sensors 221, 222 to determine that the throttle levers 22*a*, 22*b* have been moved. When it is determined that the throttle levers 22*a*, 22*b* have been moved, the routine 600 can move to operation block 614 and end the cruise control mode and control the output of the outboard motors 1*a*, 1*b*, 11*a*, 11*b* based on the throttle levers 22*a*, 22*b* and/or the electric current input to the motor 116*a*, 116*b*, and the rudder angles according to the steering wheel 21, effectively terminating the cruise control mode.

On the other hand, when it is determined that the throttle levers 22*a*, 22*b* have not been operated, the routine 600 can move to optional decision block 624 to determine whether the current thrust request has been zero for a predetermined amount of time. For example, a zero thrust request could occur in this mode when the watercraft was under rearward propulsion and the user had pushed the joystick 23 forward sufficiently to result in the controller 10 determining that a zero thrust has been requested. When a zero thrust has been requested for a particular time frame (e.g., a predetermined amount of time), the routine 600 can move to operation block 626 and shift the outboard motors 1*a*, 1*b*, 11*a*, 11*b* to neutral. The routine 600 can then return to start (the operation block 602). On the other hand, if it is determined that a zero thrust has not been requested for a predetermined amount of time, the routine 600 can move from the decision block 624 to start (the operation block 602).

When, in the decision block 604, it is determined that the joystick 23 has not been tilted forward, the routine 600 can move to decision block 616. In the decision block 616, it can be determined whether the joystick 23 has been tilted rearwardly. When it is determined that the joystick 23 has not been tilted rearwardly, the routine 600 can return to start 602.

On the other hand, when, after finishing the operation block 603 in the decision block 616, it is determined that the joystick 23 has been tilted rearwardly, the routine 600 moves to operation block 618.

In the operation block 618, controller 10 decreases forward thrust or increase rearward thrust of the outboard motors 1*a*, 1*b*, 11*a*, 11*b*. As described above with regard to the operation block 606, in the operation block 618, the controller 10 can decrease the forward thrust being generated by the outboard motors 1*a*, 1*b*, 11*a*, 11*b* by an amount proportional to the movement or the tilt angle of the joystick 23 in the rearward direction. In some embodiments, when the outboard motors 1*a*, 1*b*, 11*a*, 11*b* were then providing a current forward thrust, then the controller 10 could reduce the amount of forward thrust in proportion to the movement of the joystick 23 in the rearward direction. Alternatively, when the thrust then existing was zero, the controller 10 can then generate a rearward thrust. On the other hand, when the thrust from the outboard motors 1*a*, 1*b*, 11*a*, 11*b* was already a rearward thrust, the rearward thrust can be increased. Additionally, the decrease of forward thrust can be considered as an increase of negative (−) forward thrust, or in other words, an increase of rearward thrust.

After the operation block 618, the routine 600 can move to decision block 620. In the decision block 620, it can be determined whether the joystick 23 has been returned to the default position 23*a*. When it determined that the joystick 23 has not been returned to the default position 23*a*, the routine 600 can return to operation block 618 and continue to decrease forward thrust. On the hand, when it is determined in the decision block 620 that the joystick 23 has been returned to the default position 23*a*, the routine 600 moves to operation block 622 and maintains the then-current thrust whether it is a positive forward thrust or a negative forward thrust (e.g., a rearward thrust). After the operation block 622, the routine 600 can move to decision block 612 and repeat as described above.

Optionally, during operation of the routine 600, the controller 10 can be configured to control the rudder angles of the outboard motors 1*a*, 1*b*, 11*a*, 11*b* in accordance with a twisting movement of the joystick 23, rightward or leftward. In some embodiments, the controller 10 can be configured to control the rudder angles of the outboard motors 1*a*, 1*b*, 11*a*, 11*b* in accordance with a lateral, leftward and rightward tilting of the joystick 23, in this mode of operation. Further, optionally, the maximum steering angles of the outboard motors 1*a*, 1*b* can be limited in accordance with the above description of FIG. 17 when the outboard motors la, 1*b*, 11*a*, 11*b* are operated in super idle watercraft speed modes, e.g., when the throttle valves of the engines are opened to greater than 0%.

FIG. 16 illustrates another control routine 700 that can be used for an alternative joystick cruise control mode in which thrust is changed in a stepwise manner in response to inputs to the joystick 23. For example, the routine 700 can start at operation block 702 and conduct a navigation operation as shown (the operation block 703). The navigation operation includes the heading hold operation (the operation block 707) and a course hold operation (the operation block 719) that is the same operation as the heading hold operation (the operation block 607) and a course hold operation (the operation block 619) in FIG. 15 respectively. determine whether the joystick 23 is "tapped" in a forward direction (decision block 704) or "tapped" in a rearward direction (decision block 714). One example of a "tap" input to the joystick can be when the joystick 23 is tilted, forward or rearward, then returned to the default position 23*a*. Such an input would be characterized by the controller receiving a signal from the sensor 230, corresponding to a forward or rearward movement of the joystick 23, followed by another signal indicating that the joystick 23 has returned to the default position 23*a*. Optionally, the controller 10 can be configured to recognize a dead zone of joystick movements. For example, the controller 10 can be configured to ignore tilting of the joystick 23 when the tilting is less than a particular value, such as a predetermined amount of the range of movement of the joystick, e.g., 10%, or any other desired limit. Other limitations can also be used for distinguishing between an intentional and unintentional "taps".

When it is determined, in decision block 704, that the joystick 23 has been "tapped" in the forward direction, the routine 700 moves to operation block 706 and increases forward thrust one step, or by one amount (e.g., a predetermined amount). In some situations, the then-current thrust generated by the outboard motors 1*a*, 1*b*, 11*a*, 11*b* could be in the net rearward direction. Thus, in operation block 706 in which the forward thrust in increased by one step, the then-current rearward thrust would be reduced by one step. Additionally, the then existing thrust produced by the outboard motors 1*a*, 1*b*, 11*a*, 11*b* could be zero. In that situation, in operation block 706, the net thrust generated by the outboard motors 1*a*, 1*b*, 11*a*, 11*b* would be increased from zero to a net forward thrust. Similarly, when the net thrust generated by the outboard motors 1*a*, 1*b*, 11*a*, 11*b* already was a positive forward thrust, the thrust, in operation block 706, would be increased by a step. As described above, any number of steps can be used over any range of propulsion modes, including sub idle and super idle ranges of propulsion. After the operation block 706, the routine 700 can move to operation block 708.

In the operation block 708, the then-current thrust generated by the outboard motors 1*a*, 1*b*, 11*a*, 11*b* is maintained, despite the joystick 23 having returned to its default position 23*a* after having been "tapped" as described above. After operation block 708, the routine 700 moves to decision block 710 in which it can be determined whether either of the throttle levers 22*a* or 22*b* have been operated. When it is determined that either of the throttle levers 22*a* or 22*b* have been operated, the routine 700 moves to operation block 712 and terminates the joystick cruise control mode and thus control of the output of the outboard motors 1*a*, 1*b*, 11*a*, 11*b* is controlled in accordance with the throttle levers 22*a*, 22*b* and the rudder angles are controlled based on signals from the steering wheel sensor 210.

On the other hand, when it is determined in decision block 710 that the throttle levers 22*a* or 22*b* have not been operated, the routine 700 can move to operation block 720 to determine whether zero thrust has been requested for a particular time frame (e.g., a predetermined amount of time). As described above with reference to the decision block 612, the controller 10 can determine whether the outboard motors 1*a*, 1*b*, 11*a*, 11*b* have been operated at a zero-thrust mode for a predetermined amount of time. when it is determined that the then-current thrust has not been zero for a predetermined amount of time, the routine 700 can return to start (operation block 702). On the other hand, when it is been determined that the then-current thrust has been zero for a predetermined amount of time, the routine moves to operation block 722 and shifts the outboard motors 1*a*, 1*b*, 11*a*, 11*b* to neutral and returns to start (the operation block 702).

When it is determined in the decision block 714 that the joystick 23 has not been tapped in a rearward direction, the routine 700 can return to start (operation block 702). On the other hand, when it is determined in decision block 714 that the joystick has been tapped rearwardly, the routine can move to operation block 714 and decrease forward thrust by one step. For example, as described above with reference to FIG. 15 and operation block 618, the controller 10 can control the outboard motors 1*a*, 1*b*, 11*a*, 11*b* to decrease forward thrust from the then-current thrust generated by the outboard motors 1*a*, 1*b*, 11*a*, 11*b*. Thus, in some circumstances, the outboard motors 1*a*, 1*b*, 11*a*, 11*b* may already be producing a net forward thrust. In such a situation, the controller 10 can control the outboard motors 1*a*, 1*b*, 11*a*, 11*b* to reduce the thrust by one step. For example, when the outboards 1*a*, 1*b*, 11*a*, 11*b* were then producing a super idle thrust, then the controller 10 would reduce the throttle openings of the outboard motors 1*a*, 1*b*, 11*a*, 11*b* to thereby reduce the total output and total thrust generated. When the outboard motors 1*a*, 1*b*, 11*a*, 11*b* were in a state of idle speed operation, then the controller 10 would maintain the outboard motors 1*a*, 1*b*, 11*a*, 11*b* operating in an idle mode and adjust the rudder angles to be partly or more opposed. For example, adjusting the rudder angles either more towards or more away from each other. In some scenarios, the reduction of forward thrust could result in a request for zero thrust, in which the controller 10 would maintain the outboard motors 1*a*, 1*b*, 11*a*, 11*b* in idle speed operation and adjust the rudder angles to be directly opposed to thereby generate zero thrust. Additionally, were the then existing thrust to be a zero-thrust mode, the controller 10 would adjust the rudder angles of the outboard motors 1*a*, 1*b*, 11*a*, 11*b* to be partially rearward and partially opposed, thereby generating a net rearward thrust.

When the then-existing thrust generated by the outboard motors 1*a*, 1*b*, 11*a*, 11*b* was a sub idle rearward thrust, the controller 10 can adjust the rudder angles of the outboard motors 1*a*, 1*b*, 11*a*, 11*b* to be more rearward and less opposed, thereby increasing the rearward thrust. When the then existing thrust the outboard motors 1*a*, 1*b*, 11*a*, 11*b* was idle speed operation with the rudder angles being parallel and pointing rearwardly, the controller 10 could increase the throttle opening of the engines 2*a*, 2*b* to thereby increase thrust in the rearward direction.

After the stepwise decrease for forward thrust in the operation block 716, the routine 700 can move to operation block 718. In the operation block 718, the controller 10 can maintain the then current thrust generated by the peripheral motors 1*a*, 1*b*, 11*a*, 11*b* despite the joystick 23 having been returned to its default position 23*a*. After the operation block 718, the routine 700 can move to decision block 710 and repeat as described above.

The controller 10 can also be configured to present an optional parameter adjustment interface for a user. For example, the controller can present on a display an interface for allowing a user to adjust parameters such as throttle dead zone, max throttle percent, a max differential angle.

In some embodiments, a thrust of a motor may mean force applied to fluid (e.g., water) by the motor, thrust of a watercraft may mean force that propels the watercraft, speed of the watercraft may mean a speed of the movement of the watercraft and include a velocity, velocity of the watercraft may mean the speed of the watercraft in a particular direction, propulsion of the watercraft may mean a propulsive power of the watercraft and be determined as the product of the thrust of the watercraft and the velocity of the watercraft, and torque of the watercraft may mean rotational force about a center of pressure of the watercraft that can change an orientation of the watercraft. It should be noted that any motor type (such as an internal combustion engine or an electric motor) can be used for the central motor(s) or the peripheral motor(s).

Unless the context clearly requires otherwise, throughout the description and the claims, the words "comprise," "comprising," "include," "including" and the like are to be construed in an inclusive sense, as opposed to an exclusive or exhaustive sense; that is to say, in the sense of "including, but not limited to." The word "connected" as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments.

Furthermore, language such as "up to," "at least," "greater than," "less than," "between," and the like includes the number recited. Numbers preceded by a term such as "approximately", "about", and "substantially" as used herein include the recited numbers (e.g., about 10%=10%), and also represent an amount close to the stated amount that still performs a desired function or achieves a desired result. For example, the terms "approximately", "about", and "substantially" may refer to an amount that is within less than 10% of, within less than 5% of, within less than 1% of, within less than 0.1% of, and within less than 0.01% of the stated amount.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A system for controlling a watercraft comprising:
at least one central motor comprising an internal combustion engine;
a left peripheral electric motor on a port side of the watercraft relative to the at least one central motor;
a right peripheral electric motor on a starboard side of the watercraft relative to the at least one central motor;
a joystick unit comprising a joystick-configured to be tiltable in a plurality of directions, wherein the joystick unit is configured to output joystick position signals responsive to tilting of the joystick in the plurality of directions, wherein the joystick position signals are configured to control movement of the watercraft; and
a controller communicating with the joystick unit to receive at least the outputted joystick position signals from the joystick unit and communicating with the left and right peripheral electric motors, and the at least one central motor to at least provide control instructions to control a magnitude and a direction of a thrust generated by each of the left and right peripheral electric motors and the at least one central motor;
wherein:
the controller selectably provides the control instructions to the at least one central motor in preference to the left and right peripheral electric motors responsive to receipt of joystick position signals from the joystick unit during a first specified control mode; and
the controller selectably provides the control instructions to the left and right peripheral electric motors and the at least one central motor responsive to receipt of joystick position signals from the joystick unit during a third specified control mode,
wherein in the third control mode, the control instructions to the left and right peripheral electric motors and the at least one central motor are associated with individual output ratios relative to a maximum output of each motor, wherein an output ratio associated with the left and right peripheral electric motors is greater than an output ratio associated with the at least one central motor.

2. The system for controlling a watercraft according to claim 1, wherein the controller is selectable to provide the control instructions to the left and right peripheral electric motors in preference to the at least one central motor based on a second specified control mode.

3. The system for controlling a watercraft according to claim 2, wherein the controller is further configured to prevent control instructions to the at least one central motor based on the second specified control mode.

4. The system for controlling a watercraft according to claim 2, wherein the controller is configured to cause the central motor to tilt up during the operation of the second specified control mode.

5. The system for controlling a watercraft according to claim 1, wherein the left and right peripheral electric motors correspond to retractable and deployed positions and wherein the controller is configured to cause the left and right peripheral electric motors to engage in a deployed position during operation of a second specified control mode.

6. The system for controlling a watercraft according to claim 5, wherein the controller is configured to cause the left and right peripheral electric motors to engage in a retracted position during operation of the first specified control mode.

7. The system for controlling a watercraft according to claim 1, wherein a steering angle range of rotatable angle of the peripheral electric motor in vertical axis is larger than that of the at least one central motor.

8. The system for controlling a watercraft according to claim 1, wherein maximum thrust obtained by the peripheral electric motor is set smaller than the at least one central motor.

9. The system for controlling a watercraft according to claim 1, wherein, responsive to joystick position signals corresponding to zero propulsion, the controller selectably provides the control instructions to the left and right peripheral electric motors to cause the left and right peripheral electric motors to generate thrust in opposing directions.

10. The system for controlling a watercraft according to claim 1, wherein responsive to joystick control instructions generated from a tilt of the joystick in a right direction, the controller selectably provides the control instructions to the left and right peripheral electric motors to cause the left and right peripheral electric motors to generate thrust corresponding to a net propulsion force in the right direction and corresponding to a net moment of zero.

11. The system for controlling a watercraft according to claim 1, wherein responsive to joystick control instructions generated from a twist motion of the joystick, the controller selectably provides the control instructions to the left and right peripheral electric motors to cause the left and right peripheral electric motors to generate thrust corresponding to a non-zero net moment.

12. The system for controlling a watercraft according to claim 1, wherein the at least one central motor corresponds to a plurality of central motors.

13. The system for controlling a watercraft according to claim 1, wherein the maximum output thrust of each of the left peripheral electric motor and the right peripheral electric motor is lower than the maximum output thrust of the central motor.

14. A system for controlling a watercraft comprising:

a joystick unit comprising a joystick configured to be tiltable in a plurality of directions, wherein the joystick unit configured to output joystick position signals responsive to tilting of the joystick in the plurality of directions, wherein the joystick position signals configured to control movement of the watercraft; and a controller communicating with the joystick unit to receive at least the outputted joystick position signals from the joystick unit, wherein the controller is configured to provide control instructions to control a magnitude and a direction of a thrust generated by each of a first propulsion component and a second propulsion component based on a selected operating mode, wherein the first and second propulsion components are independently operable and wherein the selected operating mode corresponds to at least one of a first operating mode corresponding solely to operation of the first propulsion unit responsive to the joystick position signals from the joystick unit and a second operating mode corresponding solely to operation the second propulsion unit responsive to the joystick position signals from the joystick unit;

wherein:

the controller selectably provides control instructions to at least one of the first and second propulsion component responsive to receipt of joystick position signals from the joystick unit based on a specified control mode;

operation of a combination the first and second propulsion component responsive to the joystick position signals from the joystick unit corresponds to a third operating mode, wherein in the third operating mode, the control instructions provided to the first and second propulsion component are associated with individual output ratios relative to a maximum output of each propulsion unit, wherein an output ratio associated with the first propulsion unit is lower than an output ratio associated with the second propulsion unit;

the first propulsion component comprises an internal combustion engine; and the second propulsion component comprises an electric motor.

15. The system for controlling a watercraft according to claim 14, wherein the second propulsion unit corresponds to left and right secondary motors and wherein the first propulsion unit corresponds to a plurality of primary motors.

16. A method for controlling a watercraft comprising:

obtaining joystick position signals responsive to tilting of a joystick unit comprising a joystick configured to be tiltable in a plurality of directions, wherein the joystick unit is configured to output the joystick position signals responsive to tilting of the joystick in the plurality of directions;

transmitting the joystick position signals from the joystick to a controller;

receiving the joystick position signals at the controller from the joystick unit; and providing control instructions for controlling a magnitude and a direction of a thrust generated by a left peripheral electric motor on a port side of the watercraft, a right peripheral electric motor on a starboard side of the watercraft, and at least one central motor comprising an internal combustion engine, wherein the control instructions are provided from the controller to at least one of the left peripheral electric motor, the right peripheral electric motor, and the at least one central motor based on a specified control mode, wherein the joystick position signals are transmitted independent of the specified control mode;

wherein:

the controller selectably provides the control instructions to at least one of the left peripheral electric motor, the right peripheral electric motor, and the at least one central motor based on a specified control mode; and the controller is selectable to provide the control instructions to the at least one central motor and the left and right peripheral electric motors based on a third control mode, wherein in the third control mode, the at least one central motor and the left and right peripheral electric motors are associated with output ratios relative to a maximum output, wherein an output ratio associated with the left and right peripheral electric motors is greater than an output ratio associated with the at least one central motor.

17. The method for controlling a watercraft according to claim 16, wherein the controller is selectable to provide the control instructions to the left and right peripheral electric motors in preference to the central motor based on a second control mode.

18. The method for controlling a watercraft according to claim 17, wherein the controller is further configured to prevent control instructions to the at least one central motor based on the second control mode.

19. The method for controlling a watercraft according to claim 16, wherein the controller is selectable to provide the control instructions to the at least one central motor in preference to the left and right peripheral electric motors based on a first control mode.

20. The method for controlling a watercraft according to claim 19, wherein the controller is further configured to prevent control instructions to the left and right peripheral electric motors based on the first control mode.

21. The method for controlling a watercraft according to claim 19, wherein a maximum thrust obtained by the left and right peripheral electric motors is smaller relative to a maximum thrust of the at least one central motor.

22. The method for controlling a watercraft according to claim 16, wherein the controller is configured to cause the central motor to tilt up during the operation of at least one control mode.

23. The method for controlling a watercraft according to claim 16, wherein the left and right peripheral electric motors correspond to retractable and deployed positions and wherein the controller is configured to cause the left and right peripheral electric motors to engage in a deployed position during operation of at least one specified control mode.

24. The method for controlling a watercraft according to claim 16 wherein the controller is configured to cause the left and right peripheral electric motors to engage in a retracted position during operation of at least one specified control mode.

25. The method for controlling a watercraft according to claim 16, wherein a steering angle range of rotatable angle of the peripheral electric motor in vertical axis is larger than that of the at least one central motor.

26. The method for controlling a watercraft according to claim 16, wherein the at least one central motor corresponds to a plurality of outboard motors.

27. A system for controlling a watercraft comprising:

at least one central motor;

a left peripheral motor on a port side of the watercraft relative to the at least one central motor;

a right peripheral motor on a starboard side of the watercraft relative to the at least one central motor;

a joystick unit comprising a joystick configured to be tiltable in a plurality of directions, wherein the joystick unit is configured to output joystick position signals responsive to tilting of the joystick in the plurality of directions, wherein the joystick position signals are configured to control movement of the watercraft; and a controller communicating with the joystick unit to receive at least the outputted joystick position signals from the joystick unit and communicating with the left and right peripheral electric motors, and the at least one central motor to provide at least control instructions to control a magnitude and a direction of a thrust generated by each of at least one of the left and right peripheral motors and the at least one central motor;

wherein:

the controller selectably provides the control instructions to the at least one central motor in preference to the left and right peripheral motors responsive to receipt of joystick position signals from the joystick unit during a first specified control mode;

the controller selectably provides the control instructions to the left and right peripheral electric motors and the at least one central motor responsive to receipt of joystick position signals from the joystick unit during a third specified control mode, wherein in the third control mode, the control instructions to the left and right peripheral electric motors and the at least one central motor are associated with individual output ratios relative to a maximum output of each motor, wherein an output ratio associated with the left and right peripheral electric motors is greater than an output ratio associated with the at least one central motor; and a steering angle range of each of the left peripheral motor and the right peripheral motor is greater than a steering angle range of the at least one central motor, or the maximum output thrust of each of the left peripheral electric motor and the right peripheral electric motor is lower than the maximum output thrust of the central motor.

* * * * *